US011062449B2

(12) United States Patent
Mao et al.

(10) Patent No.: US 11,062,449 B2
(45) Date of Patent: Jul. 13, 2021

(54) METHOD AND SYSTEM FOR EXTRACTING VASCULATURE

(71) Applicant: SHANGHAI UNITED IMAGING HEALTHCARE CO., LTD., Shanghai (CN)

(72) Inventors: Yufei Mao, Shanghai (CN); Jieyan Ma, Shanghai (CN); Ke Wu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 143 days.

(21) Appl. No.: 16/236,597

(22) Filed: Dec. 30, 2018

(65) Prior Publication Data

US 2019/0172205 A1 Jun. 6, 2019

Related U.S. Application Data

(63) Continuation of application No. PCT/CN2017/086560, filed on May 31, 2017.

(30) Foreign Application Priority Data

Dec. 31, 2016 (CN) .......................... 201611268227.X

(51) Int. Cl.
*G06K 9/00* (2006.01)
*G06T 7/00* (2017.01)
(Continued)

(52) U.S. Cl.
CPC .............. *G06T 7/0014* (2013.01); *G06T 7/11* (2017.01); *G06T 7/149* (2017.01); *G06T 7/187* (2017.01);
(Continued)

(58) Field of Classification Search
CPC .................................................. G06T 7/0014
See application file for complete search history.

(56) References Cited

U.S. PATENT DOCUMENTS

2011/0069874 A1* 3/2011 Nagao ....................... G06T 5/50
382/128
2012/0121147 A1 5/2012 Huang et al.
(Continued)

FOREIGN PATENT DOCUMENTS

CN 101551862 A 10/2009
CN 103935122 A 8/2014
(Continued)

OTHER PUBLICATIONS

International Search Report in PCT/CN2017/086560 dated Jun. 30, 2017, 7 pages.
(Continued)

*Primary Examiner* — Oneal R Mistry
(74) *Attorney, Agent, or Firm* — Metis IP LLC

(57) ABSTRACT

A method and system for extracting vasculature. The method may include obtaining an image including a part representing a vessel, and obtaining a first image by extracting bone tissue in the image. The method may also include obtaining a second image by performing a region growing operation on the image. The method may further include generating a subtraction image based on the first image and the second image. The subtraction image may include at least a portion of the part representing the vessel in the image. The method may also include obtaining at least one vessel seed group based on a first condition and the subtraction image, and determining at least one vessel threshold based on at least one boundary distance field of the subtraction image. The method may further include obtaining a target vessel image by performing, based on the vessel seed group and the at
(Continued)

least one vessel threshold, a region growing operation on the image.

17 Claims, 24 Drawing Sheets

(51) Int. Cl.
  *G06T 7/11* (2017.01)
  *G06T 7/187* (2017.01)
  *G06T 7/149* (2017.01)

(52) U.S. Cl.
  CPC ............... *G06T 2207/10081* (2013.01); *G06T 2207/10088* (2013.01); *G06T 2207/10104* (2013.01); *G06T 2207/10132* (2013.01); *G06T 2207/20036* (2013.01); *G06T 2207/20072* (2013.01); *G06T 2207/20084* (2013.01); *G06T 2207/20156* (2013.01); *G06T 2207/20224* (2013.01); *G06T 2207/30008* (2013.01); *G06T 2207/30101* (2013.01)

(56) References Cited

U.S. PATENT DOCUMENTS

| | | | |
|---|---|---|---|
| 2015/0133764 A1 | 5/2015 | Sakuragi | |
| 2016/0328855 A1* | 11/2016 | Lay | G06K 9/4614 |
| 2016/0364878 A1* | 12/2016 | Guo | G06T 7/11 |
| 2017/0340266 A1* | 11/2017 | Gardner | A61B 5/4393 |
| 2018/0005372 A1 | 1/2018 | Wang et al. | |

FOREIGN PATENT DOCUMENTS

| | | |
|---|---|---|
| CN | 104978726 A | 10/2015 |
| CN | 105513036 A | 4/2016 |
| CN | 106682636 A | 5/2017 |
| EP | 2811458 A1 | 12/2014 |

OTHER PUBLICATIONS

The Extended European Search Report in European Application No. 17889256.8 dated Nov. 25, 2019, 8 pages.

I. Pirner et al., Segmentation of CT Arteriography Based on Combination of Segmentation Methods, Pattern Recognition and Image Analysis, 21(3): 553-555, 2011.

* cited by examiner

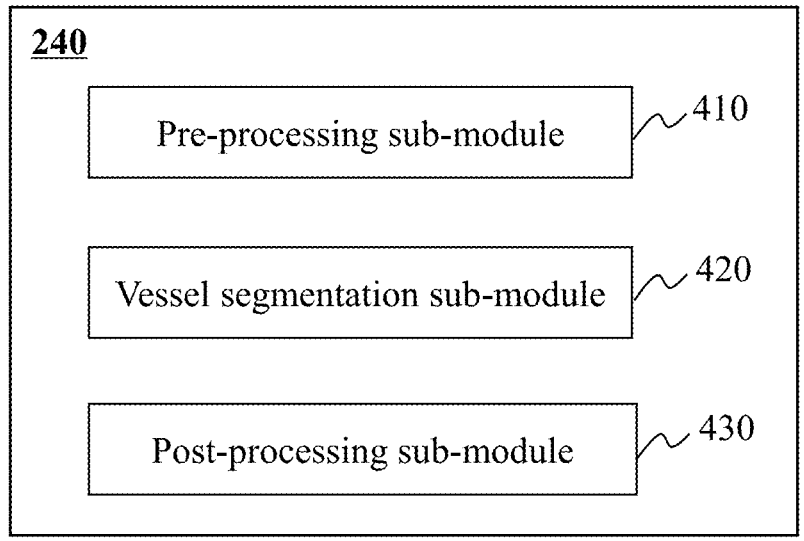
FIG. 4-A
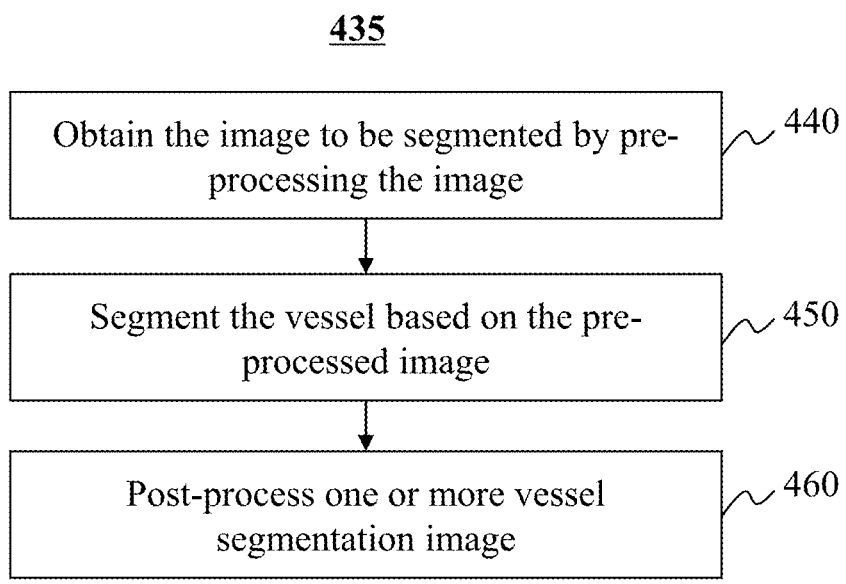
FIG. 4-B

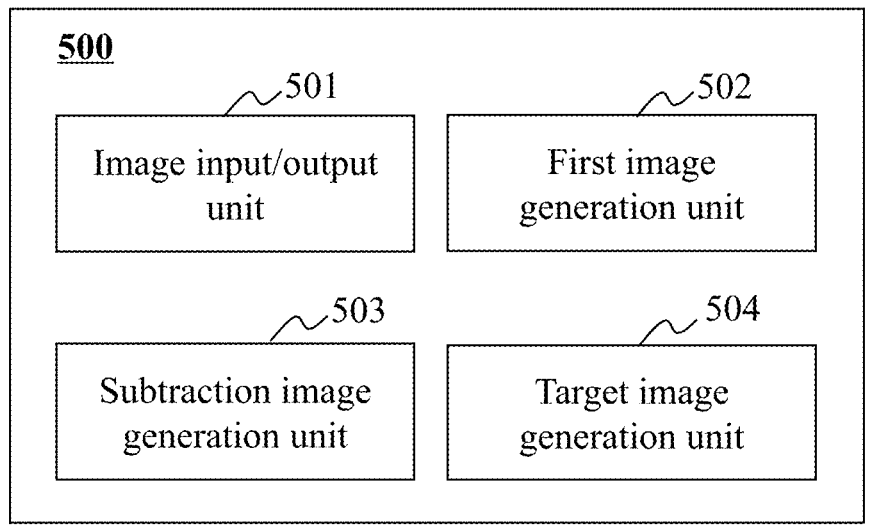
FIG. 5-A
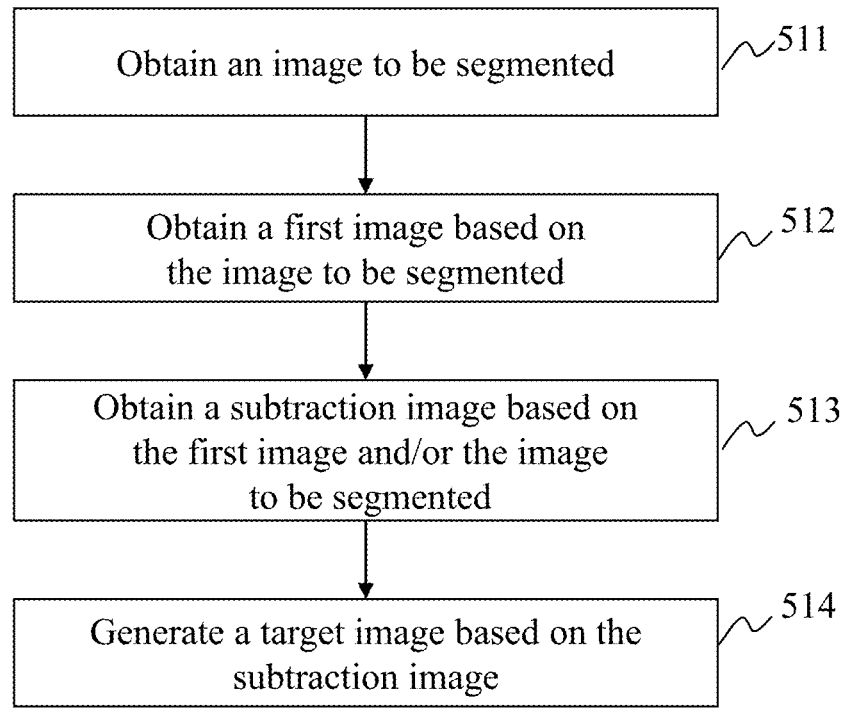
FIG. 5-B

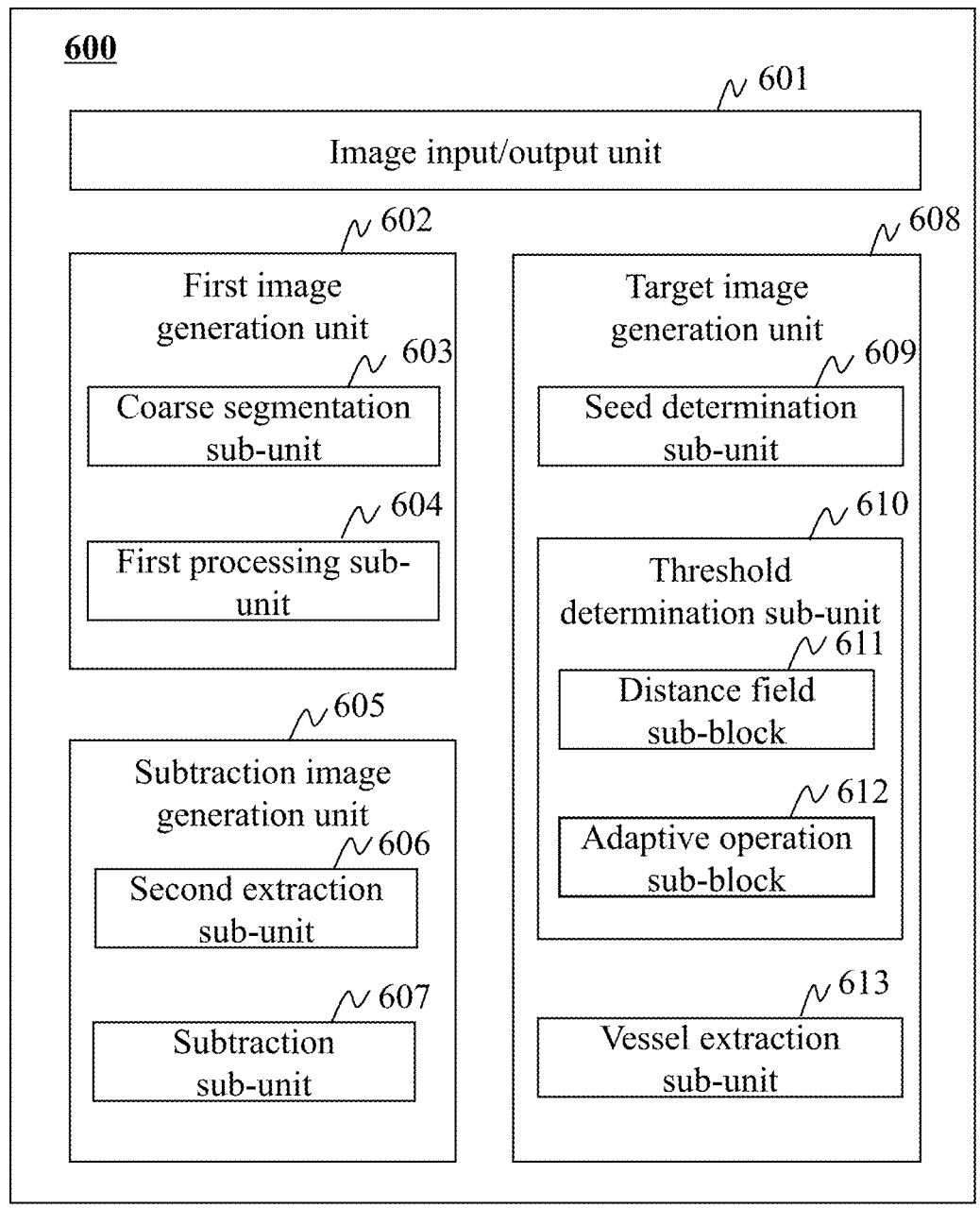
FIG. 6-A

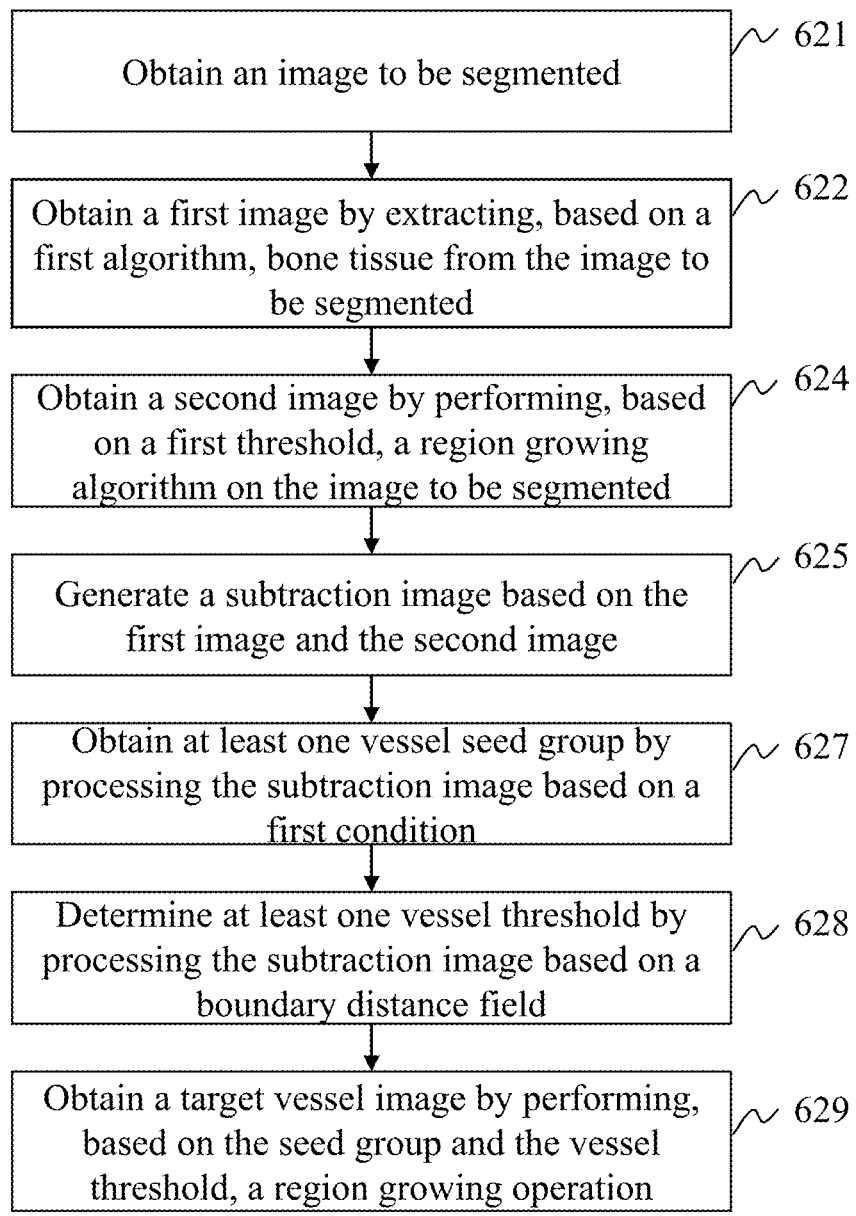
FIG. 6-B

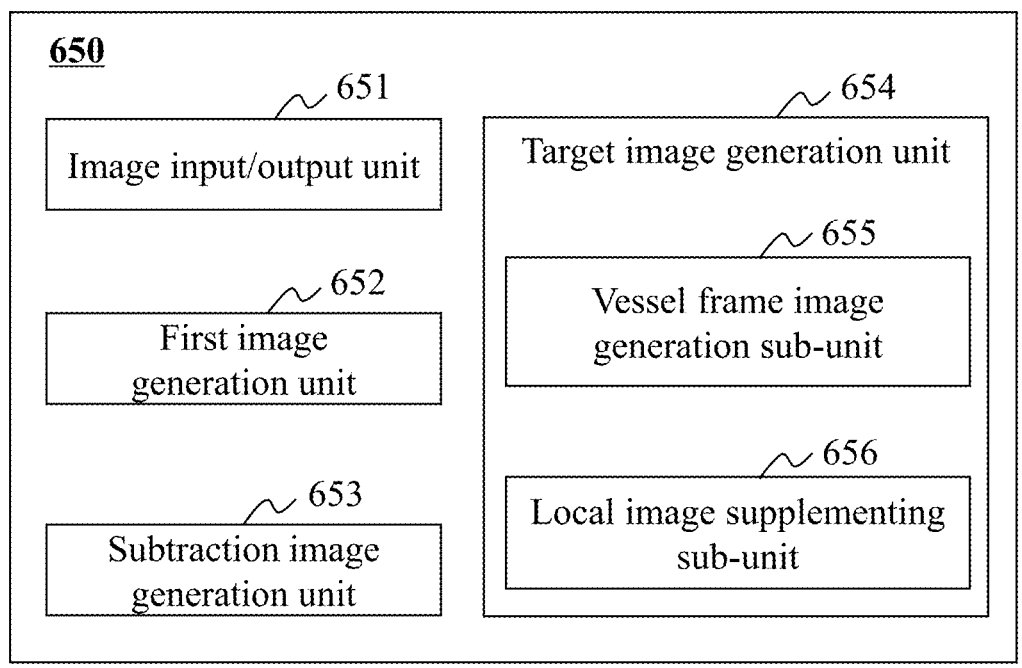
FIG. 6-C

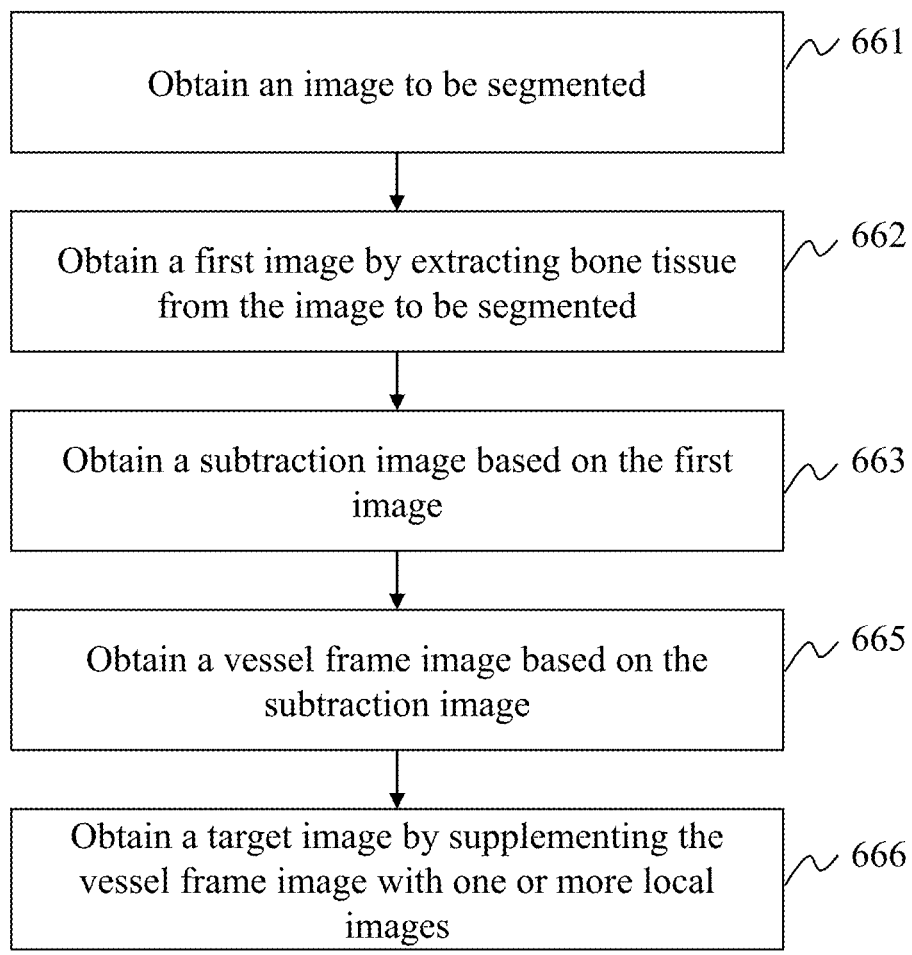
FIG. 6-D

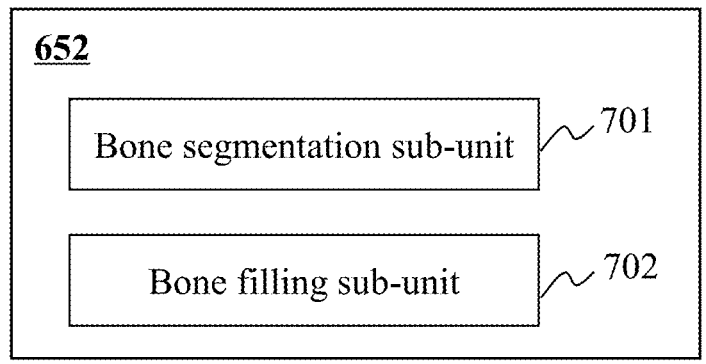
FIG. 7-A
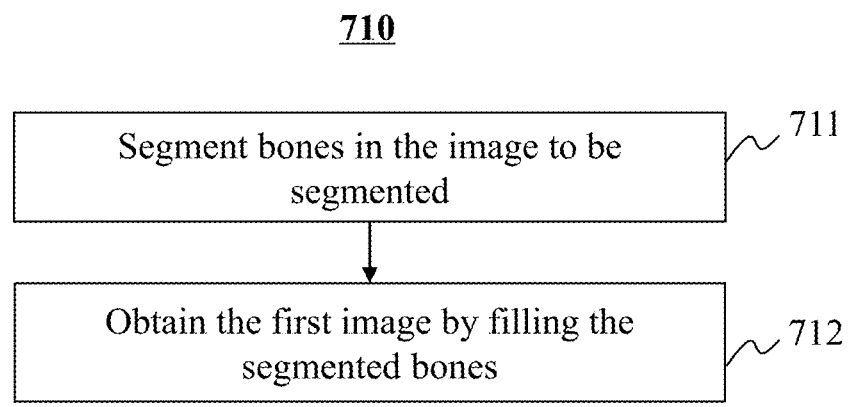
FIG. 7-B

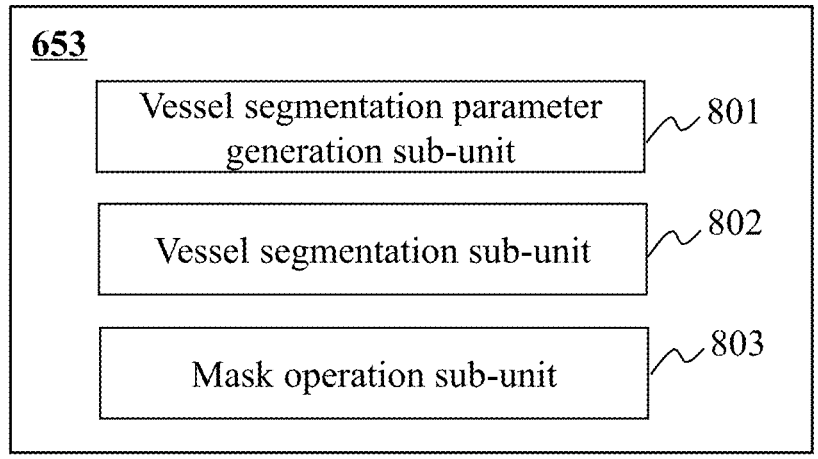
FIG. 8-A
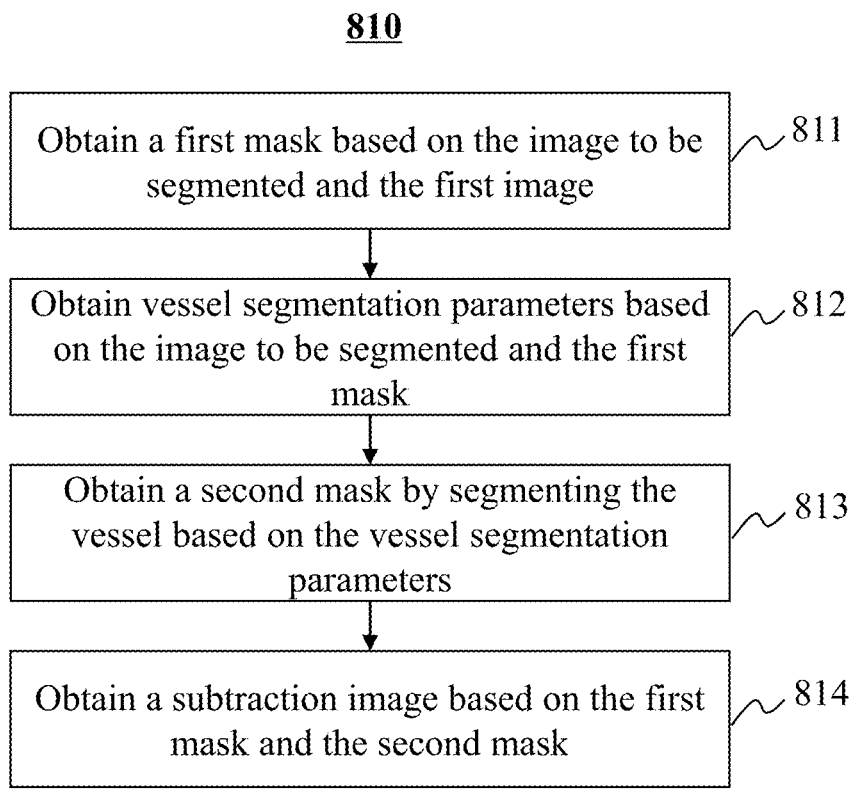
FIG. 8-B

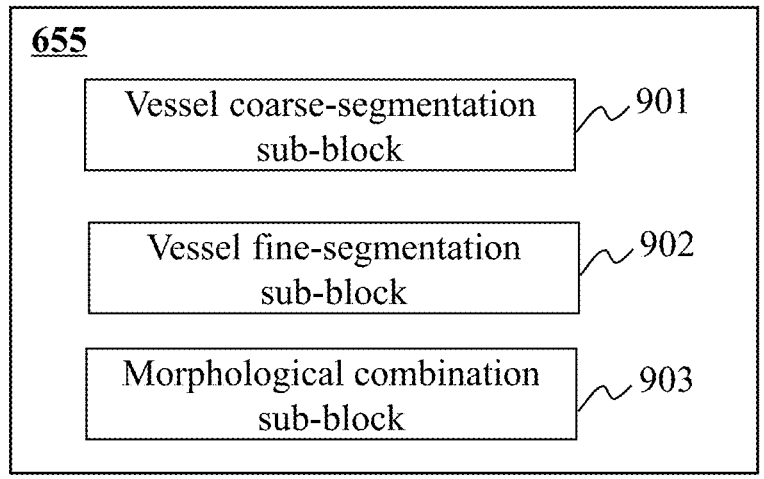
FIG. 9-A
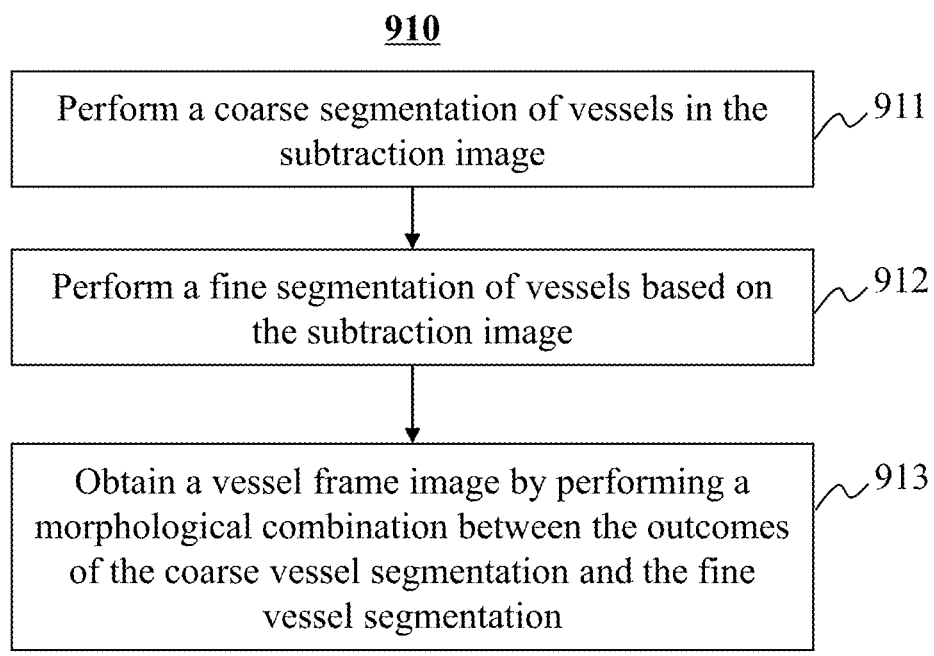
FIG. 9-B

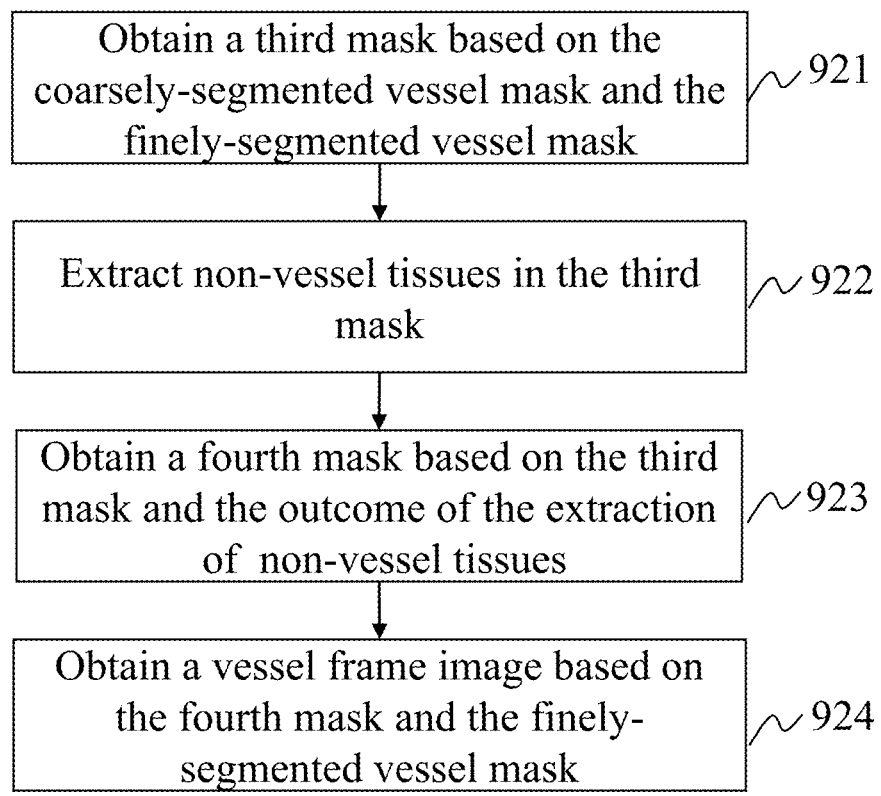
FIG. 9-C

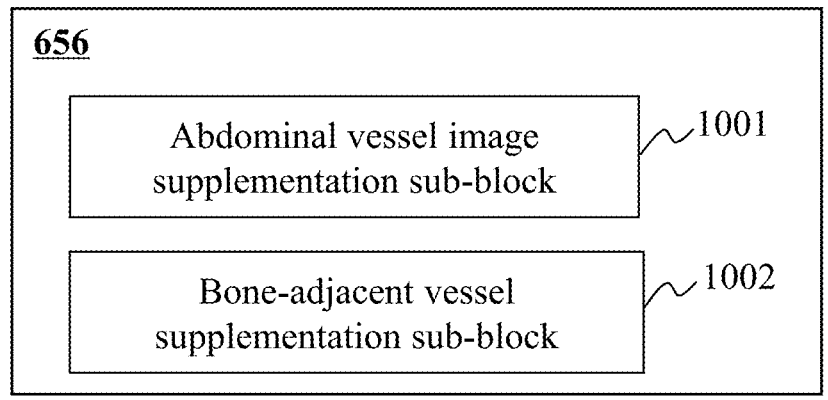
FIG. 10-A
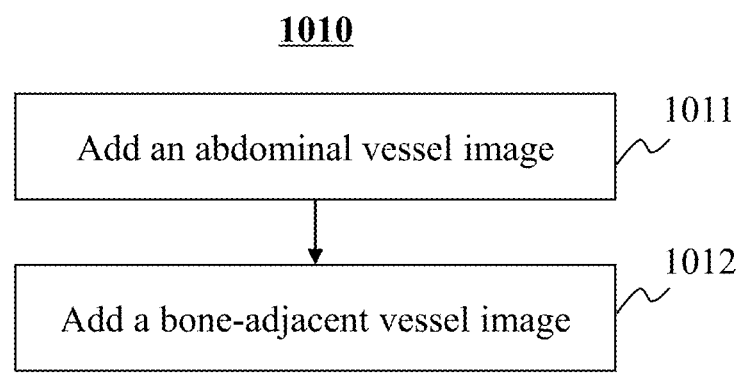
FIG. 10-B

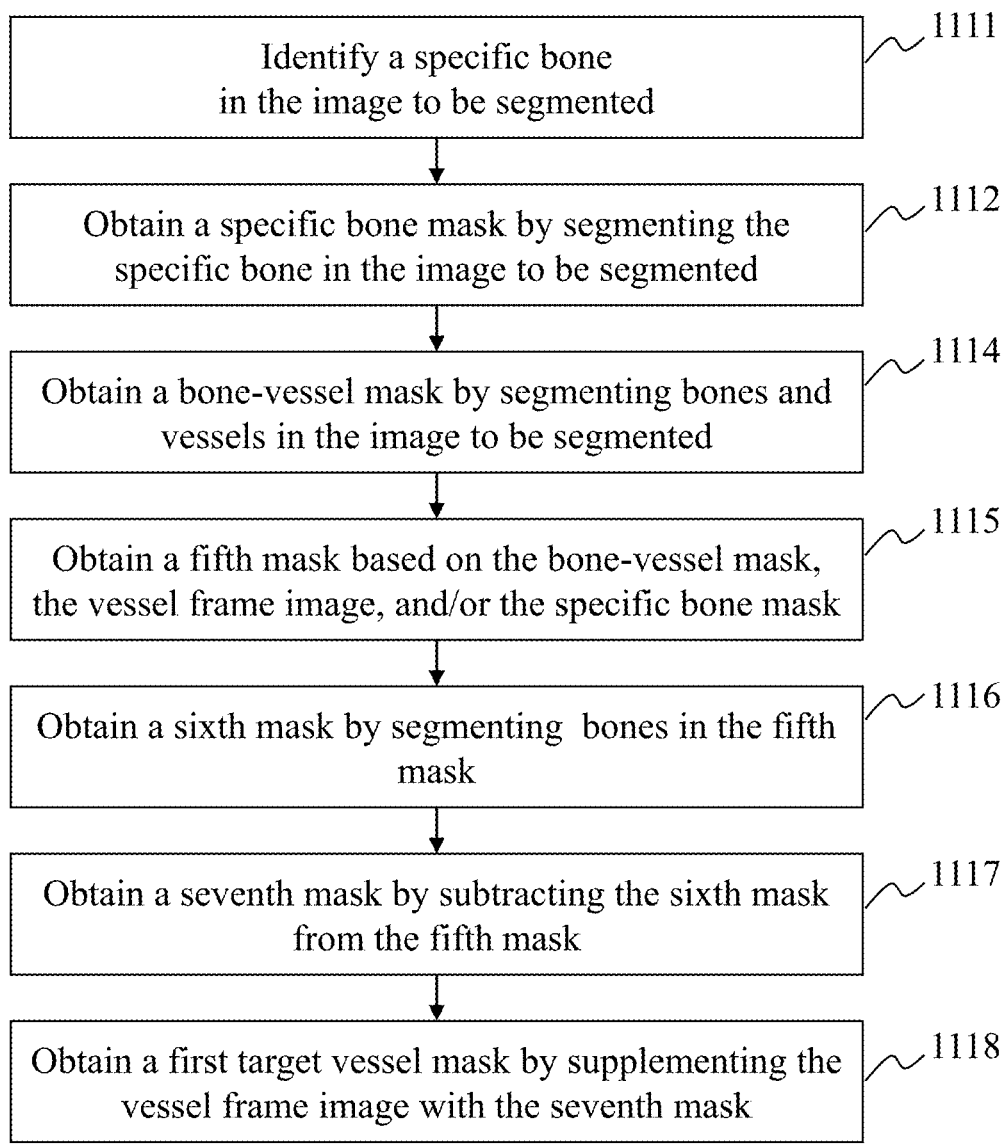
FIG. 11-A

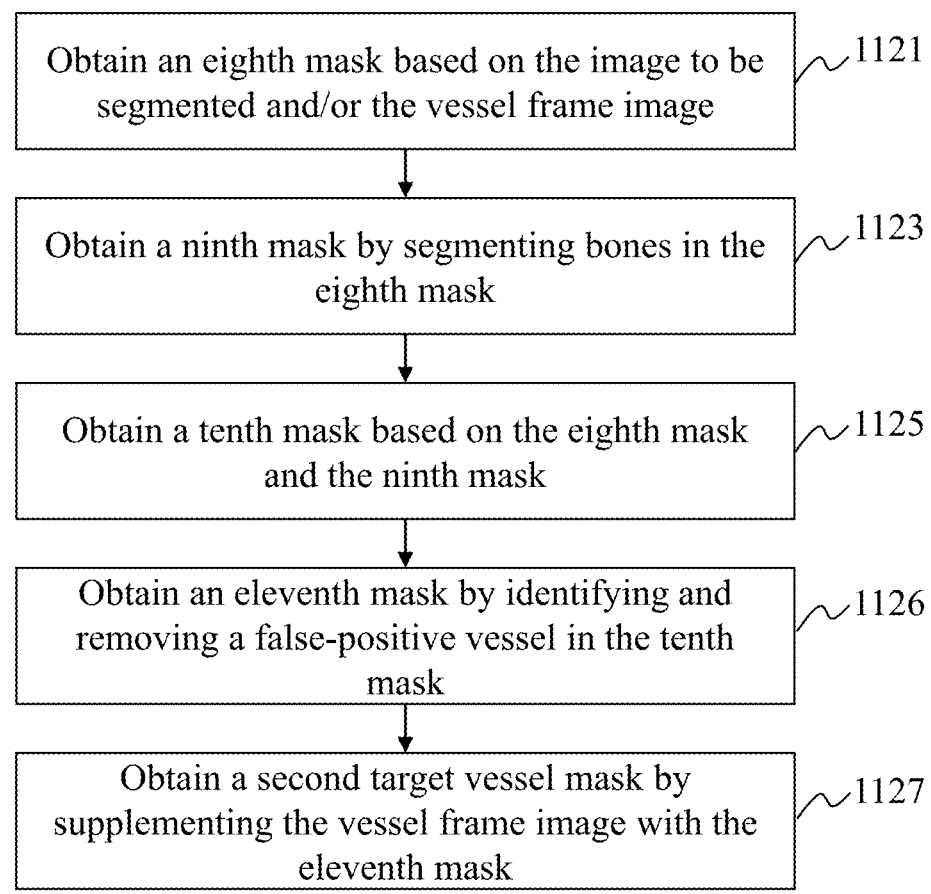
FIG. 11-B

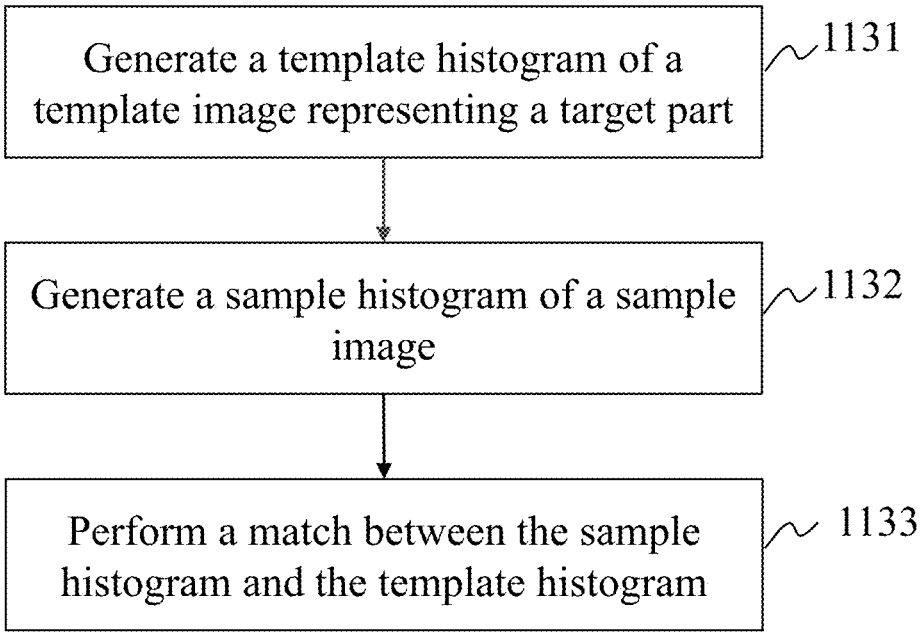
FIG. 11-C

METHOD AND SYSTEM FOR EXTRACTING VASCULATURE

CROSS REFERENCE

This application is a continuation of International Application No. PCT/CN2017/086560, filed on May 31, 2017, which claims priority of Chinese Application No. 201611268227.X filed on Dec. 31, 2016, the entire contents of which are hereby incorporated by reference.

TECHNICAL FIELD

The present invention generally relates to a method and system for extracting vasculature, and more specifically to a method and system for performing a vessel segmentation based on bone and vessel segmentation in angiography images.

BACKGROUND

Angiography plays an important role in the medical field. Angiography is an important technique to diagnose vessel diseases. Through it a variety of diseases, such as aneurysms, vessel stenosis, and vessel calcification, may be diagnosed. There are a wide variety of types of angiography techniques including, for example, Digital Subtraction Angiography (DSA), Magnetic Resonance Angiography (MRA), Computed Tomography Angiography (CTA), or any combination thereof. The separation of blood vessels from other tissues is an important step in angiography. Vascular extraction (or "segmentation", "recognition", "identification", etc.) in angiography images may provide the basis for disease diagnosis, treatment, and evaluation, virtual surgery and surgical guidance, and/or facilitate the determination of a vessel diameter, quantitative analysis of a vessel image, etc. As the pixel or voxel values of blood vessels and those of other tissues such as bones in the angiography images may be close to each other and may overlap to a certain extent, during the vessel extraction, bones and other tissues may be extracted as vessels, resulting in an excessive extraction. Alternatively or additionally, small vessels may be removed as non-vessel tissue, resulting in an incomplete extraction. In order to improve the precision of vessel extraction, a variety of methods may be used to segment the blood vessels.

SUMMARY

A first aspect of the present disclosure is directed to a first method for extracting vasculature. The method may be implemented on at least one machine, each of which may have at least one processor and a storage device. The method may include obtaining an image including a part representing a vessel. The method may also include obtaining a first image by extracting, based on a first algorithm, bone tissue in the image. The method may further include obtaining a second image by performing, based on a first threshold, a region growing operation on the image. The method may also include generating a subtraction image based on the first image and the second image. The subtraction image may include at least a portion of the part representing the vessel in the image. The method may further include obtaining at least one vessel seed group based on a first condition and the subtraction image. The vessel seed group may include at least one vessel seed. The method may also include determining at least one vessel threshold based on at least one boundary distance field of the subtraction image, and obtaining a target vessel image by performing, based on the vessel seed group and the at least one vessel threshold, a region growing operation on the image.

Another aspect of the present disclosure is directed to a system for extracting vasculature. The system may include at least one processor, and at least one storage device configured to store executable instructions. The instructions, when executed by the at least one processor, may cause the system to implement the first method for extracting vasculature.

Another aspect of the present disclosure is directed to a non-transitory computer-readable medium. The non-transitory computer-readable medium may include executable instructions. The instructions, when executed by at least one processor, may cause the at least one processor to implement the first method for extracting vasculature.

Another aspect of the present disclosure is directed to a second method for extracting vasculature. The method may be implemented on at least one machine, each of which may have at least one processor and a storage device. The method may include obtaining an image including a part representing a vessel, and obtaining a first image by extracting bone tissue in the image. The first image may include the extracted bone tissue. The method may also include generating at least one subtraction image based on the image and the first image. The at least one subtraction image may include at least a portion of the part representing the vessel in the image. The method may further include obtaining a vessel frame image based on the subtraction image. The vessel frame image may be a part of a target vessel image. The method may also include obtaining the target vessel image by performing, to the vessel frame image, at least one iteration of a supplementation with respect to the vessel.

Another aspect of the present disclosure is directed to a system for extracting vasculature. The system may include at least one processor, and at least one storage device configured to store executable instructions. The instructions, when executed by the at least one processor, may cause the system to implement the second method for extracting vasculature.

Another aspect of the present disclosure is directed to a non-transitory computer-readable medium. The non-transitory computer-readable medium may include executable instructions. The instructions, when executed by at least one processor, may cause the at least one processor to implement the second method for extracting vasculature.

In some embodiments, the extracting bone tissue in the image based on a first algorithm may include obtaining the first image by processing, based on a second threshold and Laplacian enhancement, the image; or obtaining the first image by extracting, based on a third threshold, the bone tissue in the image.

In some embodiments, the second threshold may be above an HU value of 120, or the third threshold may be above an HU value of 600.

In some embodiments, the first threshold may be above an HU value of 150.

In some embodiments, the obtaining at least one vessel seed group may include: obtaining one or more connected components in the subtraction image; determining, based on the first condition, a target connected component from the one or more connected components; and designating the target connected component as the vessel seed group.

In some embodiments, the determining a target connected component from the one or more connected components based on the first condition may include: determining a count of pixels/voxels included in each of the one or more connected components; comparing the count of pixels/voxels included in each of the one or more connected components with a threshold a; and designating a connected component whose count of pixels/voxels is lower than the threshold a as the target connected component.

In some embodiments, the determining a target connected component from the one or more connected components based on the first condition may include: for each of the one or more connected components: determining a first mean of the pixels/voxels along an x direction; determining a second mean of the pixels/voxels in the x direction of the cross-section of the subtraction image; and determining a ratio of the first mean to the second mean; comparing the ratio to a condition f. The determining a target connected component may also include designating a connected component satisfying the condition f as the target connected component.

In some embodiments, the condition f is that the ratio is between ⅓ and ⅔;

In some embodiments, the determining a target connected component from the one or more connected components based on the first condition may include: for each of the one or more connected components: determining a first count of pixels/voxels each of whose distance therefrom to a background area of the image is less than a threshold b; determining a total count of the pixels/voxels within the each connected component; determining a second count of pixels/voxels each of whose distance therefrom to a bone is less than a threshold d; determining a first ratio of the first count to the total count; and determining a second ratio of the second count to the total count. The determining a target connected component may also include excluding a connected component whose first ratio is greater than a threshold c or whose second ratio is greater than a threshold e from being designated as the target connected component.

In some embodiments, the threshold b may be above 0.25 cm, the threshold c may be above 50%, the threshold d may be less than 0.05 cm, or the threshold e may be less than 50%.

In some embodiments, the determining at least one vessel threshold may include: obtaining one or more connected components in the subtraction image; obtaining values of boundary distance fields of the one or more connected components; generating one or more boundary distance field images based on the values of the boundary distance field; and obtaining the at least one vessel threshold by performing, based on the at least one vessel seed group, an adaptive thresholding operation on the one or more boundary distance field images.

In some embodiments, the obtaining the at least one vessel threshold by performing the adaptive thresholding operation on the one or more boundary distance field images may include: performing, based on center points of the one or more connected components, a region growing operation based on a fourth threshold; determining whether there is a sudden change in a count of pixels/voxels of the outcome of the region growing operation performed based on the fourth threshold; and determining the at least one vessel threshold based on whether there is a sudden change in the count of pixels/voxels of the outcome of the region growing operation performed based on the fourth threshold.

In some embodiments, the determining the at least one vessel threshold based on whether there is a sudden change in the count of pixels/voxels of the outcome of the region growing operation performed based on the fourth threshold may include: determining that there is no sudden change in the count of pixels/voxels of the outcome of the region growing process performed based on the fourth threshold; and updating the fourth threshold.

In some embodiments, the determining the at least one vessel threshold based on whether there is a sudden change in the count of pixels/voxels of the outcome of the region growing operation performed based on the fourth threshold may include: determining that there is a sudden change in the count of pixels/voxels of the outcome of the region growing operation performed based on the fourth threshold; and designating the fourth threshold before the latest update as the at least one vessel threshold.

In some embodiments, the first method may further include performing a filling operation on the first image.

In some embodiments, the performing a filling operation on the first image may include determining one or more hollow regions in the first image, and filling the one or more hollow regions.

In some embodiments, the first method may further include performing an image erosion on the subtraction image.

In some embodiments, the generating a subtraction image based on the first image and the second image may include obtaining the subtraction image by subtracting the first image from the second image.

In some embodiments, the obtaining a first image by extracting bone tissue in the image may include obtaining a preliminarily segmented bone mask by segmenting the bone tissue in the image.

In some embodiments, the obtaining a first image by extracting bone tissue in the image may further include performing a filling operation on at least part of the bone tissue in the preliminarily segmented bone mask.

In some embodiments, the at least one subtraction image may include a first subtraction image and a second subtraction image.

In some embodiments, the generating at least one subtraction image may include obtaining the second subtraction image by subtracting the first image from the image.

In some embodiments, the generating at least one subtraction image may include: obtaining a first mask by subtracting the first image from the image; obtaining one or more vessel segmentation parameters based on the image and the first mask; obtaining a second mask by segmenting vessels based on the obtained one or more vessel segmentation parameters and according to at least one vessel segmentation algorithm; and obtaining the first subtraction image by merging the first mask and the second mask. The second mask may include part of vessels included in the first image.

In some embodiments, the at least one vessel segmentation algorithm may comprise a level set algorithm or a region growing algorithm.

In some embodiments, the obtaining a vessel frame image may include: obtaining a finely-segmented vessel mask by performing a fine segmentation of vessels in the first subtraction image; obtaining a coarsely-segmented vessel mask by performing a coarse segmentation of vessels in the second subtraction image; and obtaining the vessel frame image by performing, based on the finely-segmented vessel mask and the coarsely-segmented vessel mask, a morphological combination.

In some embodiments, the morphological combination may include: obtaining a third mask by subtracting the finely-segmented vessel mask from the coarsely-segmented vessel mask, the third mask including bone tissue; obtaining a fourth mask related to the vessel by subtracting, from the third mask, a part unrelated to the vessel; and obtaining the vessel frame image by combining the fourth mask and the finely-segmented vessel mask.

In some embodiments, the obtaining a fourth mask may comprise: identifying at least one connected component in the third mask; identifying connected components unrelated to the vessel by screening the at least one connected component; and obtaining the fourth mask by removing, from the third mask, the identified connected components unrelated to the vessel.

In some embodiments, the obtaining the target vessel image may include: obtaining a specific bone mask by identifying a specific bone in the image; obtaining a bone-vessel mask by segmenting, based on a second condition, bones and vessels in the image; obtaining a fifth mask by subtracting, from the bone-vessel mask, the vessel frame image and the specific bone mask; obtaining a sixth mask by segmenting, according to a third condition, bones in the fifth mask; obtaining a seventh mask by subtracting the sixth mask from the fifth mask; obtaining a supplement image by segmenting vessels in the seventh mask; and obtaining the target vessel image by combining the supplement image and the vessel frame image.

In some embodiments, the second condition may include: segmenting the image by region growing performed based on a fourth threshold. The fourth threshold may range between 110 and 150.

In some embodiments, the third condition may include segmenting, based on a fifth threshold, the fifth mask using a region growing algorithm. The fifth threshold may range between 700 and 900.

In some embodiments, the specific bone may include a rib, an ilium, or a sacrum, and a distance between the specific bone and the vessel in the image is less than a predetermined threshold.

In some embodiments, the identifying the specific bone may include: locating the specific bone; and obtaining the specific bone mask by segmenting the specific bone.

In some embodiments, the locating the specific bone may include locating the specific bone based on an anatomical relationship.

In some embodiments, the locating the specific bone may include: obtaining a reference image; extracting a feature of the reference image; generating a template histogram based on the feature of the reference image; extracting the feature of the image; generating a sample histogram based on the feature of the image; and locating the specific bone based on a similarity between the template histogram and the sample histogram.

In some embodiments, the obtaining the target vessel image may include: obtaining an eighth mask by subtracting the vessel frame image from the image; obtaining a ninth mask by segmenting, based on a sixth threshold, bones in the eighth mask, wherein the sixth threshold ranges between 700-900; obtaining a tenth mask based on the eighth mask and the ninth mask; obtaining the eleventh mask by segmenting vessels in the tenth mask; and obtaining the target vessel image by combining the eleventh mask and the vessel frame image.

In some embodiments, the obtaining the tenth mask may include: identifying a false positive outcome in the eighth mask; and obtaining the tenth mask by subtracting the false positive outcome from the eighth mask.

BRIEF DESCRIPTIONS OF THE DRAWINGS

The drawings described herein are used to provide a further understanding of the present disclosure and constitute a part of the present disclosure. The embodiments and descriptions of present disclosure are used herein to explain the present disclosure and not intended to be limiting. Like reference numerals indicate like components in the drawings.

Figure 1:
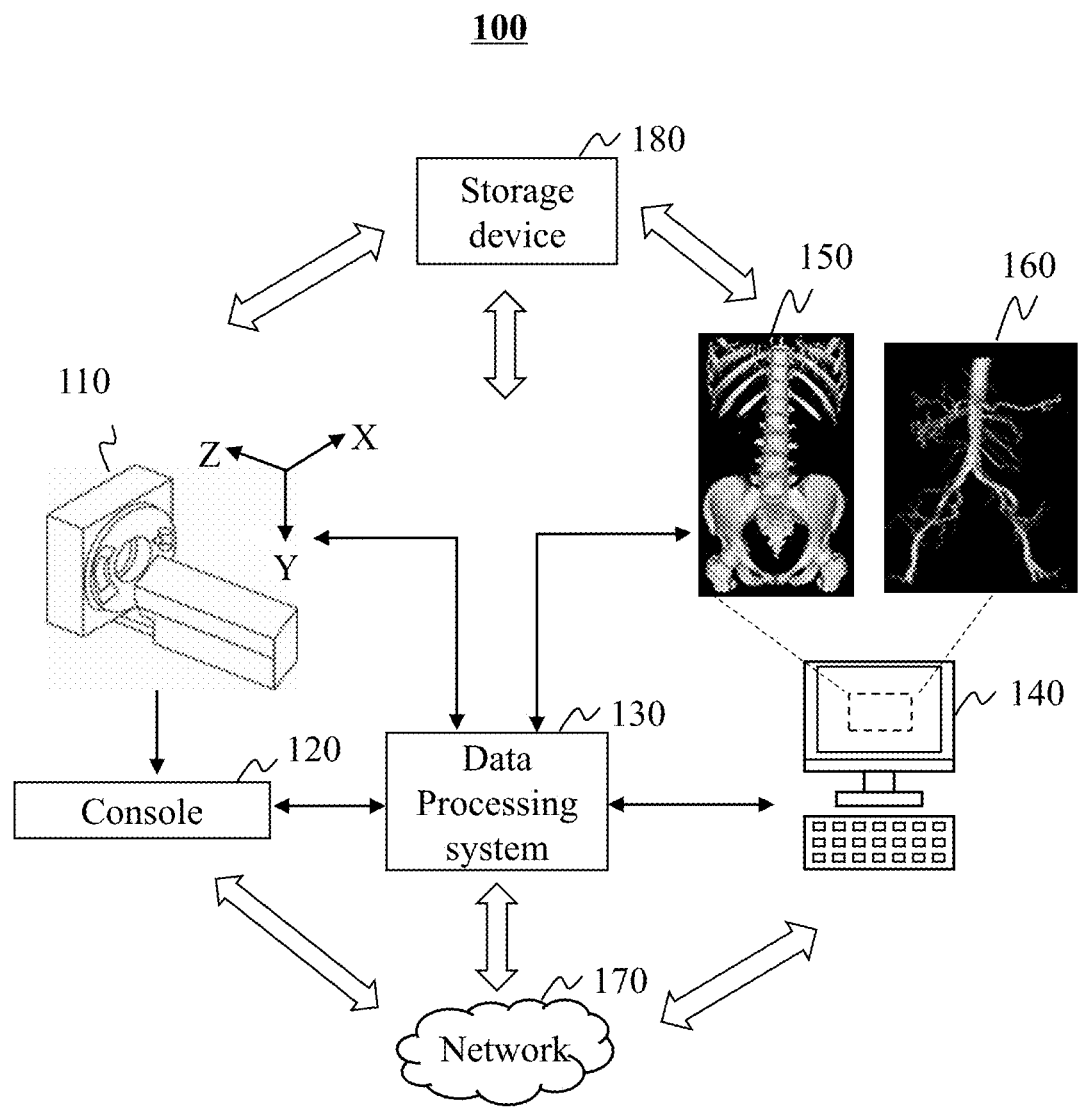
FIG. 1 is a schematic diagram illustrating an imaging system according to some embodiments of the present disclosure.
Figure 12:
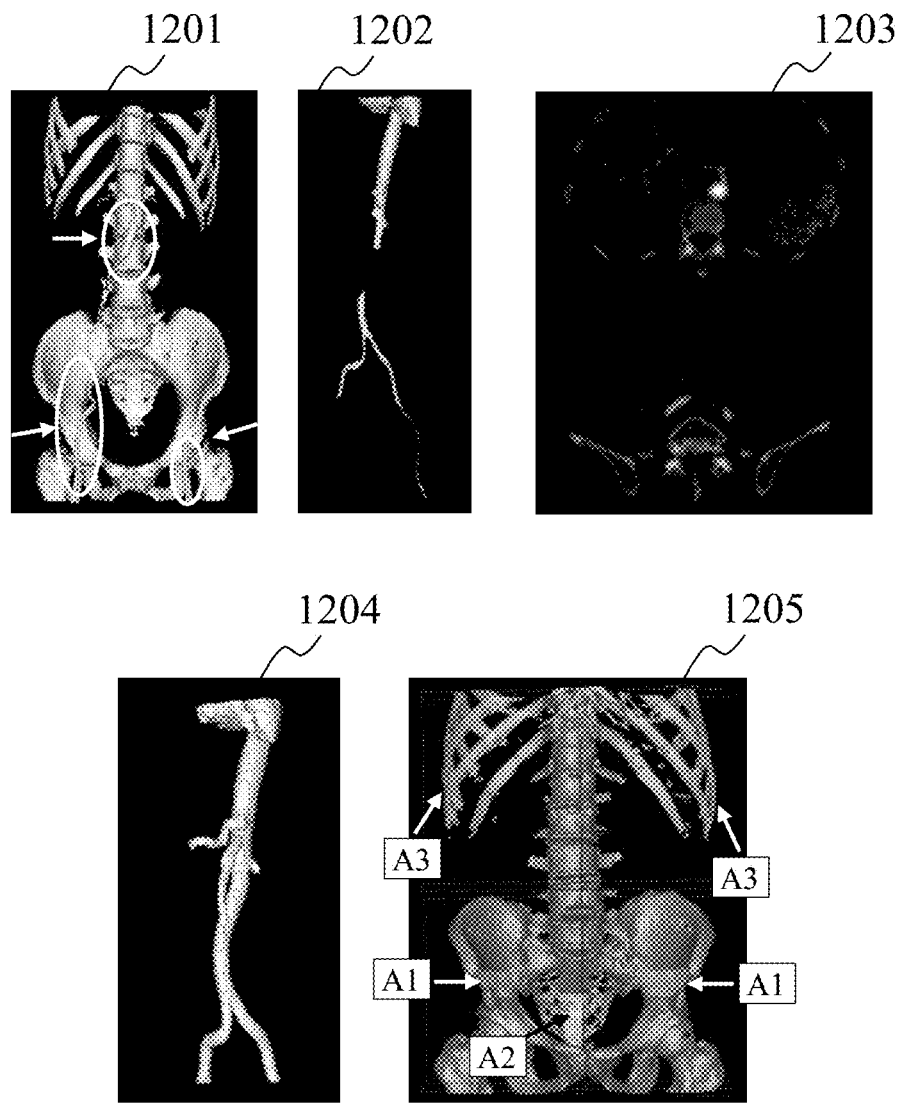
Figure 13:
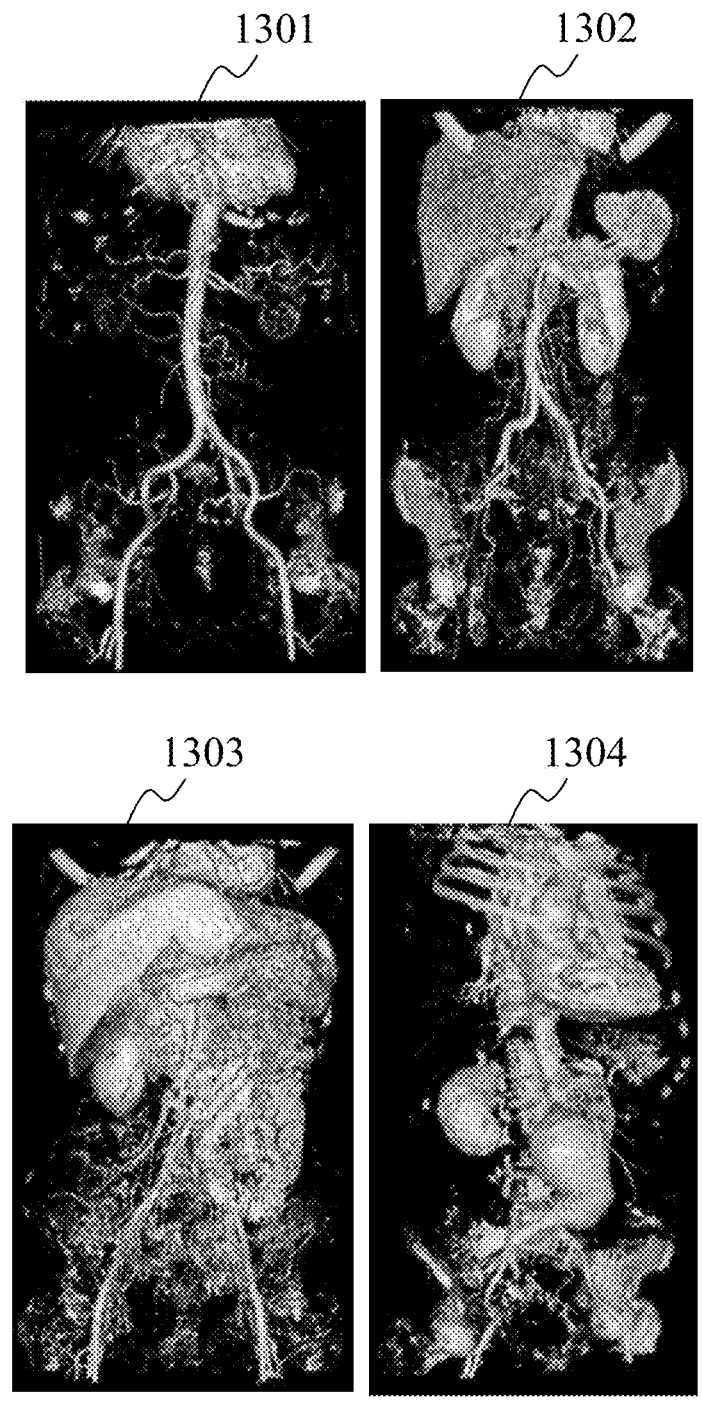
Figure 14:
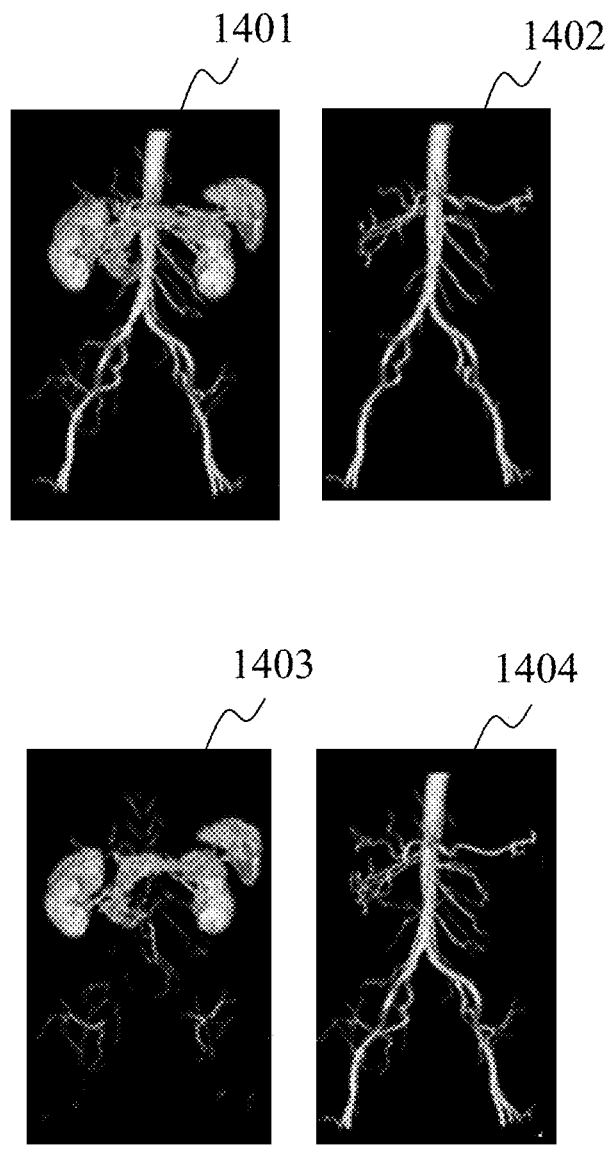
Figure 15:
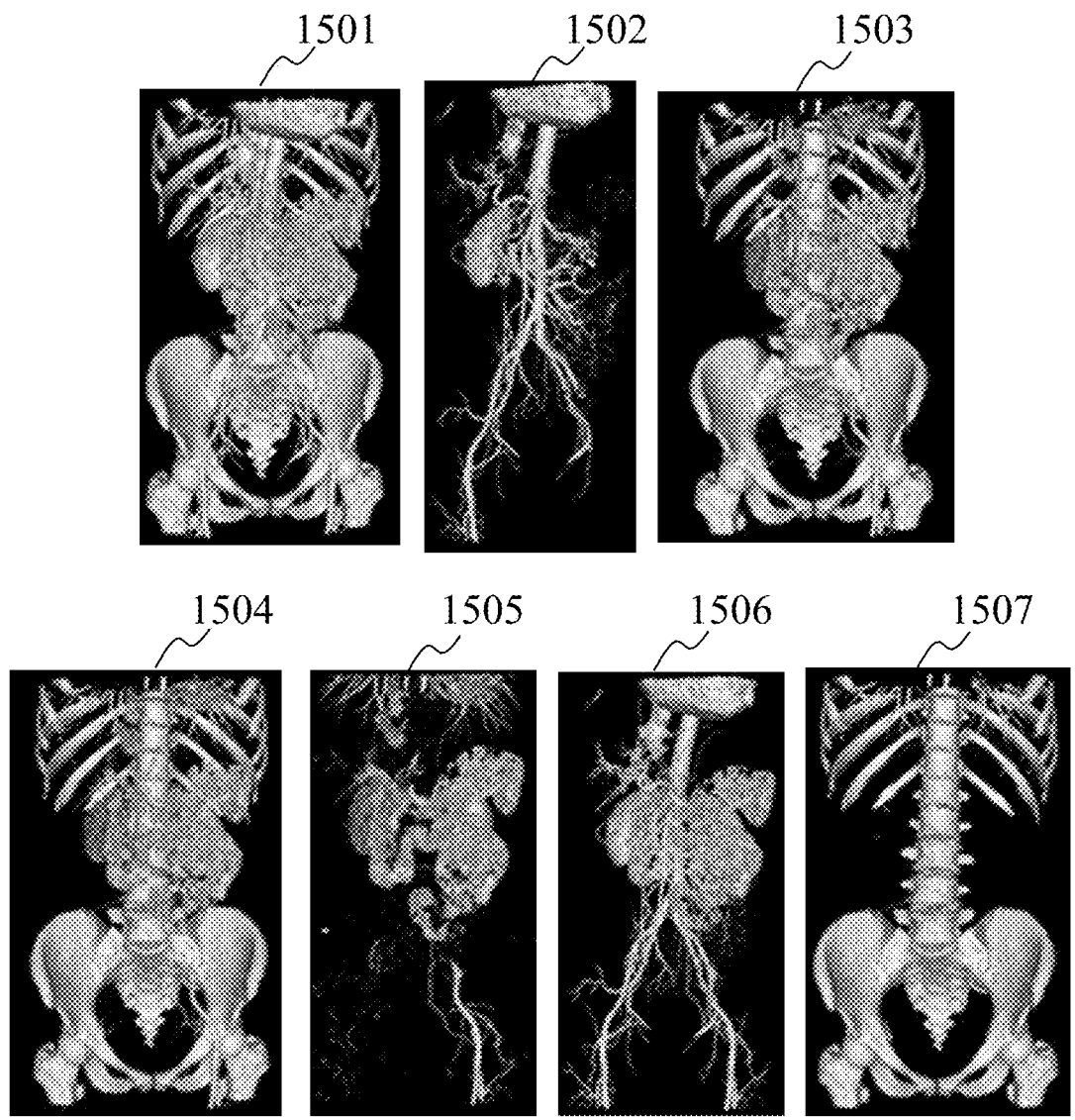
Figure 16:
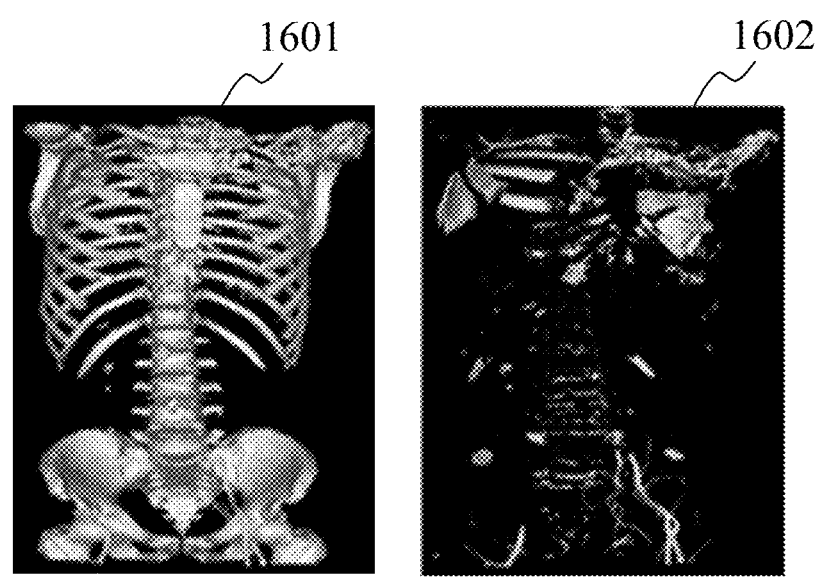
Figure 17:
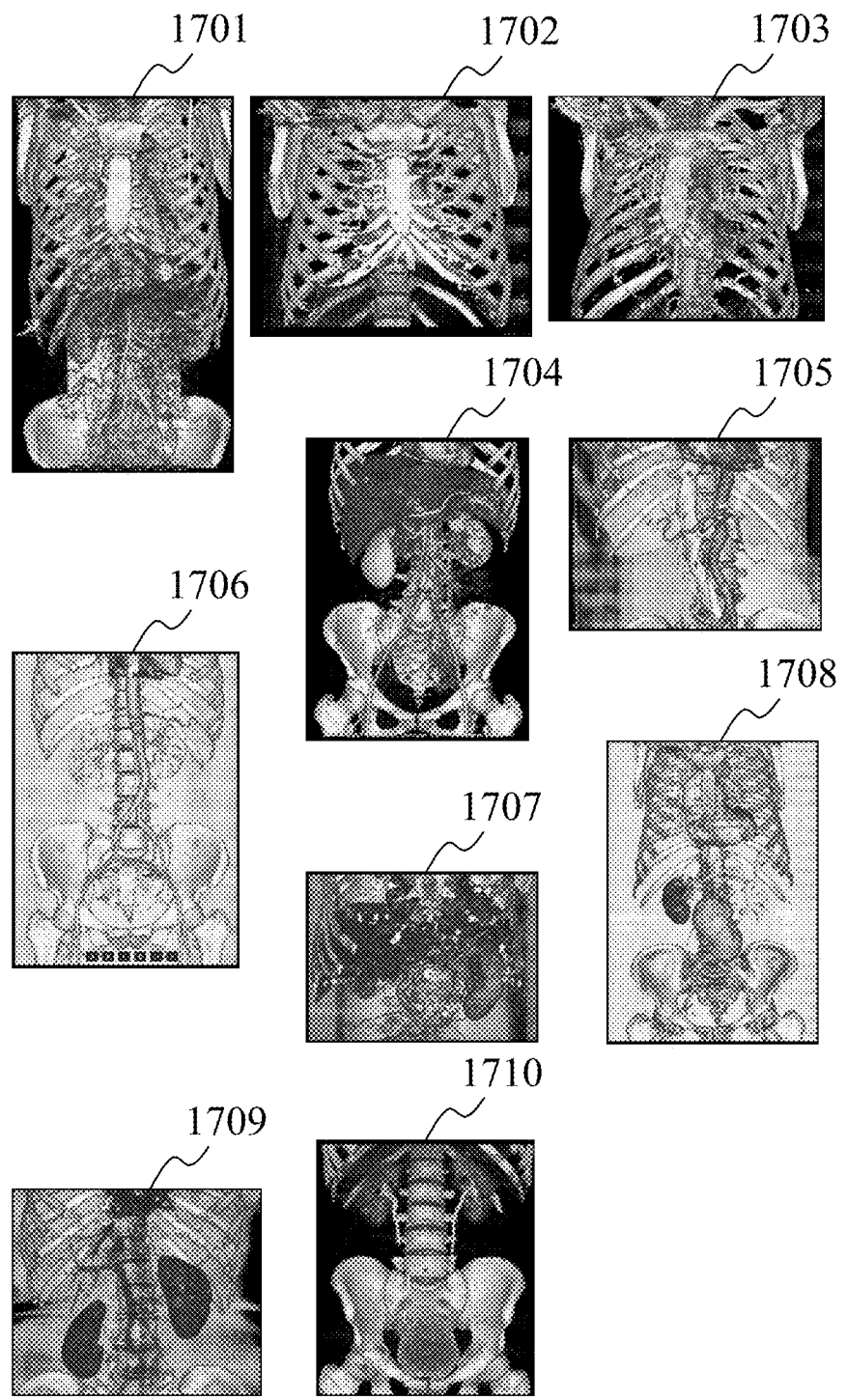
Figure 18:
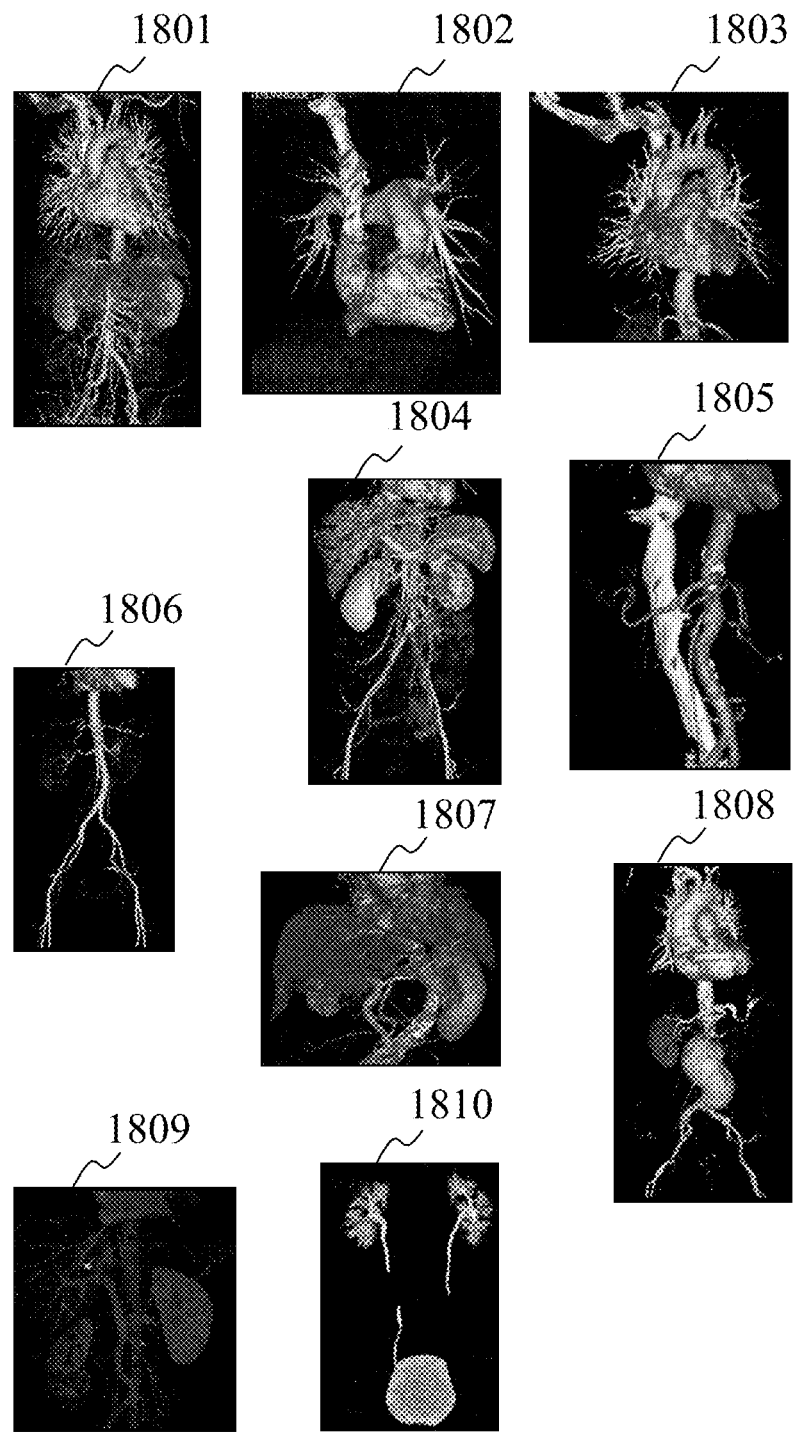
Figure 19:
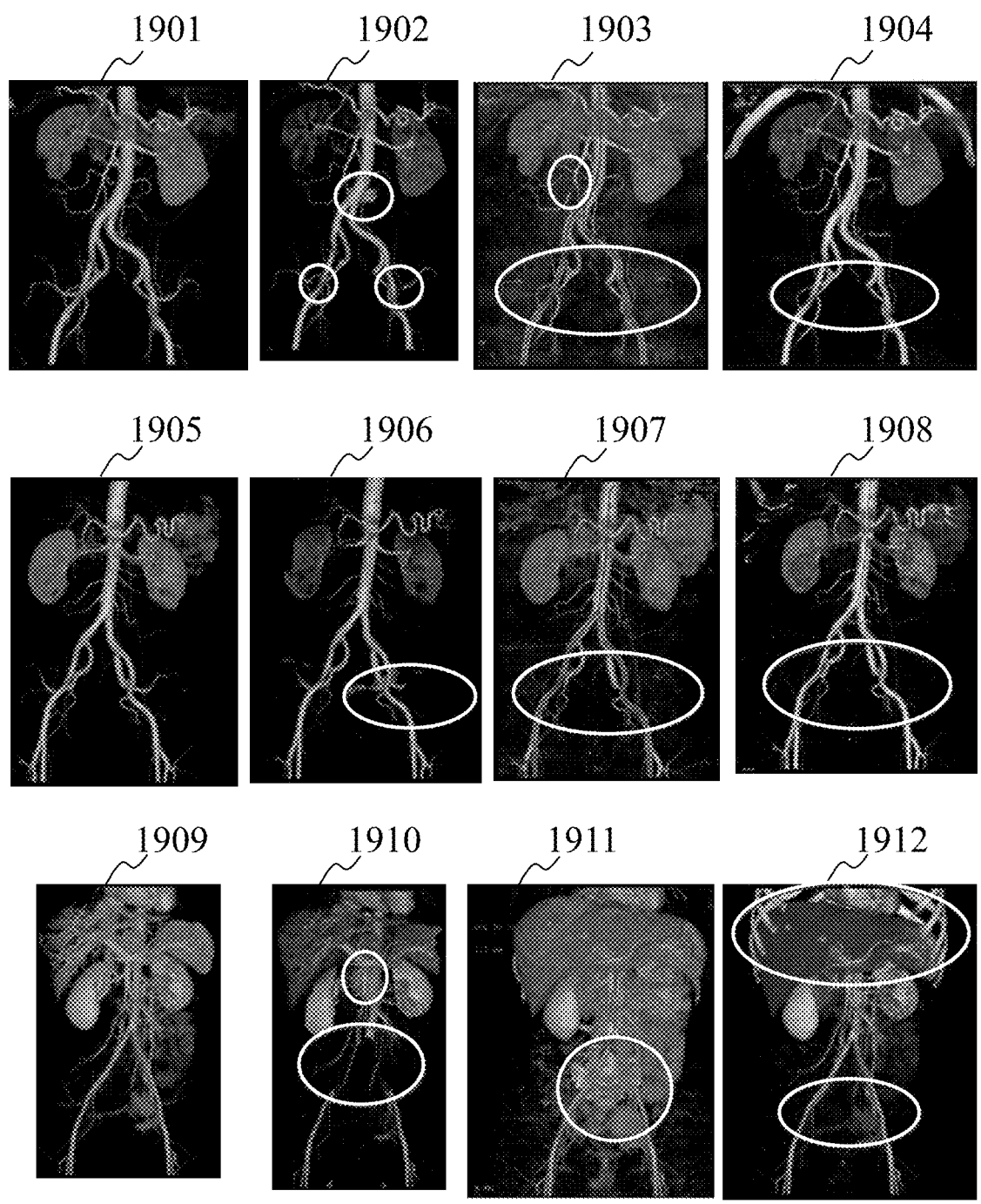

FIG. 4-A is a schematic diagram illustrating an exemplary processing module (240) according to some embodiments of the present disclosure;

FIG. 4-B is a schematic diagram illustrating an exemplary process for image processing according to some embodiments of the present disclosure;

FIG. 5-A is a schematic diagram illustrating an exemplary vessel segmentation sub-module according to some embodiments of the present disclosure;

FIG. 5-B is an exemplary diagram illustrating an exemplary process for vessel segmentation according to some embodiments of the present disclosure;

FIG. 6-A is a schematic diagram illustrating an exemplary vessel segmentation sub-module (600) according to some embodiments of the present disclosure;

FIG. 6-B is an exemplary diagram illustrating an exemplary process for vessel segmentation according to some embodiments of the present disclosure;

FIG. 6-C is a schematic diagram illustrating an exemplary vessel segmentation sub-module according to some embodiments of the present disclosure;

FIG. 6-D is a schematic diagram illustrating an exemplary process for vessel segmentation according to some embodiments of the present disclosure;

FIG. 7-A is a schematic diagram illustrating an exemplary first image generation unit according to some embodiments of the present disclosure;

FIG. 7-B is an exemplary diagram illustrating an exemplary process for generating the first image according to some embodiments of the present disclosure;

FIG. 8-A is a schematic diagram illustrating an exemplary subtraction image generation unit according to some embodiments of the present disclosure;

FIG. 8-B is an exemplary diagram illustrating an exemplary process for generating a subtraction image according to some embodiments of the present disclosure;

FIG. 9-A is a schematic diagram illustrating an exemplary vessel frame image generation sub-unit according to some embodiments of the present disclosure;

FIG. 9-B is a schematic diagram illustrating an exemplary process for generating a vessel frame image according to some embodiments of the present disclosure;

FIG. 9-C is a schematic diagram illustrating an exemplary process of a morphological combination between a coarsely-segmented vessel mask and a finely-segmented vessel mask according to some embodiments of the present disclosure;

FIG. 10-A is a schematic diagram illustrating an exemplary local image supplementation sub-unit according to some embodiments of the present disclosure;

FIG. 10-B is a schematic diagram illustrating an exemplary process for supplementing local images according to some embodiments of the present disclosure;

FIG. 11-A is a schematic diagram illustrating an exemplary process for supplementing a vessel frame image with abdominal viscera vessels according to some embodiments of the present disclosure;

FIG. 11-B is a schematic diagram illustrating an exemplary process for supplementing a vessel frame image with bone-adjacent vessels according to some embodiments of the present disclosure;

FIG. 11-C is a schematic diagram illustrating an exemplary process for locating a specific part of a human body in an image according to some embodiments of the present disclosure;

FIG. 12 is a schematic diagram illustrating an intermediate process and a result of a preliminary segmentation of bones according to some embodiments of the present disclosure;

FIG. 13 is a schematic diagram illustrating an exemplary outcome after the preliminarily segmented bones are removed according to some embodiments of the present disclosure;

FIG. 14 is a schematic diagram illustrating an exemplary outcome of a morphological combination of vessels according to some embodiments of the present disclosure;

FIG. 15 is a schematic diagram illustrating an exemplary outcome of extraction of liver, spleen, and kidneys according to some embodiments of the present disclosure;

FIG. 16 is a schematic diagram illustrating an exemplary outcome of extraction of bone-adjacent vessels in the abdomen according to some embodiments of the present disclosure; and FIGS. 17, 18, and 19 are schematic diagrams illustrating exemplary vessel extraction outcomes according to some embodiments of the present disclosure.

DETAILED DESCRIPTION

To describe the technical solutions of the embodiments of the present application more clearly, the drawings are briefly described as follows. Apparently, the drawings described in the following description merely illustrate examples or embodiments of the present disclosure. Based on these drawings, those skilled in the art may apply the present application to similar application scenarios without creative efforts. Unless apparent from the context or unless otherwise noted, the same reference number in the drawings denote the same structure or operation.

The terminology used herein is for the purpose of describing particular example embodiments only and is not intended to be limiting. As used herein, the singular forms a, an, and the may be intended to include the plural forms as well, unless the context clearly indicates otherwise. It will be further understood that the terms comprise, comprises, and/or comprising, include, includes, and/or including, when used in this specification, specify the presence of stated features, integers, steps, operations, elements, and/or components, but do not preclude the presence or addition of one or more other features, integers, steps, operations, elements, components, and/or groups thereof.

Flow charts are used in the present disclosure to illustrate operations performed by the system according to some embodiments of the present disclosure. It may be understood that the operations may unnecessarily be performed in the order as illustrated. Alternatively, the operations may be performed in a reverse order, or be performed at a same time. Operations may also be added into or removed from the illustrated processes.

In the image processing, "image segmentation," "image extraction," and "image classification" may be used interchangeably, which may refer to the identification of an image region satisfying a certain criterion from a larger image region. In some embodiments, the imaging system may include one or more modalities including but not limited to digital subtraction angiography (DSA), magnetic resonance angiography (MRA), computerized tomography angiography (CTA), ultrasound scans (US), positron emission tomography (PET), single photon emission computed tomography (SPECT), SPECT-MR, CT-PET, CE-SPECT, DSA-MR, PET-MR, PET-US, SPECT-US, US-CT, US-MR, X ray-CT, X ray-US, or the like, or a combination thereof. In some embodiments, a scan target for imaging may be an organ, an organism, a subject, an injured part, a tumor, or the like, or any combination thereof. In some embodiments, a scan target for imaging may be a head, a thorax, an abdomen, an organ, a bone, a vessel, or the like, or any combination thereof. In some embodiments, the scan target may be vessel tissue of one or more parts of a human body. In some embodiments, the image may be a two-dimensional image and/or a three-dimensional image. In the two-dimensional image, the smallest element may be a pixel. In the three-dimensional image, the smallest element may be a voxel. In the three-dimensional image, the image may include a series of two-dimensional slices or two-dimensional layers.

The image segmentation process may be performed based on corresponding features of image pixels/voxels. In some embodiments, corresponding features of pixels/voxels may include texture, gray scale, average gray scale, signal strength, color saturation, contrast, lightness, or the like, or any combination thereof. In some embodiments, the feature of spatial location of a pixel/voxel may also be used in the image segmentation process. In some embodiments, one or more structures in the image may be segmented. In some embodiments, performing operations on a structure reflected in an image may refer to performing the operations on a portion of the image corresponding to the structure in the image.

FIG. 1 is a schematic diagram illustrating an imaging system according to some embodiments of the present disclosure. An imaging system 100 may include an imaging device 110, a console 120, a data processing system 130, an input/output device 140, a network 170, and a storage device 180.

Different components/parts of the imaging system 100 may communicate with each other. For example, the data processing system 130 may be connected to or communicate with the network 170. As another example, the data processing system 130 may be directly connected to or communicate with another part of the imaging system 100 (e.g., the imaging device 110, the console 120, etc.). The imaging device 110, the data processing system 130, the storage device 180, the console 120, and the imaging system 100 may participate in data communication with another device. The communication may be implemented via a data cable, the network 170, or the like, or a combination thereof.

The imaging device 110 may scan a target subject to generate data and images relating to the target subject. In some embodiments, the imaging device 110 may be a device or a group of devices. In some embodiments, the imaging device 110 may be a medical imaging device, for example, a PET device, a SPECT device, a CT device, an MRI device, or the like. In some embodiments, the devices may be used separately or in combination (e.g., a PET-CT device, a PET-MRI device, or a SPECT-MRI device, etc.). In some embodiments, the imaging device 110 may include a scanner configured to scan the target subject and obtain relevant information (e.g., data). Further, the imaging device 110 may be a radiation scanning device. The device may include a radiation source for emitting radiation rays to the target subject. The radiation rays may include particle rays, photon rays, or the like, or any combination thereof. The particle rays may include neutrons, protons, alpha rays, electrons, muon, heavy ions, or the like, or any combination thereof. The photon rays may include X-rays, gamma rays, ultraviolet rays, laser beams, or the like, or any combination thereof. In some embodiments, the photon rays may be X-rays, and the corresponding imaging device 110 may be a CT system, a digital radiography system (DR), a multi-modality medical imaging system, or the like, or any combination thereof. In some embodiments, the multi-modality medical imaging system may include a CT-PET system, a SPECT-MRI system, or the like, or any combination thereof. In some embodiments, the imaging device 110 may include a ray generation unit and a ray detection unit (not shown). For example, the imaging device 110 may include a photon detector configured to perform ray generation and/or detection, or the like. In some embodiments, the photon detector may generate photons used for scanning the target subject or capturing photons after the photons traverse the target subject. In some embodiments, the imaging device 110 may be a CT imaging system or a CT-based multi-modality medical imaging system, and the photon detector may include an X-ray detector.

The image data generated by the imaging device 110 may be processed according to a certain coordinate system. In some embodiments, the image data may be processed according to a Cartesian coordinate system. In a Cartesian coordinate system, the X direction (direction of the X axis) may be a direction of a coronal axis (a direction of the line of intersection of a coronal plane and a transverse plane), for example, a direction from the right side to the left side of a subject to be imaged, or a direction from the left side to the right side. The Y direction (direction of the Y axis) may be a direction of a sagittal axis (a direction of the line of intersection of a sagittal plane and a transverse plane), for example, a direction from the anterior to the posterior of a subject to be imaged, or a direction from the posterior to the anterior. The Z direction (direction of the Z axis) may be a direction of a vertical axis (a direction of the line of intersection of a coronal plane and a sagittal plane), for example, a direction from the inferior to the superior of a subject to be imaged, or a direction from the superior to the inferior. It may be noted that the X, Y and Z axes shown in FIG. 1 are merely for demonstration purposes, and not intended to limit the x, y and z axes in this application to the one shown in FIG. 1.

The console 120 may be configured to control the imaging device 110, the input/out device 140, and/or the data processing system 130. In some embodiments, the console 120 may control an X-ray generation unit and/or an X-ray detection unit in the imaging device 110. The console 120 may cause the imaging device 110, the input/out device 140, and/or the data processing system 130 to receive information from or sent information to the above system/device. In some embodiments, the console 120 may receive an image signal or data related to the target subject from the imaging device 110. The console 120 may send the image signal or data related to the target subject to the data processing system 130. The console 120 may receive processed data or a reconstructed image from the data processing system 130. The console 120 may send the processed data or reconstructed image to the input/out device 140. In some embodiments, the console 120 may include a computer, a program, an algorithm, a software, a storage device, an interface, or the like. The interfaces may include those between the imaging device 110, the input/out device 140, the data processing system 130, and/or other modules or units in the imaging system.

In some embodiments, the console 120 may receive instructions from a user (e.g., a doctor, an imaging technician, etc.). The console 120 may obtain the instructions of the user from the input/out device 140. The console 120 may receive instructions or generate instructions to control the imaging device 110, the input/out device 140, and/or the data processing system 130. For example, the console 120 may process the data inputted by a user through the input/out device 140, and convert the data into one or more corresponding instructions. The instructions may include a scan time, location information of a scan subject, a rotation speed of a gantry of the imaging device 110, a scanning parameter, or the like, or any combination thereof. The console 120 may cause the data processing system 130 to select different algorithms for processing the image data.

The data processing system 130 may process the information from the imaging device 110, the console 120, the network 170, and/or the input/out device 140. In some embodiments, the data processing system 130 may generate one or more images (for example, CT images) based on the image data from the imaging device 110. The data processing system 130 may send images to the input/out device 140. The data processing system 130 may perform various operations relating to the data and the image processing, for example, data preprocessing, data transformation, data cleaning, fitting, weighting, or the like, or any combination thereof. The data processing system 130 may perform data and image processing based on various algorithms, such as Fourier transformation, filtered back projection, iterative reconstruction, histogram dilation, image optimization, level-set algorithm, or the like, or any combination thereof. In some embodiments, the data processing system 130 may process a vessel related image. For example, the data processing system 130 may identify thoracic and abdominal bones 150, abdominal vessels 160, lower limb vessels, vessel centerlines, or vessels of other parts. In some embodiments, the data processing system 130 may locate a vessel or a bone, for example, locate a rib, an ilium, a sacrum, a tibia, an iliac artery, or the like, in the image based on various algorithms or techniques.

In some embodiments, the data processing system 130 may generate control signals relating to the imaging device 110. In some embodiments, the data that is processed (or not) by the processing system 130 may be sent to other modules or units in the system. The other modules or units may be databases (not shown), and/or terminals (not shown) connected to the network 170. The data processing system 130 may store the data that is processed or not. In some embodiments, the corresponding data information of the data processing system 130 may be further processed and sent to a corresponding storage device for storage, or be sent to a terminal.

The input/out device 140 may receive, send, or display information. In some embodiments, the input/out device 140 may include a keyboard, a touch device, a mouse, an audio-input device, an image input device, a remote control, or the like, or any combination thereof. The input/out device 140 may output a program, software, an algorithm, data, a signal, text, a number, an image, an audio, or the like, or any combination thereof. In some embodiments, the user may input several original parameters, or set a corresponding initialization condition of image processing. In some embodiments, some input information may be from an external data source (for example, a floppy disk, a hard disk, a compact disc (CD), a memory chip, a wired terminal, a wireless terminal, or the like, or any combination thereof). The input/out device 140 may receive information from other modules or units in the system or send information to other modules or units in the system. In some embodiments, the input/out device 140 may send the information to a terminal (for example, a display screen, a projector, a printer, a storage device, a computing device, or the like, or any combination thereof) so as to perform corresponding operations. In some embodiments, the input/out device 140 may include a graphical user interface to display information of different stages of the imaging process, or an outcome of the image processing (for example, an image histogram, a bone mask, a vessel mask, an vessel related image that is obtained through image conversion, or the like, or any combination thereof). The graphical user interface may provide a user with suggestions on input parameters, or enable the user to participate in the data processing procedure (e.g., starting or stopping the processing procedure, selecting or modifying operation parameters, selecting or modifying algorithms, modifying programs, logging out from the system, maintaining the system, upgrading or updating the system, etc.).

The network 170 may be a single network or a combination of various networks. For example, the network 170 may be a local area network (LAN), a wide area network (WAN), a public switched telephone network (PSTN), a virtual network (VN), or any combination thereof. The network 170 may further include a plurality of network access points, and may use a wired network architecture, a wireless network architecture, and a wired/wireless hybrid network architecture. The wired network may include a connection formed by metallic cables, composite cables, optical cables, or the like, or any combination thereof. The wireless network may include Bluetooth™, a wireless network (Wi-Fi), ZigBee, Near Field Communication (NFC), a cellular network (e.g., GSM, CDMA, 3G, or 4G, etc.), or the like, or any combination thereof. The network 170 within the scope of the present disclosure is not limited to the above description.

The storage device 180 may store data. The storage device 180 may store data generated or obtained by the imaging system 100, for example, scan data, data generated during the operation of one or more components of the imaging system 100, data input by a user through the input/out device 140, data obtained by the imaging system 100 via the network 170 from other data sources (not shown in FIG. 1), or the like. The storage device 180 may be a device/component having a storage function, or a combination of several devices/components. In some embodiments, the storage device 180 may include one or more standalone devices having a data storage function, for example, a computer, a server, or the like. The storage device 180 may include a local storage device or a remote storage device (e.g., cloud storage constructed over the network 170, etc.). In some embodiments, the storage device 180 may include a component having a data storage function in an independent device, such as a disk, a disk array, or the like. The storage device 180 may include any component having a storage function in any device (e.g., the imaging device 110, the data processing system 130, the input/out device 140, etc.) of the imaging system 100.

In some embodiments, the imaging device 110, the console 120, the data processing system 130, the storage device 180, and the input/out device 140 may be directly connected, or indirectly connected with each other. In some embodiments, the imaging device 110, the console 120, the data processing system 130, the storage device 180 and the input/out device 140 may be directly connected with each other via the network 170. In some embodiments, two or more of the imaging device 110, the console 120, the data processing system 130, the storage device 180, and the input/out device 140 may be integrated into one device. For example, the console 120, the data processing system 130, the input/output device 140, and the storage device 180 may be integrated into a computing device. In some embodiments, the imaging device 110, the console 120, the data processing system 130, the storage device 180 and the input/out device 140 may be indirectly connected via one or more intermediate units (not shown). The intermediate unit may be physical, or non-physical (e.g., radio waves, optical, sonic, electromagnetic, or the like, or any combination thereof). Difference modules and units may be connected through wireless and/or wired connections.

It may be noted that the description of the imaging system 100 is merely provided for the convenience of description, and the embodiments are not intended to limit the scope of the present disclosure. It should be understood that, for those skilled in the art, after understanding the principle of the system, without deviating from the principle, modules may be combined or constructed into a sub-system connecting with other modules, and such various modifications and changes in form and detail may be made in the application of the aforementioned technique and system. The CT system is provided as merely an exemplary embodiment of the imaging device 110, and not intended to limit the present disclosure within the described embodiments. The CT system may be applied in different fields, for example, medicine or industry. In addition, the CT system may further use a detection outcome in various analyses, for example, diagnostic analysis, security inspection, flaw detection, quantitative analysis, invalidity analysis, or the like, or any combination thereof.

Figure 2:
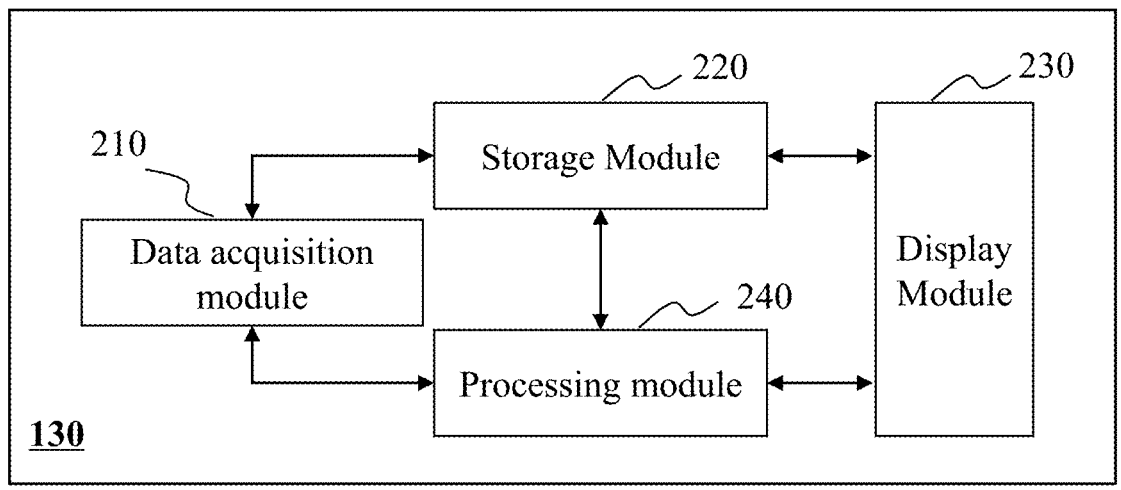
FIG. 2 is a schematic diagram illustrating a data processing system according to some embodiments of the present disclosure.

FIG. 2 is a schematic diagram illustrating a data processing system (130) according to some embodiments of the present disclosure. Data processing system 130 may include one or more data acquisition modules 210, one or more storage modules 220, one or more display modules 230, and one or more processing modules 240. The modules may be directly (and/or indirectly) connected with each other.

The data acquisition module 210 may obtain data. The obtained data may be from the imaging device 110 and/or the console 120. In some embodiments, the data may be obtained from an external data source via the network 170. The data may be used for generating or displaying a three-dimensional image and/or a two-dimensional image. The data may be examination data of a specific part set based on the need of an examination, which may be, for example, panoramic scanning of a target subject, a thorax, a lung, a lower limb, bronchi, a bone, a vessel, or the nerve distribution of a target subject, or the like, or any combination thereof. In some embodiments, the data may be angiography data.

In some embodiments, the data acquisition module 210 may obtain the original data, data obtained by processing the original data, or parameters of the image processing. The original data may represent data of one or more regions, one or more tissues, and/or one or more organs obtained by the imaging device 110, and may be used for generating one or more corresponding images. The original data may be used for generating an original image. The original image may be an image obtained by directly converting the original data before any further image processing is performed. The original image may represent one or more internal regions, organs, and/or tissues of a human body. For example, the original image may include a vessel, a bone, and/or other organs or tissue (for example, a liver, a spleen, a kidney).

It should be noted that the name of the image is merely for the convenience of description, and the organ or tissue represented by the image may not perfectly match the name of the image. For example, to obtain an image of tissue A through a segmentation with an algorithm, the generated image of tissue A may include a part representing tissue A and a part representing tissue B. This situation may be referred to as an over-segmentation of tissue A; that is, image data of tissue B and/or other tissues are included in the image of tissue A by error in the segmentation. In some embodiments, the part representing tissue B may have a higher ratio in the generated image of tissue A than that of the part representing tissue A. In some embodiments, unless specifically emphasized, an image of a type of tissue, which is obtained by segmentation, may include a region representing only a portion or all of the tissue. For example, when an image including tissue C is segmented with an algorithm, a portion of the image regions representing tissue C may not be successfully segmented, and the generated tissue C image may include only a portion of (or incomplete) tissue C; this phenomenon may be referred to as an under-segmentation of tissue C. In some embodiments, the image obtained via an under-segmentation may include none of image parts or pixels representing the organ or tissue to be segmented (e.g., due to a failed segmentation). The over-segmentation and under-segmentation may both occur in one segmentation process based on the adopted algorithms and/or algorithm parameters. For example, when an image of tissue D is segmented with an algorithm, a portion of the image region representing tissue D may not be successfully segmented, and an image region representing tissue E may be over-segmented to be included in the generated tissue D image. In some embodiments, the generated image of tissue D may only include the portion representing tissue E. It may be noted that the tissue recited in the present disclosure may also refer to an image that includes a part representing the tissue.

The storage module 220 may store data or information. The stored data or information may from the imaging device 110, the console 120, and/or other modules/units in the data processing system 130 (the data acquisition module 210, the display module 230, the processing module 240, or other related modules (not shown)). The stored data or information may be in various forms, for example, a value, a signal, an image, information on the target subject, instructions, an algorithm, a program, or the like, or any combination thereof. In some embodiments, the stored data may be a vessel image, a vessel image parameter, data of the processed vessel image, a program and/or an algorithm adopted in the processing of the vessel image, or the like. The storage module 220 may include a hard disk, a floppy disk, a random access memory (RAM), a dynamic random access memory (DRAM), a static random access memory (SRAM), a bubble memory, a thin film memory, a magnetic plated wire memory, a phase change memory, a flash memory, a cloud disk, or the like, or any combination thereof. The storage module 220 may provide temporary storage for data, that is, data to be transferred for the next data processing. The storage module 220 may provide long-term storage for the data, that is, storage of a final outcome of data processing. The storage module 220 may be a fixed storage system (e.g., a disk, etc.), and/or a mobile storage system (e.g., a USB port, a live wire port, or the like, and/or a drive such as a disk drive, etc.), or the like. The storage module 220 may be connected to one or more data acquisition modules 210, display modules 230, processing modules 240, or other related modules (not shown). In some embodiments, the storage module 220 may be selectivity connected to one or more virtual storage resources (e.g., cloud storage, a virtual private network, and/or other virtual storage resources) via the network 170.

The display module 230 may display data. The displayed data and information may be from the data acquisition module 210, the storage module 220, and/or the processing module 240, or the like. The displayed data may be sent to the input/output device 140. In some embodiments, the display module 230 may send the image obtained by the processing module 240 to a terminal for display. In some embodiments, the display module 230 may directly display relevant data and information from the network 170 or the storage module 220. The displayed data may be presented in various forms, including acoustic forms (e.g., sound) and/or visualized forms (e.g., text, videos, graphs, etc.), or any combination thereof. For example, the data may be broadcasted by headphones, loudspeakers, etc., displayed on a display screen, or printed by a printer, etc. The displayed data may be in various forms, including a value, a signal, an image, information on the target subject, instructions, an algorithm, a program, or the like, or any combination thereof. In some embodiments, the display module 230 may display images including information on vessels (e.g., a histogram, a grayscale image, a mask image, a coarsely-segmented image, or a finely-segmented image of the vessels, a bone segmentation image).

The processing module 240 may process relevant data, and construct an image based on corresponding data. The data may be from the data acquisition module 210, the storage module 220, and/or other modules that are not shown. Alternatively or additionally, the data may also be obtained from an external data source via the network 170. The corresponding constructed images may be sent to the display module 230, or the like. The data processed by the processing module 240 may include original data of a particular part of the target subject, for example, the brain, the heart, a vessel, a lung, the liver, the spleen, a kidney, a bone, or the like, or any combination thereof. For example, the processing module 240 may process original data corresponding to abdominal vessels and lower limb vessels. The processing module 240 may process data in various ways. In some embodiments, a user may select data that needs to be processed, for example, vessels of a specific part in the image may be selected for processing. In some embodiments, one or more algorithms may be adopted to process the data, such as histogram fitting, image transformation, data weighting, or the like.

The processing module 240 may include a general purpose processor. The processor may include a programmable logic device (PLD), an application specific integrated circuit (ASIC), a microprocessor, a system on chip (SoC), a digital signal processor (DSP), or the like, or any combination thereof. In some embodiments, two or more processors may be integrated into one device. In some embodiments, two or more devices may be separated from or connected with each other. The processor may process data in various ways, for example, by hardware, software, or a combination thereof, or the like.

It may be noted that the description of data processing system 130 is merely provided for the convenience of description, and the embodiments are not intended to limit the scope of the present disclosure. It may be understood that, for those skilled in the art, after understanding the principle of the system, without deviating from the principle, modules may be combined or constructed into a subsystem connected with other modules, and such various modifications and changes in form and detail may be made in the application of the aforementioned technique and system.

Figure 3:
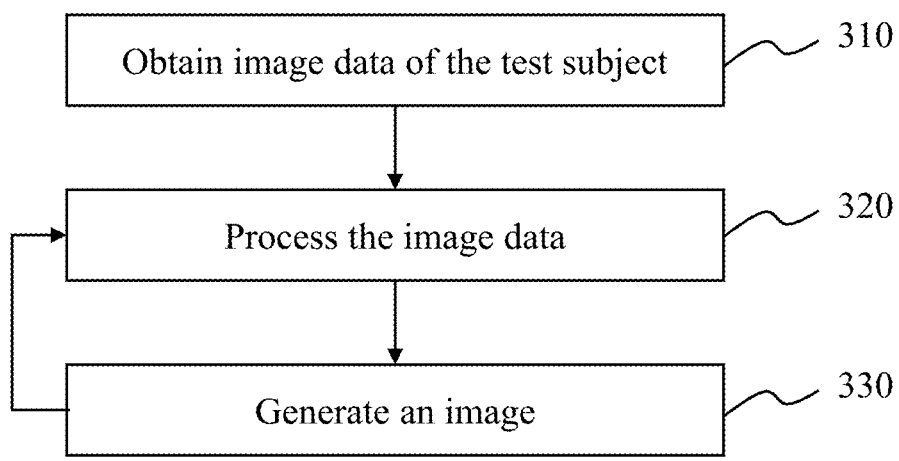
FIG. 3 is a schematic diagram illustrating an exemplary process of image generation according to some embodiments of the present disclosure.

FIG. 3 is a schematic diagram illustrating an exemplary process of image generation according to some embodiments of the present disclosure. Process 300 may include obtaining image data of a scan subject 310, processing the image data 320, and generating an image 330. Process 300 may be performed by the data processing system 130. One or more operations in process 300 may be performed by one or more modules of the data processing system 130.

In 310, image data of the scan subject may be obtained. The image data may be original data or data generated based on the original data. The scan subject may be a human body, an animal, or a part thereof, such as an organ, tissue, a lesion, a tumor, or any combination thereof. For example, the scan subject may be a head, a thorax, an abdomen, a heart, a liver, a spleen, a kidney, an upper limb, a lower limb, a vertebra, a bone, a vessel, or the like, or any combination thereof. The image data of the scan subject may be two-dimensional image data or three-dimensional image data. The image data of the scan subject may be MRA image data, CTA image data, and/or PET image data, or the like, or any combination thereof. In some embodiments, the obtaining the image data of the scan subject may be performed by the data acquisition module 210. In some embodiments, the image data of the scan subject may be obtained from the storage module 220. In some embodiments, the image data of the scan subject may be obtained from an external data source via the network 170. In some embodiments, the image data of the scan subject may be obtained from the input/output device 140.

In 320, the obtained image data of the scan subject may be processed. The image data processing may include one or more sub-operations. In some embodiments, the image data processing may be performed by the processing module 240. In some embodiments, the image data processing may include deleting unreliable data or correcting data values. In some embodiments, the image data processing may include removing data noise through filtering. In some embodiments, image data processing in operation 320 may include image segmentation, image rendering, image transformation, or the like, or any combination thereof. In some embodiments, the image data processing may be based on one or more algorithms, for example, an image dilation algorithm, an image erosion algorithm, a region growing algorithm, a level-set algorithm, a gradient descent algorithm, a single-source shortest paths algorithm, or the like, or any combination thereof.

In 330, an image may be generated according to the image data processed in 320. The image generation may be performed by the display module 230 or the processing module 240. The image generation may be based on one or more algorithms, for example, an image conversion algorithm, an image display algorithm, or the like, or any combination thereof. The image conversion algorithm may include a conversion from the frequency domain to the image domain, a conversion of a grayscale image, or the like. The image display algorithm may include algorithms for adjusting image parameters such as color, contrast, brightness, or the like.

It may be noted that the above description of the process of image generation is only a specific example and should not be considered as the only possible embodiment. It will be apparent for those skilled in the art that after understanding the basic principle of the image generation process, without deviating from the principle, various modifications and changes in form and detail may be made in the implementations and operations of the image generation procedure, simple derivations or changes may also be made without any creative efforts, the order of individual operations may be adjusted, or individual operations may be combined, and such modifications and changes are still within the scope of the above description. In some embodiments, 320 and 330 may be combined into one independent operation. In some embodiments, after image generation operation 330 is performed, process 300 may return to operation 320 to further process the image data. In some embodiments, image generation operation 330 and image data processing operation 320 may be performed simultaneously. In some embodiments, one or more operations may be added into process 300, or removed from process 300. For example, before operation 310, an operation for scanning the scan subject may be added, and the scan subject may be scanned by the imaging device 110. As another example, a data storage operation may be added between or after operations 310, 320, and/or 330. The data may be stored in the storage module 220 and/or the storage device 180.

FIG. 4-A is a schematic diagram illustrating an exemplary processing module (240) according to some embodiments of the present disclosure. The processing module 240 may include a pre-processing sub-module 410, a vessel segmentation sub-module 420, and a post-processing sub-module 430.

The pre-processing sub-module 410 may pre-process an image. The image pre-processing may make the image more suitable for extracting vasculature (or be referred to as vessel segmentation). The image pre-processing may include image normalization, image reconstruction, image smoothing, image compression, image enhancement, image matching, image registration, geometric image correction, image fusion, image inpainting, or elimination of image distortion, noise, or the like, or any combination thereof. In some embodiments, the pre-processing sub-module 410 is unnecessary.

The vessel segmentation sub-module 420 may segment a vessel from the image including the vessel. The segmented vessel may include vessels of one or more sites of the scan subject, for example, head and neck vessels, thoracic vessels, abdominal vessels, upper limb vessels, lower limb vessels, or foot vessels. The segmented vessels may include vessels within an organ of the subject, for example, brain blood vessels, blood vessels of the heart, hepatic vessels, spleen blood vessels, or kidney blood vessels. In some embodiments, the vessel segmentation sub-module 420 may segment a characteristic line of a vessel. A vessel characteristic line may refer to one or more lines, points, or any combination thereof, for describing a feature (or features) of the vessel, such as a vessel centerline, a vessel boundary line, a vessel endpoint, or the like. The vessel characteristic line may be a collection of one or more pixels/voxels located within or on the boundary of the vessel. In some embodiments, a vessel centerline may refer to a line located at or near the center of the vessel, or a line indicating the direction along which the vessel extends. In some embodiments, the vessel centerline may refer to a line connecting pixels/voxels with equal or similar distances to the boundaries of the vessel. In some embodiments, a vessel boundary line may refer to a line located on or near a wall of the vessel and may represent the boundary line between the vessel and non-vessel tissue(s). The vessel may include a collection of pixels/voxels along the vessel centerline and along a vessel boundary line. A vessel endpoint may refer to one or more pixels/voxels at one of the ends of the vessel. In some embodiments, an end of the vessel may be an anatomical end of the vessel. In some embodiments, an end of the vessel may be an end of a vessel segment within a range set by a user or a computer, for example, an end of a vessel within a displayable range of an image.

In some embodiments, the vessel segmentation sub-module 420 may include a storage unit for storing one or more programs or algorithms to implement, for example, a threshold based segmentation algorithm, an edge-based segmentation algorithm, a region-based segmentation algorithm, a segmentation algorithm based on cluster analysis, a segmentation algorithm based on wavelet transformation, an algorithm based on mathematical morphology, an algorithm based on artificial neural network, an algorithm based on genetic algorithm, and an algorithm for combining vessels of the same or different parts.

The post-processing sub-module 430 may perform post-processing to an image. In some embodiments, the post-processing sub-module 430 may convert the post-processed image into a visualized format. The visualized image may be a grayscale image or a color image. The visualized image may be a two-dimensional image or a three-dimensional image. The visualized image may be displayed via an input/output device 140, or printed by a printer. In some embodiments, the image used for post-processing may be obtained from the pre-processing sub-module 410 and/or the vessel segmentation sub-module 420.

FIG. 4-B is a schematic diagram illustrating an exemplary process for image processing according to some embodiments of the present disclosure. Process 435 may be included in operation 320. Process 435 may include pre-processing an image 440, segmenting a vessel 450, and post-processing the vessel segmentation image 460. Process 435 may be performed by the processing module 240. One or more operations in process 435 may be performed by one or more sub-modules of the processing module 240.

In 440, an image to be segmented may be obtained by pre-processing the original image. The image pre-processing may be performed by the pre-processing sub-module 410. The image pre-processing may include an image smoothing, an image denoising, an image enhancement, or the like, or any combination thereof. For example, the image pre-processing may include one or more image processing manners such as denoising, artifact removal, enlargement, shrinking, brightness adjustment, coloring, or the like. The image smoothing may be performed in the image domain or the frequency domain. In some embodiments, in the image domain smoothing, the image pixels/voxels may be directly processed. In some embodiments, the frequency domain smoothing may include converting an image of the image domain into an image of the frequency domain, then processing the image of the frequency domain, and finally converting the processed image of the frequency domain into an image of the image domain. The image smoothing may include median smoothing, Gaussian smoothing, average smoothing, normalized smoothing, bilateral filtering smoothing, or the like, or any combination thereof. The image denoising may be performed to remove image noise. In some embodiments, the image denoising may adopt one or more denoising models, for example, Gaussian filtering, an anisotropy diffusion equation model, bilateral filtering, a total variation model, wavelet transform filtering, or non-local means filtering, or the like.

In 450, a vessel may be segmented and one or more vessel segmentation images may be obtained. The vessel segmentation may be performed by the vessel segmentation sub-module 420. The vessel segmentation may be based on the outcome of the pre-processing in operation 440. In some embodiments, the vessel segmentation may be based on the data directly obtained from the data acquisition module 210, the storage module 220, or the input/output device 140, or data obtained from the external data source via the network 170. The vessel segmentation may be performed based on one or more image segmentation algorithms, for example, a gradient descent algorithm, a threshold based algorithm, a region growing algorithm, a level set algorithm, region segmentation and/or merging, an edge tracking segmentation algorithm, a statistical pattern recognition algorithm, a mean clustering segmentation algorithm, a manual calibration algorithm, a topology refinement algorithm, a distance transformation algorithm, or any combination thereof. In some embodiments, the vessel segmentation algorithm(s) may be stored in the vessel segmentation sub-module 420, the storage module 220, or mobile storage devices (e.g., a portable hard disk, a USB flash disk, etc.). In some embodiments, a vessel segmentation algorithm may be obtained from one or more external data sources via the network 170.

In 460, the post-processing may be performed to one or more vessel segmentation images. The vessel segmentation images may be generated based on the outcome of the vessel segmentation in operation 450. The vessel segmentation images may be post-processed by the post-processing sub-module 430. The vessel segmentation images that are post-processed may be color images or grayscale images. Operation 460 may include one or more post-processing operations. The post-processing operations may adopt two-dimensional post-processing techniques, for example, a multi-planar reconstruction technique, a cured surface reconstruction technique, a volume reconstruction technique, a volume rendering technique, or the like, or any combination thereof. The post-processing operation may adopt three-dimensional post-processing techniques, for example, a three-dimensional surface reconstruction technique, a three-dimensional volume reconstruction technique, a volume intensity projection technique, a maximum intensity projection technique, a minimum intensity projection technique, an average density projection technique, or the like, or any combination thereof. Other possible techniques may include inpainting, rendering, filling, or the like, or any combination thereof.

It may be noted that the above description of the processing module and the image processing process is only a specific example and should not be considered as the only possible embodiment. Each of the aforementioned sub-modules may be implemented by one or more components, and the function of each sub-module is not limiting. Each of the aforementioned sub-modules may be added or removed based on needs. It will be apparent for those skilled in the art that, after understanding the basic principle of the image processing, without deviating from the principle, various modifications and changes in form and detail may be made in the implementations and operations of the image processing, simple derivations or changes may also be made without any creative efforts, the order of individual operations may be adjusted, or individual operations may be combined, and such modifications and changes are still within the scope of the above description. For example, the pre-processing sub-module 410 and/or operation 440 may be omitted. As another example, operations 440 and 450 may be combined into one operation. As a further example, operations 450 and 460 may be performed simultaneously or alternately.

FIG. 5-A is a schematic diagram illustrating an exemplary vessel segmentation sub-module (500) according to some embodiments of the present disclosure. Vessel segmentation sub-module 500 may be an example of the vessel segmentation sub-module 420. The vessel segmentation sub-module 500 may include an image input/output unit 501, a first image generation unit 502, a subtraction image generation unit 504, and/or a target image generation unit 504.

The image input/output unit 501 may input and/or output an image. The image may include a vessel, and/or non-vessel tissue (e.g., a bone, fat, a muscle, or other tissues, etc.). In some embodiments, the input image may be an image obtained by the image obtaining module 210, an image pre-processed by the pre-processing sub-module 410, an image inputted by the input/output device 140, an image stored in the storage device 180, and/or an image obtained via the network 170. The image outputted by the image input/output unit 501 may be a vessel image/mask obtained by vessel segmentation, an image/mask generated during the vessel segmentation (e.g., an image/mask representing bones, fat, muscle, and/or other tissue). In some embodiments, the image outputted by the image input/output unit 501 may be an image generated by the first image generation unit 502, an image generated by the subtraction image generation unit 503, and/or an image generated by the target image generation unit 504.

The first image generation unit 502 may generate one or more first images. A first image may refer to an image representing one or more organs/tissue other than the one(s) represented by the target image. In the present disclosure, an image representing or including an organ/tissue may be briefly referred to as an organ/tissue image. For example, an image representing or including a section of the vessel may be referred to as a vessel image for brevity. As another example, an image representing or including one or a set of bones may be referred to as a bone image for brevity. In some embodiments, the first image and the target image may include different tissue included in the same image. For example, if the target image is a vessel image, the first image may include one or more bone images. The bone image may include pixels/voxels representing bone tissue (or one or more bones). The bone tissue may include a lower limb bone, for example, a tibia, an ilium, a sacrum, and/or a foot metacarpal bone, or the like. In some embodiments, the bone tissue may include thoracic and/or abdominal bone tissue, for example, dorsal vertebrae, lumbar vertebrae, and/or ribs, or the like. In some embodiments, the bone tissue may include bone tissue of the head and/or neck, such as the skull, and/or cervical vertebrae.

In some embodiments, the first image generation unit 502 may obtain one or more bone images from the image to be segmented based on an image segmentation algorithm (e.g., a region growing algorithm, a threshold based algorithm, a gradient based algorithm, etc.). In some embodiments, the first image generation unit 502 may over-segment one or more non-bone tissue (e.g., a vessel, fat, muscle, and/or other tissues) while segmenting bones. In some embodiments, during the generation of the first image, the first image generation unit 502 may perform operations such as image dilation, erosion, filling, rotation, cropping, translation, or the like, or a combination thereof.

The generated first image may facilitate the generation of the target image. In some embodiments, by subtracting the first image from the image to be segmented or an image generated from the image to be segmented, an image of the remaining tissue (or a subtraction image, see relevant description of the subtraction image generation unit 503) may be obtained. In some embodiments, information needed for further processing to obtain the target image may be obtained based on the image including the remaining tissue. In some embodiments, the first image may be used for locating an extraction region of the target image. For example, given that the first image is a bone image, after a specific bone (e.g., a tibia, a ilium, a sacrum, and/or a foot metacarpal bone, etc.) in the first image is identified, based on a region where the identified specific bone is located, a portion of the target image may be extracted from the image to be segmented or from an image generated based on the image to be segmented.

In some embodiments, the first image may be configured to obtain a first target image and/or a second target image. The second target image and the first target image may represent or include different structures, such as organs, tissue, or the like. For example, the first target image may include or represent a length of a vessel of a patient, and the second target image may include or represent a bone located at the same or near the position of the vessel of the patient. The second target image and the first target image may be shown by the display module 230 independently or simultaneously.

The subtraction image generation unit 503 may generate a subtraction image based on the first image and/or the image to be segmented. The subtraction image may refer to an image obtained by subtracting a portion of or the entire first image from the image to be segmented or an image/mask generated based on the image to be segmented. The subtraction image may include a portion of or the entire target image. For example, when the target image is a vessel image, the subtraction image may include a portion or all of the target vessel(s). Furthermore, the subtraction image may also include an image of a bone and/or other tissue. In some embodiments, the subtraction image generation unit 503 may directly perform a subtraction operation on the image to be segmented and the first image to generate the subtraction image. In some embodiments, the subtraction image generation unit 503 may generate a second image based on the image to be segmented (for example, by image segmentation, image erosion, image dilation, image cropping, image translation, or the like, or a combination thereof), and subtract the second image from the first image (or subtract the first image from the second image) to generate the subtraction image.

The subtraction image may be used for generating the target image. In some embodiments, the subtraction image may be used for obtaining one or more image segmentation parameters (e.g., seeds, thresholds) for obtaining the target image. The target image may be extracted, based on the segmentation parameters, from the image to be segmented or from one or more images generated based on the image to be segmented. In some embodiments, the subtraction image may be used for obtaining a frame image. The frame image may be a portion of the target image. In some embodiments, when the target image is a vessel image, the frame image (or vessel frame image) may include a vessel with a larger diameter than other vessel(s) in the image. In some embodiments, when the target image includes a vessel adjacent to a bone, the vessel frame image may include a vessel adjacent to the bone but spaced apart by a certain distance from the bone (for example, a distance satisfying a certain threshold). In some embodiments, when the target image includes the blood vessel(s) of a viscus (e.g., a liver, a spleen, and/or a kidney, etc.), the vessel frame image may include vessels other than the blood vessels of the viscus. In some embodiments, the vessel frame image may provide one or more seeds (may also be referred to as seed points, seed pixels, or seed voxels) or connection points, as well as corresponding data obtaining parameters (e.g., thresholds, threshold gradients, etc.), for the extraction of the target image. In some embodiments, the target image may be obtained by supplementing the vessel frame image.

The target image generation unit 504 may generate the target image. A target image in the present disclosure may refer to an image that is desired to be finally obtained after an image segmentation operation and/or an image operation. In some embodiments, the target image may refer to an image of tissue or an organ in a human body, for example, a vessel image generated by a vessel segmentation process. The target image may be subject to subsequent analysis or presented. The target image may be expressed in different forms, such as a number, a one-dimensional or multi-dimensional image, a histogram, or the like, or any combination thereof.

In some embodiments, the target image may be a vessel image. The vessel image may refer to an image corresponding to one or more vessels. The one or more vessels may be an artery, a vein, or the like. In some embodiments, the vessels may include lower limb vessels, for example, iliac arteries (or veins), femoral arteries (or veins), popliteal arteries (or veins), tibial arteries (or veins), peroneal arteries (or veins), ankle arteries (or veins), and/or pedal arteries (or veins) etc. In some embodiments, the vessels may include abdominal vessels, for example, an abdominal aorta (or vein), a hepatic artery (or vein), a splenic artery (or vein), and/or a renal artery (or vein), etc. In some embodiments, the vessels may include thoracic vessels, for example, an intercostal artery (or vein), a pulmonary artery (or vein), aorta (or vena cardinalis), a bronchial artery (or vein), an esophageal artery (or vein), and/or a gastric artery (or vein), etc. In some embodiments, the vessels may include upper limb vessels, for example, an axillary artery (or vein), a brachial artery (or vein), a radial artery (or vein), and/or an ulnar artery (or vein). In some embodiments, the vessels may include blood vessels in or near the brain and the neck, for example, a left/right internal carotid artery (or vein), a left/right external carotid artery (or vein), a left/right common carotid artery (or vein), a vertebral artery (or vein), an occipital artery (or vein), a posterior auricular artery (or vein), superficial temporal artery (or vein), a lingual artery (or vein), an ophthalmic artery (or vein), a cerebral artery (or vein), etc. In some embodiments, the vessel image may further include an image of capillaries connected with the aforementioned arteries (or veins). In some embodiments, the vessel image may include a vessel related image and/or model, for example, a vessel centerline, a vessel boundary line, a vessel endpoint, or the like.

In some embodiments, the target image generation unit 504 may generate the target image based on an image (e.g., a vessel image, a bone image, a fat image, and/or an image of other tissue, etc.) inputted by the image input/output unit 501, and/or the first image (e.g., a bone image, a fat image, and/or other tissue images, or the like) extracted by the first image generation unit 502. In some embodiments, the target image generation unit 504 may generate the target image based on the subtraction image generated by the subtraction image generation unit 503.

In some embodiments, the target image generation unit 504 may obtain one or more vessel segmentation parameters based on the subtraction image. The vessel segmentation parameters may include but not limited to a seed, a threshold or a group of thresholds, outlines, connected components, or the like. The vessel segmentation parameters may be used for extracting the target image from the image to be segmented, or from one or more images generated based on the image to be segmented.

In some embodiments, the target image generation unit 504 may generate a frame image based on the subtraction image, and obtain the target image by supplementing the frame image. The target image generation unit 504 may extract one or more local images based on the image to be segmented, the first image and/or the subtraction image, and supplement the frame image based on the obtained local images. The local image(s) may refer to one or more target images of a specific region, and/or one or more target images of a certain category. For example, given that the target image is a vessel image, a local image may represent abdominal vessels, viscera vessels, tibiae vessels, foot metacarpal vessels, bone-adjacent vessels (vessels adjacent or attaching to bones), or the like. The supplementation may be performed by directly performing local vessel extraction using the seeds in the frame image so that the generated local image may be included in the frame image. The supplementation may also be performed by generating the local images first, replacing a region in the frame image with at least a portion of the corresponding local image, displaying the image superimposed with the frame image, or performing an image operation with the frame image, or the like.

In some embodiments, the target image generation unit 504 may extract one or more second target images while extracting the target image. For example, when the target image is a vessel image, the second target image may include a bone image, a fat image, or an image including another tissue, or the like. A second target image may be generated based on the image to be segmented, the first image, the subtraction image, the frame image, and/or the local image(s), or the like.

FIG. 5-B is an exemplary diagram illustrating an exemplary process for vessel segmentation according to some embodiments of the present disclosure. Process 510 may be included in operation 450. Process 510 may include obtaining an image to be segmented 511, obtaining a first image based on the image to be segmented 512, obtaining a subtraction image based on the first image 513, and generating a target image based on the subtraction image 514. Process 510 may be performed by the vessel segmentation sub-module 500. One or more operations in process 510 may be performed by one or more units of the vessel segmentation sub-module 500.

In 511, an image to be segmented may be obtained. The image to be segmented may be obtained from the data acquisition module 210, the storage module 220, the storage device 180, the display module 230, the input/output device 140, and/or the pre-processing sub-module 410. Alternatively or additionally, the image to be segmented may be obtained via the network 170. Operation 511 may be performed by the image input/output unit 501.

In 512, a first image may be obtained based on the image to be segmented. The image to be segmented may be obtained from operation 511. The first image may be extracted by one or more segmentation algorithms. The segmentation algorithms may include a threshold based algorithm, a region growing algorithm, an algorithm based on energy function, a level set algorithm, a region segmentation and/or merging algorithm, an edge tracking segmentation algorithm, a statistical pattern recognition algorithm, a mean clustering segmentation algorithm, a model algorithm, a segmentation algorithm based on deformable model, an artificial neural network algorithm, a minimum path segmentation partition algorithm, a tracking algorithm, a rule-based segmentation algorithm, a coupling surface segmentation algorithm, or the like, or any combination thereof. In some embodiments, hollow tissue (e.g., bones) in the obtained first image may be filled. In some embodiments, the tissue in the obtained first image may be further processed (e.g., region enhancement). Operation 512 may be performed by the first image generation unit 502.

In 513, a subtraction image may be obtained based on the first image and/or the image to be segmented. The first image may be obtained from operation 512. In some embodiments, the generation of the subtraction image may be based further on the image to be segmented obtained in operation 511. For example, the subtraction image may be obtained by subtracting the first image from the image to be segmented. In some embodiments, the first image may include over-segmented tissue. For example, if the first image includes bone tissue, the first image may include a part representing over-segmented bone-adjacent vessels and/or the vessels similar to the bone tissue due to the effect of a lesion such as calcification. In some embodiments, in operation 513, a second image may be generated based on the image to be segmented and an image segmentation algorithm (for example, region growing based on a threshold) described in the present disclosure, and a subtraction image may be obtained based on the second image. For example, if the first image is the bone image, and the target image is a vessel image, in operation 513, a second image including all bones and most vessels may be obtained by performing a region growing in the image to be segmented based on a lower threshold, and the subtraction image may be obtained based on the first image and the second image. The subtraction image may not include bone-adjacent vessel tissue. In some embodiments, the subtraction image may be obtained by subtracting the first image from the second image. Operation 513 may be performed by the subtraction image generation unit 503.

In 514, a target image may be generated. The target image may be generated using one or more segmentation algorithms described in the present disclosure. In operation 514, the target image may be obtained based on the subtraction image extracted in operation 513. In some embodiments, one or more segmentation parameters may be obtained (e.g., seeds, thresholds, or the like) from the subtraction image, and the image segmentation may be performed in an image (for example, the image to be segmented obtained by operation 511) based on the segmentation parameters to obtain the target image. In some embodiments, a frame image may be generated based on the subtraction image, and the frame image may be supplemented to obtain the target image. In some embodiments, operation 514 may be performed by the target image generation unit 504.

It may be noted that the above description of the processing module and the image processing process is only a specific example and should not be considered as the only possible embodiment. Each of the aforementioned sub-modules may be implemented by one or more components, and the function of each sub-module is not limiting. Each of the aforementioned sub-modules may be added or removed according based on needs. It will be apparent for those skilled in the art that, after understanding the basic principle of the image processing, without deviating from the principle, various modifications and changes in form and detail may be made in the implementations and operations of the image processing, simple derivations or changes may also be made without any creative efforts, the order of individual operations may be adjusted, or individual operations may be combined, and such modifications and changes are still within the scope of the above description. For example, an operation for storing data may be added between operations 511, 512, 513, and/or 514, and the data may be stored in the storage module 220. As another example, one or more additional image processing operations may be added between operations 511, 512, 513, and/or 514, such as the image dilation and/or erosion.

In some embodiments, before the image dilation and/or erosion is performed, the image may be converted into a binary image. For example, bounded by a threshold value, the image may be converted into a binary image. A binary image may refer to an image having one or more pixels/voxels with a value 0 and one or more pixels/voxels with a value 1. The dilation operation may refer to: using a structural component (e.g., an m×n matrix, etc., wherein, m and n may be positive integers greater than or equal to 1) with a certain size to traverse the pixels/voxels of the image, and performing an "AND" operation between the structural component and the image region it overlaps. If the outcome of the "AND" operation is 0, the pixel/voxel values in the resulting image region may be set as 0s; otherwise, the pixel/voxel values may be set as 1s. If a pixel/voxel has a value 0, the color of the pixel/voxel may be black. If a pixel/voxel has a value 1, the color of the pixel/voxel may be white. In some embodiments, via the dilation operation, some structures (e.g., bone, vessel, etc.) in the image may occupy an enlarged image region.

The erosion operation may refer to: using a structural component (e.g., an m×n matrix, etc., wherein, m and n may be positive integers greater than or equal to 1) with a certain size to traverse the pixel/voxel of the image, and performing an "AND" operation between the structural component and the image region it overlaps. If the outcome of the "AND" operation is 1, the pixel/voxel values in the resulting image region may be set as 1s; otherwise, the pixel/voxel values may be set as 0s. In some embodiments, via the erosion operation, some structures (e.g., bone, vessel, etc.) in the image may occupy a shrunken image region.

It should be noted that the pixel/voxel values "0" and "1" are only for demonstration purposes and not intended to limit the specific form of the image dilation or erosion. The two values may be set as any other values based on needs (e.g., 0 and 255, etc.), or dynamically determined based on the pixel/voxel to be processed and one or more values of the adjacent pixels/voxels. The operations such as dilation and/or erosion may also be applied to a non-binary image. For performing the erosion or dilation on a color image, value of each color channel of the pixel/voxel to be processed may be determined via a similar process.

FIG. 6-A is a schematic diagram illustrating an exemplary vessel segmentation sub-module (600) according to some embodiments of the present disclosure. Vessel segmentation sub-module 600 is an example of the vessel segmentation sub-module 420. The vessel segmentation sub-module 600 may include an image input/output unit 601, a first image generation unit 602, a subtraction image generation unit 605, and a target image generation unit 608. The vessel segmentation sub-module 600 may take the vessel image as a target image and may take the bone image as a first image. The above units may further include one or more sub-units. Besides the above units, the vessel segmentation sub-module 600 may also include one or more additional units based on needs.

The image input/output unit 601 may receive an original image or an image to be segmented, receive or output temporary images, or output a target image. The image input/output unit 601 may be an embodiment of the image input/output unit 501. The image input/output unit 601 may input or output one or more images. The image to be segmented may be generated based on the original image. The image to be segmented may be used for extracting the vessels and/or other target tissues. The image input and/or output by the image input/output unit 601 may be a two-dimensional image or a three-dimensional image. The original image in the present disclosure may refer to an image which is directly generated from scan data obtained by the imaging device 110 scanning a scan subject (e.g., the tissues or organs, etc.). The original image may be a CT image, an MRI image, an X-ray image, an ultrasound image, an infrared image, visible light image, or the like, or any combinations thereof. The image to be segmented may be an original image or an image generated by preprocessing the original image in operation 440. A temporary image may refer to an image generated by image segmentation or an image operation during the generation of the target image from the original image. The temporary image may be automatically generated by the data processing system 130, or be generated at least partially manually. After the completion of the relevant image operation(s), the temporary image(s) may be deleted automatically by the system or at least partially manually, stored in the storage module 220 or the storage device 180 for following operations, or graphically displayed by the display module 230.

The image segmentation operation in the present disclosure may refer to modification, extraction, addition, or deletion of one or more pixels/voxels in an image, or any combination thereof. In some embodiments, the image segmentation operation may include manual segmentation, semi-automated segmentation, or automated segmentation. Given the adopted image segmentation, the image segmentation operation may be performed according to one or more image segmentation parameters. An image segmentation parameter may refer to any information (or data) directly affect or facilitate the image segmentation. The image segmentation parameter may include information on seeds, a threshold or a threshold range, ranges of the x-axis and the y-axis, ranges of the y-axis and the z-axis, an average area in the xy plane, proximity to adjacent bone(s), information on connected components (e.g., a count of points (pixels/voxels) in a connected component, an area of a cross section, a cross-sectional area ratio, a ratio of long radius to short radius of a connected component, a count of connected components in an intermediate layer, etc.), information on the extractability (e.g., via region growing) or non-extractability of the pixel/voxel, information on a distance field, a degree of similarity to the background, a position relationship of a tissue structure, or the like, or a combination thereof. In some embodiments, a direction corresponding to the x-axis may be a direction from the right side to the left side of a human body (scan subject), a direction corresponding to the y-axis may be a direction from the chest to the back of the human body, and a direction corresponding to the z-axis may be a direction from the feet to the head of the human body. In some embodiments, the image segmentation parameter may be information predetermined by the system, or information inputted or selected at least partially manually. The image segmentation parameter may be information obtained by retrieving, analyzing, or calculating spatial location information, category information, and/or visual information of one or more original images, images to be segmented, and/or temporary images. The techniques for the analysis and calculation may include edge enhancement, connected component calculation, histogram analysis, various priori models, or the like. It may be noted that any one skilled in the art may obtain a target image via the image segmentation technique described in the present disclosure based on a different set of algorithms, which may all fall within the protection scope of the present disclosure.

The image operation in the present disclosure may refer to the operation of generating a new image/mask from one or more existing images/masks. For example, the image operation may include a union operation between two images/masks, or an operation of subtracting an image/mask from another image/mask. As another example, the image operation may include, according to a certain rule, the operation of adding a pixel/voxel, the operation of modifying a pixel/voxel value, the operation of deleting a pixel/voxel, or the like, such as a dilation or erosion of the image, so as to provide a visual effect of an enlargement, shrinking, a change of brightness/contrast/color, a rotation, a stretching, a distortion, or the like, of the image. In some embodiments, an image operation may also include performing a first image operation on an image/mask and then performing a second image operation on the image/mask obtained via the first image operation and another image that has been subjected to a third image operation or no image operation.

The image subtraction operation may refer to deleting pixels/voxels in an image/mask (e.g., an image A) corresponding to pixels/voxels of another image/mask (e.g., an image B), which may be achieved by, for example, subtracting the values of pixels/voxels of the image B from the values of corresponding pixels/voxels in the image A. As another example, the values of the pixels/voxels in the image A corresponding to pixels/voxels of the image B may be set as 0s. In some embodiments, if the image A does not include a region of pixels/voxels to be deleted, the subtraction operation is not performed on that image region accordingly. In some embodiments, the merging operation may refer to adding pixels/voxels in an image/mask (e.g., an image C) with pixels/voxels of another image/mask (e.g., an image D) according to a spatial correspondence between the image C and the image D. For example, the values of the pixels/voxels in the image C may be added with the values of corresponding pixels/voxels in the image D. As another example, the values of pixels/voxels in the image C corresponding to the pixels/voxels of the image D may be set as a predetermined value. In some embodiments, if a region to be added with pixels/voxels has existing pixels/voxels, a pixel/voxel replacement may be performed in that region, or no operation may be performed in that region. In some embodiments, if a region to be added with pixels/voxels has existing pixels/voxels, one or more types of visual effect information, such as greyscale, color phase, brightness, contrast, of pixels/voxels in the corresponding region may be changed accordingly.

The image input/output unit 601 may obtain data from the storage module 220 or the storage device 180, or output data generated via an image segmentation or image operation into the storage module 220 or the storage device 180. In some embodiments, the image input/output unit 601 may obtain the data stored in a cloud database via the network 170, or output the data generated by the image segmentation or image operation to the cloud database via the network 170. In some embodiments, the image input/output unit 601 may also output the data generated by the image segmentation or image operation to the display module 230. The image input/output unit 601 may receive data from or output data of the other modules to the vessel segmentation sub-module 420.

The first image generation unit 602 may extract bone tissue from the image to be segmented, so as to obtain a first image (or bone image). The first image generation unit 602 may be an example of the first image generation unit 502. The first image may include an image region representing one or more bones. During the generation of the first image, the first image generation unit 602 may first extract the bone tissue from the image to be segmented, and further process the extracted bone image to obtain the first image. In some embodiments, the first image generation unit 602 may retrieve the image to be segmented via the image input/output unit 601. The first image generation unit 602 may output the first image via the image input/output unit 601 for storage or display. The first image generation unit 602 may output the first image to the subtraction image generation unit 605, etc., for further processing. In some embodiments, at least a portion of the temporary image or temporary data generated during the extraction of the bone image may be outputted via the image input/output unit 601 so as to be stored, retrieved, or displayed. In some embodiments, at least a portion of the temporary image or temporary data generated during the extraction of the bone image may be deleted after the image processing is completed. In some embodiments, the first image generation unit 602 may include a coarse segmentation sub-unit 603 and a first processing sub-unit 604.

The coarse segmentation sub-unit 603 may perform a coarse segmentation of bone tissue on the image to be segmented to obtain a coarsely-segmented bone image. The coarsely-segmented bone image may include most or all bones in the image to be segmented. The coarse segmentation of bone may be a segmentation of bones that is not strict in terms of precision and/or accuracy. For example, in the coarsely-segmented bone image obtained by the coarse segmentation of bone, a minor part that does not represent bone tissue may also be included, boundaries of the bone(s) may be rough, etc. In some embodiments, the coarse segmentation sub-unit 603 may obtain the coarsely-segmented bone image based on a third threshold. The third threshold may be configured such that a part of or all bones in the image to be segmented are extracted to be included in the coarsely-segmented bone image. The third threshold may be determined by the coarse segmentation sub-unit 603 in an adaptive manner, or be determined at least partially manually (e.g., input via the input/output device 140). The third threshold may be a predetermined parameter that may be editable or not editable. For different types of images to be segmented (e.g., a CT image, an MRI image, a PET image, a fusion image), the third thresholds may be the same or different. For images obtained using a contrast agent during the image acquisition process (for example, a CTA image) the type and/or the concentration of the contrast agent may also cause a change of the third threshold. The third threshold may also be adjusted due to individual differences between scan subjects, and the adjustment may be performed automatically, semi-automatically, or manually.

The first processing sub-unit 604 may process the coarsely-segmented bone image generated by the coarse segmentation sub-unit 603 to obtain the first image. The processing algorithm may include a threshold based algorithm, a gradient based algorithm, and/or Laplacian enhancement, or the like. In some embodiments, the first processing sub-unit 604 may fill a hollow bone in the coarsely-segmented bone image. In some embodiments, the first processing sub-unit 604 may process, based on a second threshold and the Laplacian enhancement, the coarsely-segmented bone image. The second threshold may be determined by the first processing sub-unit 604 in an adaptive manner, or at least partially manually (e.g., inputted via the input/output device 140, etc.). The second threshold may be a predetermined parameter that may be editable or non-editable. For different types of images to be segmented (e.g., a CT image, an MRI image, a PET image, a fusion image (e.g., a fusion image of a CT image and an MRI image, a fusion image of a CT image and a PET image, etc.), etc.), the second thresholds may be the same or different. For the images obtained using a contrast agent during the image acquisition process (for example, a CTA image), the type and/or concentration of the contrast agent may also cause a change of the second threshold. The second threshold may also be adjusted due to the individual difference of the scan subjects, and the adjustment may be performed automatically, semi-automatically, or manually. In some embodiments, the first processing sub-unit 604 may be optional.

The subtraction image generation unit 605 may generate a second image based on the image to be segmented, and obtain a subtraction image based on the first image and the second image (see relevant descriptions of the subtraction image generation unit 503). The first image may be generated by the first image generation unit 602. The subtraction image generation unit 605 may be an example of the subtraction image generation unit 503. The second image may include bones and most of the vessels in the image to be segmented. In some embodiments, the subtraction image may be the image of the remaining vessels after the bone tissue in the first image is subtracted from the second image. During the subtraction, a portion of the vessels (for example, the bone-adjacent vessels) may also be subtracted. The subtraction image may be used for obtaining one or more vessel segmentation parameters. The subtraction image generation unit 605 may retrieve the image to be segmented and/or the first image via the image input/output unit 601, or retrieve the image to be segmented and/or the first image from the first image segmentation unit 602. The subtraction image generation unit 605 may output the generated subtraction image via the image input/output unit 601 for storage or display. The subtraction image generation unit 605 may output the generated subtraction image to the target image generation unit 608, etc., for further processing. In some embodiments, at least a portion of temporary images or temporary data generated during the generation of the subtraction image may be outputted by the image input/output unit 601 so as to be stored, retrieved, or displayed. In some embodiments, at least a portion of the temporary image or temporary data generated during the extraction of the subtraction image may be deleted after the image processing is completed. The subtraction image generation unit 605 may include a second extraction sub-unit 606 and a subtraction sub-unit 607.

The second extraction sub-unit 606 may obtain a second image based on the image to be segmented. The second image may be obtained by segmenting the image to be segmented based on a first threshold via a region growing operation. The first threshold may be a parameter in the region growing operation, and the parameter may be set such that most vessels and most or all the bones in the image to be segmented are extracted to the second image. The first threshold may be determined by the second extraction sub-unit 606 in an adaptive manner, or be determined based on a user guidance (e.g., input by the input/output device 140, etc.). The first threshold may be a predetermined parameter that may be editable or not editable. For different types of images to be segmented (e.g., a CT image, an MRI image, a PET image, a fusion image, etc.), the first thresholds may be the same or different. For the images obtained using a contrast agent (for example, a CTA image) during the image obtaining process, the type and/or concentration of the contrast agent may also cause a change of the first threshold. The first threshold may also be adjusted due to the individual difference of the scan subjects, and the adjustment may be performed automatically, semi-automatically or manually.

The subtraction sub-unit 607 may obtain the subtraction image based on the first image and the second image. The subtraction image may be obtained by subtracting the first image from the second image. In some embodiments, before and/or during subtraction, the subtraction sub-unit 607 may perform one or more image operations on the first image and/or the second image (for example, erosion, dilation, translation, zoom, rotation, brightness adjustment, contrast adjustment, etc.).

The target image generation unit 608 may generate a target image based on the subtraction image. The target image generation unit 608 may be an example of the target image generation unit 504. The target image generation unit 608 may determine an image segmentation parameter based on the subtraction image generated by the subtraction image generation unit 605, and extract the target image from the image to be segmented based on the image segmentation parameter. During the determination of the image segmentation parameter and/or the target image, the target image generation unit 608 may perform one or more image operations (for example, erosion, dilation, translation, zoom, rotation, brightness adjustment, contrast adjustment, etc.) on the subtraction image and/or the image to be segmented.

The target image generation unit 608 may retrieve the image to be segmented and/or the subtraction image via the image input/output unit 601, or retrieve the image to be segmented and/or the subtraction image from the subtraction image generation unit 605. The target image generation unit 608 may output the generated target image via the image input/output unit 601 for storage or display. In some embodiments, at least a portion of the temporary images or temporary data generated during the generation of the target image may be outputted by the image input/output unit 601 so as to be stored, retrieved, or displayed. In some embodiments, at least a portion of the temporary images or temporary data generated during the extraction of the target image may be deleted after the image processing is completed. The target image generation unit 608 may include seed determination sub-unit 609, a threshold determination sub-unit 610, and a vessel extraction sub-unit 613.

The seed determination sub-unit 609 may extract seed(s) in the subtraction image to obtain one or more seed groups. A seed group may include one or more seeds. The extraction of a seed may be based on a first condition. In some embodiments, the seed group may be a connected component, and the first condition may include one or more parameters for determining or identifying a connected component. The parameter(s) may include one or more thresholds or threshold ranges, x-axis range, y-axis range, an average area in the xy plane, proximity to adjacent bone(s), information on connected component(s) (e.g., a count of points (pixels/voxels) in a connected component, a cross-sectional area, a cross-sectional area ratio, a ratio of a long radius to a short radius of a connected component, a count of connected components in an intermediate layer, etc.), information on the extractability or non-extractability of a pixel/voxel, information on a distance field, a degree of proximity to the background, a spatial relationship of a tissue structure, or the like, or a combination thereof. In some embodiments, the x-axis range may be the middle third of the x-axis range of the subtraction image (for example, seeds may be extracted in the middle third of the x-axis range of the subtraction image). In some embodiments, a connected component may be determined according to the y-axis range. For example, if a difference between a maximum coordinate of the pixels/voxels in a connected component along the y-axis and a mean of the coordinates of the pixels/voxels in the connected component along the y-axis is greater than a threshold, the connected component may be determined as a seed group. The first condition may be predetermined by the data processing system 130 or the input/output device 140.

The threshold determination sub-unit 610 may determine a vessel threshold according to the subtraction image. The determination may be based on a boundary distance field (a distance field with respect to the boundary of the vessel). The threshold determination sub-unit 610 may obtain one or more distance field images (or distance fields) based on the subtraction image, and adaptively obtain one or a set of vessel thresholds in the distance field image(s). The threshold determination sub-unit 610 may include a distance field sub-block 611 and an adaptive operation sub-block 612. The distance field sub-block 611 may determine value(s) of the boundary distance field (with respect to the boundary of the vessel) in the connected component based on one or more connected components in the subtraction image, so as to obtain one or more distance field images. The adaptive operation sub-block 612 may adaptively adjust threshold(s) in the distance field image(s) obtained by the distance field sub-block 611 based on the seed group(s) obtained by the seed determination sub-unit 609, so as to obtain the vessel threshold(s).

The vessel extraction sub-unit 613 may extract a vessel. Based on the seed group(s) obtained by the seed determination sub-unit 609 and one or a set of the vessel thresholds obtained by the threshold determination sub-unit 610, the extraction may be performed by extracting a vessel via a region growing operation in the image to be segmented, so as to obtain the target image.

It should be noted that the descriptions of units and sub-units of the vessel segmentation sub-module 600 is merely for the convenience of description and not intended to limit the scope of the present disclosure within the illustrated embodiments. It would be understood that, for those skilled in the art, after understanding the principle of the system, various units and sub-units of the vessel segmentation sub-module 600 may be arbitrarily combined, separated, and changed in detail.

FIG. 6-B is an exemplary diagram illustrating an exemplary process for vessel segmentation according to some embodiments of the present disclosure. Process 620 may be an example of process 510. Process 620 may include obtaining an image to be segmented 621, obtaining a first image 622, obtaining a second image 624, generating a subtraction image 625, obtaining at least one vessel seed group 627, determining a vessel threshold 628, and obtaining a target vessel image 629. One or more operations in process 620 may further include sub-operations. Process 620 may be performed by the vessel segmentation sub-module 600. In some embodiments, one or more operations in process 620 may be performed by one or more units and/or sub-units of the vessel segmentation sub-module 600.

In 621, an image to be segmented including vessel(s) to be segmented may be obtained. Operation 621 may be an example of operation 511. The image to be segmented may be directly obtained using the imaging device 110 to scan the scan subject, retrieved from the storage module 220 or the storage device 180, or obtained from a cloud database via the network 170. The obtained image to be segmented may be an original image or data obtained via a preprocessing in operation 440. In some embodiments, in operation 621, the obtained image to be segmented may be processed as needed. In some embodiments, one or more temporary images or temporary data may be generated in the process for obtaining the image to be segmented. The temporary image(s) or temporary data, through an image segmentation and/or image operation process, may further be used to generate the image to be segmented or another temporary image or temporary data. Operation 621 may be performed by the image input/output unit 601.

In some embodiments, the image to be segmented may include, but is not limited to, a three-dimensional or two-dimensional image obtained through a scanning and/or data acquisition performed by one or more imaging systems of various modalities. The three-dimensional image may include volume data formed by a plurality of two-dimensional image layers. The image to be segmented may also be transmitted from an internal or external storage system such as a picture archiving and communication system (PACS). The modalities may include but are not limited to, a magnetic resonance imaging (MRI), a magnetic resonance angiography (MRA), a computed tomography (CT), CTA angiography, positron emission tomography (PET), or the like, or a combination thereof. Alternatively or additionally, the modalities may include magnetic resonance images generated according to different scan sequences, including longitudinal relaxation (T1), transverse relaxation (T2), and short time inversion recovery (STIR) sequence. In some embodiments, the image to be segmented may be a spinal magnetic resonance image. In some embodiments, the image to be segmented may be an image sequence formed by a plurality of two-dimensional image layers, e.g., one or more dozen of layers, which may be obtained through a coarse scan for obtaining one or more optimized scan parameters in a scan plan.

In 622, a first image (or a bone image, e.g., bone image 1201 illustrated in FIG. 12) may be obtained by extracting, based on a first algorithm, bone tissue from the image to be segmented. Operation 622 may be an example of operation 512. The image to be segmented may be obtained via operation 621. Operation 622 may be performed by the first image generation unit 602. Since bones are the main noise in vessel extraction, by extracting bones (bone image) in operation 622 and subtracting the bone image from the image to be segmented in the following operation, the extraction outcome of a target vessel image may be improved.

In some embodiments, the first image may include only bones, or may further include other tissue or organs. In some embodiments, the first image may include all of the bones of the image to be segmented, or only include some or a part of them. It may be noted that the first image in the present disclosure may be considered as a temporary image involved in an image operation. Therefore, in some embodiments, the first image may include only a relatively small portion of the bones of the image to be segmented. In some embodiments, when the image to be segmented itself does not include any bones, or the adopted image segmentation algorithm barely extracts any bones in a region upon which the extraction is performed, the first image may not include an image region representing bones. In some embodiments, the first image itself may be one of the target images, which may be preserved in the storage module 220, the storage device 180 and/or the cloud database, or used to provide visualized information about bones via the display module 230.

In 622, one or more techniques may be adopted to extract the first image. For example, bones may be directly extracted from the image to be segmented as the first image using an image segmentation algorithm and a set of segmentation parameters. In some embodiments, one or more temporary images or temporary data may be generated from the image to be segmented using one or more segmentation algorithms and one or more sets of segmentation parameters, and the first image may be generated based on the obtained temporary image or temporary data.

In 622, a main bone region may be extracted based on a first algorithm. The first algorithm may be based on a threshold based algorithm, a gradient based algorithm, and/or Laplacian edge enhancement, or the like, or a combination thereof. For example, the first algorithm may include obtaining a coarsely-segmented bone image using a threshold based algorithm. In some embodiments, the coarsely-segmented bone image may be obtained by the coarse segmentation sub-unit 603. In some embodiments, the coarsely-segmented bone image may be obtained by extracting bone tissue in the image to be segmented based on a third threshold (see the descriptions of the coarse segmentation sub-unit 603). In some embodiments, the coarsely-segmented bone image may be taken as the first image. For demonstration purposes only, the third threshold may have an image value above 600 (alternatively, this value may be adjusted according to a practical situation). The image value may be a grayscale value of an image. For example, for the CT or CTA image, the image value may be or relate to a CT value or HU value.

Optionally, the first algorithm may also include processing the coarsely-segmented bone image to obtain the first image. The processing may be performed by the first processing sub-unit 604. In some embodiments, the processing may include enhancing edges of a connected component in the image to be segmented using an image enhancement technique, so that portions connecting a vessel and a bone may be removed. In some embodiments, considering that the interior part of bone tissue is hollow and the interior part of a vessel is homogeneous, the image to be segmented may be processed using a gradient based algorithm. The gradient based algorithm may process the image to be segmented according to the Laplacian enhancement algorithm. In some embodiments, the coarsely-segmented bone image may be processed based on a second threshold (see the description of the first processing sub-unit 604) and the Laplacian enhancement. As an example, the second threshold may be above an image value of 120 (alternatively, this value may be adjusted according to a practical situation). In the Laplacian enhancement, by determining a difference in the values of six neighboring points surrounding a point in the image, a Laplacian value of the point may be obtained. For example, the image to be segmented may be processed according to the image value (greater than 120) and the Laplacian value (greater than 120) for obtaining the first image. In some embodiments, since some bones are hollow, to facilitate subsequent image processing, optionally, the processing may further include performing a filling operation on the hollow region(s) of the connected components in the first image.

In 624, a second image may be obtained. The obtaining the second image may include performing, based on a first threshold, a region growing algorithm on the image to be segmented (see the descriptions of the second extraction sub-unit 606). The image to be segmented may be obtained via operation 621. For example, the first threshold is above an image value of 150 (alternatively, this value may be adjusted according to a practical situation). The obtained second image may include a majority or all of the bones and a majority of vessels of the image to be segmented. Operation 624 may be performed by the second extraction sub-unit 606.

In 625, a subtraction image may be generated. The generation of the subtraction image may be based on the second image and the first image. The second image may be obtained by operation 624. The first image may be obtained by operation 622. In 622, a part of vessels that are adjacent to bones (bone-adjacent vessel) and/or a part of vessels that have bone-tissue-like features (e.g., caused by a lesion such as calcification) may be over-segmented during the extraction of bone tissue. However, in the subtraction image obtained in operation 625, a majority of the bone-adjacent vessel tissue may be removed. In some embodiments, the subtraction image may be obtained by subtracting the first image from the second image. In some embodiments, the first image may be configured as a constraint, or image segmentation parameters may be obtained based on the first image, and then the image segmentation may be performed in the second image according to the first image or the image segmentation parameters to extract the subtraction image. In some embodiments, one or more temporary images may be extracted from the first image, and the subtraction image may be supplemented using the temporary images. The temporary image may represent at least a portion of over-segmented vessels in the first image. In some embodiments, the image segmentation and/or the image operation may be performed on the second image and/or the first image to generate one or more temporary images, and the subtraction image may be generated based on these temporary images. In some embodiments, operation 625 may be performed by the subtraction sub-unit 607. In some embodiments, operations 624 and 625 may be performed to achieve operation 513.

In 627, at least one vessel seed group may be obtained by processing the subtraction image based on a first condition (see 1202 in FIG. 12). Operation 627 may be performed by the seed determination sub-unit 609. In some embodiments, one or more connected components may be obtained in the subtraction image based on the first condition (see relevant description of the seed determination sub-unit 609). In some embodiments, an image erosion operation may be performed on the obtained one or more connected components to remove the portion(s) connecting a vessel and bone tissue. The image erosion operation may be performed for multiple times on the image obtained using excessively strong or weak contrast agent. The resultant connected component(s) may be taken as the seed group(s) for subsequent processing.

In 627, optionally, the preliminarily obtained connected components may be screened. The screened connected component(s) may be taken as the seed group(s) for subsequent processing. The connected component(s) that fail(s) the screening may be considered as not satisfying the first condition and removed. In some embodiments, a connected component may be removed by setting the image value(s) of the corresponding pixels/voxels so that they may have the color of the background, and the removed connected component may be displayed as a background image.

In some embodiments, the screening may be performed according to a total count of the pixels/voxels in one connected component. For example, the screening may be based on a threshold a. The value of the threshold a may fall in a range determined according to the total dimension of the subtraction image along the x-axis and the resolution along the z-axis. In some embodiments, the total dimension of an image along the x-axis may be a total count (e.g., 512) of the pixels/voxels in the direction of the x-axis. If the count of the pixels/voxels in a connected component is lower than the threshold a, the connected component may be designated as a seed group for subsequent processing. Through the above operation, connected component(s) having a large volume may be removed (e.g., a kidney in an abdominal vessel image).

In some embodiments, the screening may be performed according to a degree of proximity of a connected component to the background and/or another connected component. The degree of proximity may be determined based on a ratio of a count of the pixels/voxels adjacent to a region (a background area or another connected component) to a total count of pixels/voxels in a connected component. The term adjacent to a region (a background area or another connected component) indicates that a distance between a given pixel/voxel and the region is within a certain range (for example, smaller than a predetermined threshold). Since a vessel is relatively far from the background area and a contact area between a vessel and a bone is relatively small, through the above process, the connected components may be screened for determining the seed group(s). For demonstration purposes, the screening may be performed based on a set of thresholds (for example, thresholds b, c, d, and e). For a connected component, if a ratio (first ratio) of a count (first count) of pixels whose distance therefrom to a background area is less than the threshold b to a total count of pixels in a connected component is greater than the threshold c, or a ratio (second ratio) of a count (second count) of pixels whose distance therefrom to the bone is smaller than the threshold d to a total count of pixels in the connected component is greater than a threshold e, the connected component may be excluded from being designated as a seed group. In some embodiments, the value of the threshold b may be about 0.25 cm, the value of the threshold c may be about 50%, the value of the threshold d may be about 0.05 cm, and the value of the threshold e may be about 50%. It may be noted that the values listed above are merely for the convenience of description and for demonstration purposes and not intended to limit the scope of the present disclosure.

In some embodiments, the screening may be performed based on a spatial location of the connected component. Since vessels are generally located at a central region of the subtraction image, the screening may be performed based on a location of each connected component on a cross-section of the subtraction image. For example, if a mean of the coordinates of the pixels/voxels of a connected component in the x direction is within a range of ⅓ to ⅔ x direction of the cross-section of the subtraction image in the x direction, it may be determined that the connected component locates at a central region of the image, and the connected component may be determined as a seed group.

In 628, at least one vessel threshold may be determined by processing the subtraction image based on a boundary distance field. Since bone tissue may be hollow, it may have a relatively small change in values of the distance field (or be referred to as distance field values). An interior region of the vessel may be homogeneous tissue, and it may have a relatively large change in the distance field values. For example, a distance field value at a center of bone tissue may be 3, and a distance field value at a center of a vessel may reach 20. Therefore, the vessel threshold may be determined by performing an adaptive thresholding operation based on the distance field. For example, a distance field image of the subtraction image may be obtained at first (see 1203 in FIG. 12), and an adaptive thresholding operation may then be performed based on the distance field image to determine a vessel threshold. Operation 628 may be performed by the threshold determination sub-unit 610. The distance field value may be a distance between one or more pixels/voxels in the image to a reference object. The reference object may be one or more specific pixels/voxels, lines, and/or surfaces in the image, which may be referred to as reference points, reference lines, and/or reference surfaces, respectively. For example, an edge of a bone may be taken as a reference object, and distance field values of pixels/voxels in the bone may be determined by distances therefrom to the edge of the bone. One or more distance field values of the pixels/voxels may form a distance field image. If the distance field value is determined with respect to an edge of a structure, the distance field image may also be referred to as a boundary distance field image (or a boundary distance field).

For example, in some embodiments, the determination of the vessel threshold may be performed as follows: obtaining, by the distance field sub-block 611, one or more distance field images based on the subtraction image, during which a plurality of connected components may be obtained in the subtraction image, and the boundary distance field values of the plurality of connected components may be calculated; obtaining the vessel threshold by performing, based on the seed group obtained in operation 627 by the adaptive determination sub-block 612, an adaptive thresholding operation on the obtained distance field image(s). As a contact area between a vessel and bone tissue is relatively small, and in particular, bone-adjacent vessels are generally small vessels, the vessel threshold may be determined based on whether the area of a connected component region suddenly increases (i.e., whether the count of the pixels/voxels in the connected component region suddenly changes) during a region growing operation performed on the connected component region based on a certain threshold. For example, a pixel/voxel in a connected component (e.g., the center point of the connected component) may be determined as a seed, based on which a region growing operation may be performed using an initial threshold (e.g., 3). If the count of the pixels/voxels does not suddenly change, the seed may be reused as a starting point, and the threshold may be updated, for example, the region growing operation may be performed based on a higher threshold (e.g., 5). The above process may be repeated until a sudden change occurs, and then the threshold before the latest updating (a threshold which does not cause a sudden change) may be designated as the vessel threshold. If the selected initial threshold causes a sudden change, the region growing may then be performed with a lower threshold. The above process may be repeated until no sudden change occurs, then the current threshold (a threshold which does not cause a sudden change) may be taken as the vessel threshold. In some embodiments, the threshold for iteratively performing the region growing operation may be increased or decreased by an increment. The increment may be an arbitrary real number, for example, 0.1, 0.5, 1, 2, etc.

In 629, a target vessel image may be obtained by extracting vessel(s). The target vessel image may be obtained by performing, based on the seed group obtained in 627 and the vessel threshold obtained in 628, a region growing operation on the image to be segmented obtained in 621 to obtain the vessel extracting outcome for generating the vessel segmentation image (e.g., image 1204 illustrated in FIG. 12). The vessel segmentation image may be taken as a target vessel image. In some embodiments, the vessel segmentation image may lack a portion of vessel(s), and the target vessel image may be generated by further performing a vessel supplementation on the vessel segmentation image.

It may be noted that the description of the vessel segmentation process 620 is merely for the convenience of description and not intended to limit the scope of the present disclosure to the illustrated embodiments. It should be understood that, for those skilled in the art, after understanding the principle of the process, one or more operations of the process may be changed in detail, which may include, for example, adjusting the sequence of the operations, combining, splitting, removing, or adding one or more operations, or the like. These changes does not be out of the protective scope of the claims.

The above is merely an embodiment of the present invention and does not limit the present invention. Those modifications, equivalent replacement, changes, or the like, made within the spirit and principle of the present invention are included in the protective scope of the present invention.

FIG. 6-C is a schematic diagram illustrating an exemplary vessel segmentation sub-module (650) according to some embodiments of the present disclosure. Vessel segmentation sub-module 650 is an example of the vessel segmentation sub-module 420. The vessel segmentation sub-module 650 may include an image input/output unit 651, a first image generation unit 652, a subtraction image generation unit 653, and a target image generation unit 654. In some embodiments, the vessel segmentation sub-module 650 may take a vessel image as a target image, and a bone image as a first image. The above units may further include one or more sub-units. Besides the above units, the vessel segmentation sub-module 650 may also include one or more other units as necessary.

The image input/output unit 651 may receive an original image or an image to be segmented, input or output a temporary image, or output the target image. The image to be segmented may be generated based on the original image. The image to be segmented may be used for extracting vessels and/or other target tissues. The image input/output unit 651 may be an example of the image input/output unit 501. The image input/output unit 651 and the image input/output unit 601 may have same or similar structures or functions. Detailed descriptions of the image input/output unit 651 may be found elsewhere in the present disclosure (see relevant descriptions of the image input/output unit 601 and the image input/output unit 501).

The first image generation unit 652 may extract bone tissue from the image to be segmented to obtain a first image (or bone image). The first image generation unit 652 may be an example of the first image generation unit 502. The first image may include an image region representing one or more bones. During the process for obtaining the first image, the first image generation unit 652 may extract bone tissue from the image to be segmented at first, and then perform a filling operation on the hollow region of the extracted bone image to obtain the first image.

In some embodiments, the first image generation unit 652 may obtain the image to be segmented via the image input/output unit 651. The first image generation unit 652 may output the first image via the image input/output unit 651 for storage or display. The first image generation unit 652 may output the first image into the subtraction image generation unit 653, or the like, for further processing. In some embodiments, at least a portion of the temporary image or temporary data generated during the extraction of the bones may be outputted by the image input/output unit 651 so as to be stored, retrieved, or displayed. In some embodiments, at least a portion of the temporary image or temporary data generated during the extraction of the bones may be deleted after the image processing is completed. A detailed description of the first image generation unit 652 may be found elsewhere in the present disclosure (see FIG. 7-A and relevant descriptions thereof).

The subtraction image generation unit 653 may generate a subtraction image based on the first image (see relevant descriptions of the subtraction image generation unit 503). The subtraction image generation unit 653 may be an example of the subtraction image generation unit 503. The first image may be generated by the first image generation unit 602. The generation of the subtraction image may be based further on the image to be segmented, or another image generated based on the image to be segmented (for example, the second image generated by the subtraction image generation unit 605). Compared to the subtraction image generated by the subtraction image generation unit 605 that is mainly used for obtaining vessel segmentation parameter(s), the subtraction image generated by the subtraction image generation unit 653 may be further subjected to a vessel segmentation. By segmenting vessels from the subtraction image, the computational complexity may be reduced and/or the segmentation accuracy may be improved. In some embodiments, the subtraction image may be generated by subtracting the first image from the image to be segmented.

The subtraction image generation unit 653 may retrieve the image to be segmented and/or the first image via the image input/output unit 651, or retrieve the image to be segmented and/or the first image from the first image segmentation unit 652. The subtraction image generation unit 653 may output the generated subtraction image by the image input/output unit 651 for storage, display, or the like. The subtraction image generation unit 653 may output the generated subtraction image to the target image generation unit 654, or the like, for further processing. In some embodiments, at least a portion of the temporary image(s) or temporary data generated during the generation of the subtraction image may be outputted by the image input/output unit 651 so as to be stored, retrieved, or displayed. In some embodiments, at least a portion of the temporary image(s) or temporary data generated during the extraction of the subtraction image may be deleted after the image processing is completed. Detailed description of the subtraction image generation unit 653 may be found elsewhere in the present disclosure (see FIG. 8-A and relevant description thereof).

The target image generation unit 654 may generate a target image based on the subtraction image. The target image generation unit 654 may obtain a vessel frame image based on the subtraction image generated by the subtraction image generation unit 653 (see relevant descriptions of the target image generation unit 504). The target image generation unit 654 may extract one or more local images (see relevant descriptions of the target image generation unit 504) based on the image to be segmented for supplementing the vessel frame image. During the generation of the vessel frame image and/or the local image(s), optionally, the target image generation unit 654 may perform one or more image operations (for example, erosion, dilation, translation, zoom, rotation, brightness adjustment, contrast adjustment, etc.) on the subtraction image and/or the image to be segmented.

The target image generation unit 654 may retrieve the image to be segmented and/or the subtraction image via the image input/output unit 651, or retrieve the image to be segmented and/or the subtraction image from the subtraction image generation unit 653. The target image generation unit 654 may output the generated target image via the image input/output unit 651 for storage, display, or the like. In some embodiments, at least a portion of the temporary image(s) or temporary data generated during the generation of the target image may be outputted by the image input/output unit 651 so as to be stored, retrieved, or displayed. In some embodiments, at least a portion of the temporary image(s) or temporary data generated during the extraction of the target image may be deleted after the image processing is completed. The target image generation unit 654 may include a vessel frame image generation sub-unit 655, and a local image supplementation sub-unit 656.

The vessel frame image generation sub-unit 655 may extract a vessel frame image. The vessel frame image may be generated based on the subtraction image. In some embodiments, the vessel frame image generation sub-unit 655 may extract the vessel frame image from one subtraction image. In some embodiments, the vessel frame image generation sub-unit 655 may obtain the vessel frame image from two or more subtraction images. The algorithm for generating the first image (e.g., a bone image) of the two or more subtraction images may be different from the algorithm for generating the subtraction image. In some embodiments, the vessel frame image generation sub-unit 655 may generate a coarsely-segmented vessel image based on a subtraction image, generate a finely-segmented vessel image based on the same or another subtraction image, and generate the vessel frame image based on the coarsely-segmented vessel image and the finely-segmented vessel image. Detailed description of the vessel frame image generation sub-unit 655 may be found elsewhere in the present disclosure (see FIG. 9-A and relevant descriptions thereof).

The local image supplementation sub-unit 656 may extract one or more local image based on the image to be segmented or one or more images generated based on the image to be segmented (see relevant descriptions of the target image generation unit 504), and supplement the vessel frame image with the generated local image(s) to obtain an image of the target vessel(s) (target vessel image). Local vessel images of different regions may be extracted using one or more image segmentation algorithms. The generation of the local image(s) may be based on the image to be segmented obtained via the image input/output unit 651, the subtraction image obtained by the subtraction image generation unit 653, and/or the vessel frame image generated by the vessel frame image generation sub-unit 655.

FIG. 6-D is a schematic diagram illustrating an exemplary vessel segmentation according to some embodiments of the present disclosure. Process 660 may be an example of process 510. Process 660 may include obtaining an image to be segmented 661, generating a first image 662, obtaining a subtraction image based on the first image 663, obtaining a vessel frame image based on the subtraction image 665, and generating a target image by supplementing the vessel frame image 666. One or more operations in process 660 may further include sub-operations. Process 660 may be performed by the vessel segmentation sub-module 650. In some embodiments, one or more operations in process 660 may be performed by one or more units and/or sub-units of the vessel segmentation sub-module 650.

In 661, an image to be segmented including a vessel to be segmented may be obtained. Operation 661 may be an example of operation 511. Operation 661 and operation 621 may include similar operations. The description of the operation 661 may be found elsewhere in the present disclosure (see relevant descriptions of operation 621). In some embodiments, operation 661 may be performed by the image input/output unit 651.

In 662, a first image (or a bone image) may be obtained by extracting bone tissue from the image to be segmented obtained based on operation 661. Operation 662 may be an example of operation 512. The image to be segmented may be obtained via operation 661. In some embodiments, the extracted bone image may be directly taken as a first image. In some embodiments, after the bone image is obtained, further operations (e.g., image erosion, dilation, translation, zoom, rotation, changing the contrast) may be performed on the bone image to obtain the first image. In some embodiments, optionally, after the bone image is obtained, a filling operation may be performed on hollow bones to obtain the first image. Operation 662 may be performed by the first image generation unit 652. It may be noted that the first image obtained in operation 662 may be different from the first image obtained in operation 622. The serial number of the images recited in the present disclosure is merely for the convenience of description and not intended to limit the content of the images.

In some embodiments, the first image may include only data representing bones, or may further include data representing other tissue or organs. In some embodiments, the first image may include all image regions representing bones of the image to be segmented or only include some of them. It may be noted that the first image in the present disclosure may be a temporary image involved in an image operation. Therefore, in some embodiments, the first image may only include a relatively small portion of bones in the image to be segmented. In some embodiments, when the image to be segmented itself does not include any bones, or when the adopted image segmentation algorithm fails to extract any bones in the region upon which the extraction is performed, the first image may not include an image region representing bones.

In operation 662, one or more techniques may be adopted to obtain the first image. For example, bones may be directly extracted from the image to be segmented to generate the first image by adopting an image segmentation algorithm and a set of segmentation parameters. In some embodiments, one or more temporary images or temporary data may be generated from the image to be segmented by adopting one or more segment algorithms and one or more sets of segmentation parameters, and the first image may be generated based on the obtained temporary image(s) or temporary data.

In some embodiments, operation 662 may be the same as operation 622. In some embodiments, operation 662 may adopt different bone extracting algorithms and/or the bone image processing operations to obtain two or more first images. The detail implementation of operation 662 may be found elsewhere in the present disclosure (see relevant description of FIG. 7-B).

In 663, a subtraction image may be obtained based on the first image. Operation 663 may be an example of operation 513. The first image may be generated via operation 662. The subtraction image may be obtained based further on the image to be segmented obtained via operation 661 or an operation image obtained from another image (e.g., a second image, etc.) based on the image to be segmented. Operation 663 may be performed by the subtraction image generation unit 653.

The subtraction image may be generated in various ways. In some embodiments, the subtraction image may be obtained by subtracting the first image from the image to be segmented. In some embodiments, the first image may be configured as a constraint, or image segmentation parameter(s) may be obtained according to the first image, and then the image segmentation may be performed on the image to be segmented based on the first image or the image segmentation parameter(s) to extract the subtraction image. In some embodiments, one or more temporary images may be extracted from the first image, and the subtraction image may be supplemented with the temporary image(s). A temporary image may represent at least a portion of the over-segmented vessels in the first image. In some embodiments, one or more image segmentations and/or image operations may be performed on the image to be segmented and/or the first image to generate one or more temporary images, and the subtraction image may be generated based on the temporary image(s).

In some embodiments, in operation 663 two or more different subtraction images may be obtained, such as a first subtraction image and a second subtraction image. The two subtraction images may be obtained based on different first images and/or subtraction image generation processes. FIG. 8-B provides an exemplary process for achieving operation 663.

In 665, a vessel frame image may be obtained based on the subtraction image. The vessel frame image may be a part of the target image. A final target image may be generated after the vessel frame image is supplemented with local image(s). In some embodiments, operation 665 may be performed by the vessel frame image generation sub-unit 655.

The vessel frame image may include only vessels, or may further include non-vessel tissue. The non-vessel tissue may include one or more of other tissue or organs (e.g., caused by an over-segmentation), noises or false-positive vessels extracted during an image segmentation and/or an image operation. In some embodiments, one or more non-vessel tissue in the vessel frame image may be left in the target image. In some embodiments, the non-vessel tissues may be kept below a sufficiently low level, so that a following segmentation of vessels is not affected, and a view of a visualized target image is not affected. In some embodiments, the vessel frame image, temporary images generated based on the vessel frame image, or non-vessel tissues in the target image may be partially or completely removed during the current operation or a subsequent operation.

The vessel frame image may be obtained based on one or more techniques. In some embodiments, the vessel frame image may be obtained by extracting vessels directly from the subtraction image. In some embodiments, a vessel segmentation or an image operation may be performed on the subtraction image to generate one or more temporary images, and the vessel frame image may be generated based on the obtained temporary image(s). In some embodiments, in operation 665, the vessel frame image may be obtained based on the subtraction image and one or more temporary images (e.g., by merging the images, by subtracting temporary image(s) from the subtraction image). In some embodiments, image segmentation parameters may be obtained from one or more images generated from operation 661 to operation 665, and the vessel frame image may be obtained based on the image segmentation parameter(s). In some embodiments, a coarsely-segmented vessel image may be obtained based on a subtraction image, a finely-segmented vessel image may be obtained based on the same or another subtraction image, and the vessel frame image may be generated based on the coarsely-segmented vessel image and the finely-segmented vessel image. A detailed process of operation 665 are provided elsewhere in the present disclosure (see descriptions of FIG. 9-B and FIG. 9-C).

In 666, a target image may be obtained based on the vessel frame image. In 666, one or more local images may be generated based on the image to be segmented or one or more images generated based on the image to be segmented, and the target image may be obtained by supplementing the vessel frame image with the obtained local image(s). In some embodiments, operation 666 may be performed by the local image supplementation sub-unit 656. Operations 665 and 666 may be performed to achieve operation 514.

The target image may only include a part representing vessels, or may further include a part representing a non-vessel object. The part representing a non-vessel object may include one or more parts representing tissue or organs other than vessels (e.g., a part representing tissue or organs other than vessels included in the target image caused by an over-segmentation), and noises or false-positive points generated during an image segmentation and/or an image operation. In some embodiments, the non-vessel tissue may be kept below a sufficiently low level, so that a view of the visualized target image is not affected. In some embodiments, one or more parts representing non-vessel objects may be removed at least partially manually, or be removed automatically by the system.

Supplementation based on local image(s) may be performed in one or more ways. In some embodiments, in a region to be supplemented with local image(s), based on the original image or the image to be segmented, vessels of such a region may be extracted via a process independent from operations 662 to 665, and the vessel image of such a region and the vessel frame image may be merged through an image operation. In some embodiments, based on one or more images generated in operations 661 to 665, one or more image segmentations and/or image operations may be performed on a specific region so that a vessel image of the region may be generated as a local image. The local image and the vessel frame image may be merged to achieve the supplementation of the region with the local image. In some embodiments, in a region where the local vessel(s) is/are, based on one or more images generated in operations 661 to 665, one or more seeds may be set or determined in the vessel frame image to directly extract vessels to be included in the vessel frame image. In some embodiments, in operation 666, image segmentation parameters may further be obtained from one or more images generated in operations 661 to 665. The image segmentation parameters may be used in a segmentation of the vessel image in the current operation or a next segmentation of the vessel image supplemented with local image(s). Detailed descriptions of the supplementation with local images are provided elsewhere in the present disclosure (see descriptions of FIG. 10-B, FIG. 11-A and FIG. 11-B).

In some embodiments, operation 666 may be skipped. For example, when the vessel frame image already includes sufficient vessels to be extracted, the supplementation of the vessel frame image may be skipped and the vessel frame image may be taken as the target vessel image. In some embodiments, two or more rounds of the local image extraction and the supplementation of the vessel frame image may be performed as needed. In some embodiments, in the process of supplementing the vessel frame image, a deletion of a part of the image (e.g., non-vessel tissues) in the vessel frame image may be included.

It may be noted that the above descriptions of the vessel segmentation sub-module as well as vessel segmentation process are merely for the convenience of description and not intended to limit the present disclosure within the illustrated embodiments. It may be understood that, for those of ordinary skill in the art, after understanding the principle of the present disclosure, without deviating from the principle, various modifications and changes in form and detail may be made in the above method and system. For example, a module in FIG. 6-A and/or FIG. 6-C may be combined or split, or another functional module may be added. As another example, operations in FIG. 6-B and/or FIG. 6-D may be combined or split, or another operation may be added. In addition, the application field of the present disclosure is not limited to the segmentation of a vessel. The present disclosure may further be used in the process of extracting a particular component of a human body, another living being, and even non-living beings. The present disclosure is also not limited to the extraction of only one structure or component, but may also extract a combination of a plurality of structures or components. The present disclosure may further be applied to extract an image of tissue or organs of an offspring, parasite or symbiont of a living being from the image of that living being.

According to some embodiments of the present disclosure, more detailed descriptions of the units and sub-units of the vessel segmentation sub-module 650, and the vessel segmentation process, are described as following. In some embodiments, for the convenience of description, the term image to be segmented may refer to an operation image on which a corresponding operation (segmentation) is to be performed. In some embodiments, the term image may refer to a mask. In some embodiments, an original image may be an original CT angiography image of a human body, and an operation image may be a pre-processed CT angiography image or the original image. A target image may be an image of vessels to be segmented in the CT angiography image. Image segmentation may be performed using one or more segmentation parameters. The segmentation parameter(s) may be automatically obtained by the system or inputted by a user through the input/output device 140. An image operation may refer to a processing of an image, or a merging or subtraction between two or more images. It is understood that the illustrative descriptions, sub-units, and application fields and scopes thereof are not intended to limit the actual configuration, practical implementation, application field, and scope of the present invention. After understanding the present disclosure through these illustrative descriptions, those of ordinary skill in the art may develop a variety of system configurations and corresponding application manners without deviating from the concept of the present disclosure and apply the present disclosure to a variety of application fields. However, these system configurations and application manners are within the protective scope of the present disclosure.

FIG. 7-A is a schematic diagram illustrating an exemplary first image generation unit (652) according to some embodiments of the present disclosure. First image generation unit 652 may include a bone segmentation sub-unit 701 and/or a bone filling sub-unit 702. The bone segmentation sub-unit 701 may segment bones in the image to be segmented to generate a preliminarily segmented bone mask. The bone filling sub-unit 702 may fill hollow regions of one or more bones in the preliminarily segmented bone mask. The preliminarily segmented bone mask generated by the bone segmentation sub-unit 701 and the bone image filled by the bone filling sub-unit 702 may be merged to form the first image.

FIG. 7-B is a diagram illustrating an exemplary process for the generation of the first image according to some embodiments of the present disclosure. Process 710 may be performed to achieve operation 662. Process 710 may include segmenting bones 711, as well as filling the segmented bones 712. Process 710 may be performed by the first image generation unit 652. One or more operations of process 710 may be performed by one or more sub-units of the first image generation unit 652.

In 711, a preliminarily segmented bone mask may be obtained by segmenting bones in the image to be segmented. The bone segmentation may be performed using one or more image segmentation algorithms described above, such as a region growing operation. The region growing operation may be based on a threshold, a gradient, etc. For example, the region growing operation may be based on one or more region growing conditions. The region growing conditions may be based on a threshold based algorithm, a gradient based algorithm, and/or a Laplacian edge enhancement algorithm.

In 712, the segmented bones may be filled. In some embodiments, some bones (e.g., a vertebra) in the preliminarily segmented bone mask obtained in operation 711 may be hollow. In 712, by filling the hollow bones, the first image may be generated. The filling operation may be performed on one hollow region of a bone or hollow regions of a plurality of bones. In some embodiments, the filling may be fully-automated, semi-automated, or manually performed. For example, images of one or more regions may be selected manually from the image to be segmented and added into the preliminarily segmented bone mask. As another example, pixels/voxels may be filled in the hollow region(s) of bones automatically by the system. In some embodiments, the filling may refer to assigning a certain pixel/voxel value to the pixels/voxels to be filled. The pixel/voxel value may include one or more constants. The value may be automatically set by the system or set manually. In some embodiments, operation 712 may be skipped. For example, in operation 711, a region growing operation based on a threshold and/or a gradient may be used to obtain a corresponding bone mask (e.g., the first image), and operation 712 may be skipped. In some embodiments, the obtained first image may be directly used in following operations. In some embodiments, the obtained first image may be further processed and then used in following operations. In some embodiments, by using different segmentation algorithms or segmentation parameters, two or more different first images may be generated and for subsequent image processing.

FIG. 8-A is a schematic diagram illustrating an exemplary subtraction image generation unit (653) according to some embodiments of the present disclosure. Subtraction image generation unit 653 may include a vessel segmentation parameter generation sub-unit 801, a vessel segmentation subunit 802, and a mask operation sub-unit 803. The vessel segmentation parameter generation sub-unit 801 may obtain vessel segmentation parameters based on the image to be segmented and/or the first image. The vessel segmentation subunit 802 may segment vessels in the image to be segmented and generate a corresponding mask. The mask operation sub-unit 803 may process a single mask, and/or perform an image operation between two or more masks.

FIG. 8-B is an exemplary diagram illustrating an exemplary process for generating the subtraction image according to some embodiments of the present disclosure. Process 810 may be performed to achieve operation 663. Process 810 may include obtaining a first mask 811, obtaining a vessel segmentation parameter 812, obtaining a second mask 813, and obtaining a subtraction image 814. In some embodiments, process 810 may be performed by the subtraction image generation unit 653. In some embodiments, one or more operations in process 810 may be performed by one or more sub-units of the subtraction image generation unit 653.

In 811, a first mask may be obtained based on the image to be segmented and the first image. In some embodiments, the obtained first mask may refer to a mask obtained by subtracting the first image from the image to be segmented. The mask operation sub-unit 803 may obtain the image to be segmented and the first image, and then subtract the first image from the image to be segmented. The resultant image is the first mask. In some embodiments, the first image may be configured as a constraint, and the image segmentation may be performed on the image to be segmented such that the segmented image does not include pixels/voxels corresponding to the first image, so as to obtain the first mask. For example, the segmentation may be performed by defining an image region upon which the image segmentation is to be performed, or by defining a threshold range to be used in the segmentation operation. The image segmentation may be performed using one or more segmentation algorithms described in the present disclosure. In some embodiments, new image segmentation parameters may be obtained by analyzing the first image, and the image segmentation may be performed on the image to be segmented based on the segmentation parameters to obtain the first mask. In some embodiments, in order to remove a vessel adjacent to or attached to a bone, the first image may be dilated or the first mask may be eroded as needed. The finally generated first mask may be subjected to subsequent processing. In some embodiments, the first mask may represent a CT angiography image in which bones are preliminarily removed. In some embodiments, operation 811 may be performed by the mask operation sub-unit 803.

In 812, vessel segmentation parameters may be obtained based on the first mask and/or the image to be segmented, and the vessel segmentation in operation 813 may be performed accordingly. In some embodiments, the vessel segmentation algorithm adopted in operation 813 may be a region growing algorithm, and correspondingly, the vessel segmentation parameters may include vessel seeds. In some embodiments, the vessel seeds may be selected or determined from the first mask. The selection or determination of the vessel seeds may be based on one or more thresholds, a count of points in the connected components of the first mask, coordinate ranges of pixels/voxels in the direction of x-axis or y-axis, and a degree of proximity of the pixels/voxels in the first mask to the background (see relevant descriptions of operation 627). In some embodiments, before the vessel seeds are obtained, an image erosion may be performed on the first mask to remove vessels that are adjacent to the bones. In some embodiments, a vessel segmentation threshold may be determined in an adaptive manner after a boundary distance field of the image to be segmented is generated (see relevant descriptions of operation 628). The size of the boundary distance field may be reduced. For example, the size of the matrix corresponding to the boundary distance field may be smaller than the size of the matrix corresponding to the original image.

After the corresponding vessel segmentation parameters are obtained, the vessel segmentation operation may be performed in operation 813, and the resultant image is the second mask. In some embodiments, the second mask may represent an image of over-segmented vessels in the first image. Operation 812 may be performed by the vessel segmentation parameter generation sub-unit 801. Operation 813 may be performed by the vessel segmentation subunit 802.

In some embodiments, the second mask may be the target vessel image to be obtained via the process 620 as illustrated in FIG. 6-B, and the operation 813 may correspond to the operation 629. Correspondingly, to generate the first mask in the operation 811, a second image may be obtained by performing the operation 624 on the image to be segmented (as in the operation 661), and then the first mask (the subtraction image as in the operation 625) may be obtained via the operation 625, e.g., by subtracting the first image (obtained via the operation 662) from the second image. Also, the vessel segmentation parameters to be obtained in the operation 812 may include at least one vessel seed group and at least one vessel threshold, which may be obtained by performing the operations 627 and 628 on the first mask.

In 814, the subtraction image may be obtained based on the first mask and the second mask. In some embodiments, the subtraction image may be obtained by merging the first mask and the second mask. The subtraction image may be an image obtained by removing bones and supplementing with at least a portion of vessels removed by error. Operation 814 may be performed by the mask operation sub-unit 803. In some embodiments, the first mask obtained in operation 811 may be taken as the subtraction image directly, and operation 812, operation 813, and/or operation 814 may be skipped. In some embodiments, operation 812 and/or operation 813 may be optionally performed as needed.

In some embodiments, one or more subtraction images may be obtained. Taking a generation of two subtraction images as an example, the two subtraction images may be generated based on a same first image but two different algorithms, or be based on two different first images and the same or different algorithms. In some embodiments, the one or more subtraction images may include a first subtraction image and a second subtraction image. The first subtraction image may refer to a subtraction image obtained via the following process: obtaining a first preliminarily segmented bone mask using a first region growing algorithm based on a threshold and Laplacian edge enhancement in operation 711; and processing the first preliminarily segmented bone mask via operations 712, 811, 812, 813, and/or 814 to obtain the first subtraction image. The second subtraction image may refer to a subtraction image obtained via the following process: obtaining a second preliminarily segmented bone mask using a second region growing algorithm based on a threshold and a gradient in operation 711, and processing the second preliminarily segmented bone mask via operations 712 and/or 811 to obtain the second subtraction image. The one or more subtraction images may be used in subsequent processing directly. Alternatively, the one or more subtraction images may be further processed and then be used in subsequent processing.

FIG. 9-A is a schematic diagram illustrating an exemplary vessel frame image generation sub-unit (655) according to some embodiments of the present disclosure. The vessel frame image generation sub-unit 655 may include a vessel coarse-segmentation sub-block 901, a vessel fine-segmentation sub-block 902, and a morphological combination sub-block 903. The vessel coarse-segmentation sub-block 901 may perform a coarse vessel segmentation on the subtraction image to obtain a corresponding coarsely-segmented vessel mask. The vessel fine-segmentation sub-block 902 may perform a fine vessel segmentation on the subtraction image to obtain a corresponding finely-segmented vessel mask. The vessel coarse-segmentation sub-block 901 and the vessel fine-segmentation sub-block 902 may act on the same or different subtraction images to obtain corresponding masks.

The coarse vessel segmentation may refer to a coarse extraction of vessels. The coarse extraction may be an extraction of vessels with relatively low accuracy and/or precision. For example, a vessel image obtained via the coarse vessel segmentation may include most or all of the vessels of the extracting region and a minor portion of non-vessel tissue, and the boundaries of vessels may be coarse. The fine vessel segmentation may refer to a fine extraction of vessels. The fine extraction may be an extraction of vessels with higher accuracy and/or precision. For example, boundaries of vessels in the vessel image obtained via the fine vessel segmentation may be more accurate than boundaries of vessels in the vessel image obtained via the coarse vessel segmentation, the probability of over-segmentation of near-vessel tissues as vessels is relatively low, and the probability of under-segmentation of vessel image is relatively great. The morphological combination sub-block 903 may perform a morphological combination of the coarsely-segmented vessel mask and the finely-segmented vessel mask to obtain a vessel frame image, for example, a set of vessel frame images extracted in operation 614.

FIG. 9-B is a schematic diagram illustrating an exemplary process for generating a vessel frame image according to some embodiments of the present disclosure. Process 910 may be performed to achieve operation 665. Process 910 may include obtaining a coarsely-segmented vessel mask 911, obtaining a finely-segmented vessel mask 912, and performing a morphological combination 913. In some embodiments, process 910 may be performed by the vessel frame image generation sub-unit 655. In some embodiments, one or more operations in process 910 may be performed by one or more sub-units of the vessel frame image generation sub-unit 655.

In 911, a coarsely-segmented vessel mask may be obtained based on a subtraction image. The vessels in the subtraction image may be segmented using one or more image segmentation algorithms described above. In some embodiments, the coarsely-segmented vessel mask may be obtained based on the aforementioned second subtraction image. In some embodiments, the coarsely-segmented vessel mask may be obtained by performing a coarse segmentation of vessels in the second subtraction image using a region growing algorithm based on a gradient and a threshold. The coarsely-segmented vessel mask may include vessels, bones, and/or other organs or tissues. Operation 911 may be performed by the vessel coarse-segmentation sub-block 901.

In 912, a finely-segmented vessel mask may be obtained based on a subtraction image. Vessels in the subtraction image may be segmented using one or more image segmentation algorithms described above. In some embodiments, the finely-segmented vessel mask may be obtained based on the first subtraction image. In some embodiments, the finely-segmented vessel mask may be obtained by performing a fine segmentation of vessels in the aforementioned first subtraction image using a level-set based algorithm based on a radius and a gradient. The finely-segmented vessel mask may include a vessel image. The finely-segmented vessel mask may further include image(s) representing bones and/or or other organs or tissue given that the proportion of the vessel(s) is dominant. Operation 912 may be performed by the vessel fine-segmentation sub-block 902.

It may be noted that in operation 911 and operation 912, the subtraction image used for performing the coarse vessel segmentation and fine vessel segmentation may be the same or different. For example, in operation 911 and operation 912, corresponding vessel segmentation images may be obtained both based on the first subtraction image or the second subtraction image. In some embodiments, the first subtraction image may be used in operation 911 and the second subtraction image may be used in operation 912. The algorithms and segmentation parameters used for segmenting vessels in operation 911 and 912 may be different, or at least some of them are the same, or they are exactly the same. There is no order of execution or limitation on a segmentation algorithm for performing operation 911 and operation 912. Implementation of operation 911 and operation 912 may be different in detail. For the convenience of description, the coarsely-segmented vessel mask may include more vessels and/or more complete vessels than the finely-segmented vessel mask. In some embodiments, in the coarsely-segmented vessel mask, the proportion of the vessels in the whole mask does not need to be high, but as many vessels to be segmented in the target region as possible may be included. In some embodiments, in the finely-segmented vessel mask, the proportion of the vessels in the whole mask may be as high as possible, but vessels to be segmented in the target region does not need to be completely included. In some embodiments, operation 911 may be performed at first to obtain the coarsely-segmented vessel mask, and the finely-segmented vessel mask may then be obtained by performing a vessel segmentation operation and/or image operation on the coarsely-segmented vessel mask.

In 913, a vessel frame image, for example, the one to be obtained in operation 665, may be obtained by performing a morphological combination between the coarsely-segmented vessel mask and the finely-segmented vessel mask. In some embodiments, additional coarsely-segmented vessel mask(s) or finely-segmented vessel mask(s) may be obtained before operation 913 is performed, and the morphological combination may be performed on three or more vessel masks. In some embodiments, the coarsely-segmented vessel mask or finely-segmented vessel mask may be taken as the vessel frame image directly. Therefore, operation 911 or operation 912 may be skipped. The obtained vessel frame image may be used in subsequent processing directly. Alternatively, the one or more subtraction images may be further processed and then be used in subsequent processing.

FIG. 9-C is a schematic diagram illustrating an exemplary process of a morphological combination between a coarsely-segmented vessel mask and a finely-segmented vessel mask according to some embodiments of the present disclosure. Process 920 may be performed to achieve operation 913. Process 920 may include obtaining a third mask 921, segmenting non-vessel tissue 922, obtaining a fourth mask 923, and obtaining a vessel frame image 924. Operations in process 920 may be performed by the morphological combination sub-block 903.

In 921, a third mask may be obtained based on the coarsely-segmented vessel mask and the finely-segmented vessel mask. In some embodiments, the morphological combination sub-block 903 may obtain the coarsely-segmented vessel mask and the finely-segmented vessel mask, and subtract the finely-segmented vessel mask from the coarsely-segmented vessel mask. The residual image is the third mask. In some embodiments, the image in the finely-segmented vessel mask may be configured as a constraint, and an image segmentation may be performed on the coarsely-segmented vessel mask satisfying that the segmented image does not include pixels/voxels corresponding to the finely-segmented vessel mask, so as to obtain the third mask. In some embodiments, new image segmentation parameters may be obtained by analyzing the finely-segmented vessel mask, and the image segmentation may be performed on the coarsely-segmented vessel mask based on the segmentation parameters to obtain the third mask.

In 922, image(s) representing non-vessel organs or tissues may be extracted in the third mask. In some embodiments, connected components may be determined in the third mask, and a structure identification may be performed on each connected component to determine whether the connected component represents a non-vessel organ or tissue (unrelated to vessels). The structure determination may be based on a count of points (pixels or voxels) in the connected component and an area of a cross-section of the connected component. Alternatively or additionally, image(s) representing non-vessel organs or tissue may be obtained using an image segmentation algorithm, for example, a threshold based segmentation algorithm, an edge-based segmentation algorithm, a region-based segmentation algorithm, a segmentation algorithm based on cluster analysis, a segmentation algorithm based on wavelet transform, a segmentation algorithm based on mathematical morphology, an algorithm based on a artificial neural network, a genetic algorithm, or the like, or any combination thereof. In operation 923, a fourth mask may be obtained by subtracting, from the third mask, the image part representing non-vessel organs or tissue (e.g., identified connected components unrelated to the vessel). In the fourth mask, vessels may be dominant.

In 924, the vessel frame image may be obtained by merging the fourth mask and the finely-segmented vessel mask. The vessel frame image does not need to include all the vessels in the image to be segmented. The vessel frame image may be supplemented with a missing vessel image as needed in operation 666. In some embodiments, the vessel frame image may already include all the vessels to be segmented, and the vessel frame image may be outputted directly as a target image and operation 666 may be skipped. In some embodiments, the vessel frame image may include a portion or some of the target vessels. For example, the vessel frame image may lack vessels of abdominal viscera (e.g., a liver, a spleen, and/or a kidney, etc.), and/or bone-adjacent vessels, etc. The vessel of local region(s) (local image(s)) may be added in subsequent processing to obtain the target image. In some embodiments, the local image(s) may further be obtained based on the vessel frame image and/or the image to be segmented in subsequent processing, and the local image(s) may be merged with the vessel frame image to obtain the target vessel image.

FIG. 10-A is a schematic diagram illustrating an exemplary local image supplementation sub-unit (656) according to some embodiments of the present disclosure. The local image supplementation sub-unit 656 may include an abdominal vessel image supplementation sub-block 1001 and a bone-adjacent vessel image supplementation sub-block 1002. If a vessel image of another part is to be added, the local image supplementation sub-unit 656 may further include a corresponding vessel image supplementation sub-block. If a vessel image of a certain part is not to be added to the vessel frame image, a corresponding vessel image supplementation sub-unit may be omitted in the local image supplementation sub-unit 656.

FIG. 10-B is a schematic diagram illustrating an exemplary process for supplementing the vessel frame image with local image(s) according to some embodiments of the present disclosure. Process 1010 may be performed to achieve operation 666. Process 1010 may include adding an abdominal vessel image 1011 and adding a bone-adjacent vessel image 1012. In some embodiments, process 1010 may be performed by the local image supplementation sub-unit 656. In some embodiments, one or more operations in process 1010 may be performed by one or more sub-blocks of the local image supplementation sub-unit 656. Detailed descriptions of operation 1011 and operation 1012 may be found elsewhere in the present disclosure (see descriptions of FIGS. 11-A, 11-B and 11-C).

For the convenience of description, a vessel frame image that has not been supplemented with any local image may be referred to as a preliminary vessel frame image; a vessel frame image that has been supplemented with local images for one or more iterations and still needs to be supplemented with local images may be referred to as an advanced vessel frame image. A vessel frame image (e.g., a vessel frame image including all needed vessels) and/or an advanced vessel frame image does not need to be supplemented with a local image may be designated as a target vessel image.

FIG. 11-A is a schematic diagram illustrating an exemplary process of supplementing the vessel frame image with abdominal viscera vessels according to some embodiments of the present disclosure. Process 1110 may be performed to achieve operation 1011. Process 1110 may include identifying a specific bone 1111, obtaining a specific-bone mask 1112, obtaining a bone-vessel mask 1114, obtaining a fifth mask 1115, obtaining a sixth mask 1116, obtaining a seventh mask 1117, and supplementing the vessel frame image 1118. In some embodiments, tissue (e.g., liver tissue, spleen tissue, kidney tissue, etc.) other than the abdominal viscera vessels may also be added into the vessel frame image. Process 1110 may be performed by the abdominal vessel image supplementation sub-block 1001.

In 1111, a specific bone in the chest and/or abdomen may be identified. In some embodiments, the identified specific bone may include a rib, an ilium, a sacrum, and/or any other bone adjacent to a vessel. The specific bone does not need to be a whole bone. For example, the specific bone may include only a part of a bone (e.g., a part of a rib) as needed. The identification of the specific bone may be manual, semi-automated or full-automated. For example, the image may be identified using one or more techniques based on, for example, anatomy, a prior model, connected component analysis, histogram analysis, or the like, and a region where the specific bone is may be so located. After the identification, the specific bone may be segmented in operation 1112. The segmentation may be performed using one or more of the aforementioned image segmentation algorithms, or a combination thereof. In some embodiments, the identification of the specific bone in operation 1111 and/or the segmentation of the specific bone in operation 1112 may be performed on the image to be segmented or performed on the first image obtained in operation 712. In some embodiments, the second mask obtained in operation 813 may be subtracted from the first image to obtain a temporary mask, and the identification and the segmentation of the specific bone may be performed on the temporary mask. The specific bone mask may be obtained after the segmentation is completed.

In 1114, a bone-vessel mask may be obtained based on the image to be segmented. The bone-vessel mask may include bone(s) and vessel(s). The bone-vessel mask may also include other tissue or organs. The bone-vessel mask may include an image of abdominal vessels missing in the vessel frame image. In some embodiments, the bone-vessel mask may be obtained by designating at least one pixel/voxel whose image value is above a fourth threshold as a seed, and vessels and bones may then be segmented as a whole from the image to be segmented using a region growing operation based on the at least one seed. In some embodiments, the fourth threshold may range between 110 and 150. In some embodiments, the fourth threshold may be 130. In some embodiments, the bone-vessel mask may be obtained using another algorithm or another threshold value. The preliminarily obtained bone-vessel mask may be processed further as needed before being subjected to subsequent processing. It may be noted that the image value of the seed listed above is merely for the convenience of description and demonstration purposes and not intended to limit the scope of the present disclosure.

In 1115, a fifth mask may be obtained based on the bone-vessel mask, the vessel frame image, and/or the specific bone mask. If no local image supplementation has been performed before operation 1011, the vessel frame image used in the operation may be a preliminary vessel frame image. If any local image supplementation operation is performed for one or more iterations before operation 1011, the vessel frame image used in the operation may be an advanced vessel frame image. In some embodiments, the vessel frame image and/or the specific bone mask may be directly subtracted from the bone-vessel mask, and the residual image may be the fifth mask. In some embodiments, the vessel frame image and/or the specific bone mask may be configured as a constraint, and an image segmentation may be performed on the bone-vessel mask satisfying that the segmented image does not include pixels/voxels corresponding to the vessel frame image and/or the specific bone mask, so as to obtain the fifth mask. In some embodiments, new image segmentation parameter(s) may be obtained based on the vessel frame image and the specific bone mask, and an image segmentation may be performed on the bone-vessel mask based on the segmentation parameter(s) to obtain the fifth mask. In some embodiments, bone-adjacent vessels in the fifth mask may be removed. The technique for removing the bone-adjacent vessels may include an image dilation or erosion (see the description of FIG. 5-B) described above. For example, the removal of the bone-adjacent vessels may include: before the fifth mask is generated, performing a dilation on bones of the specific bone mask, and then performing the above mask subtraction or an image operation for obtaining segmentation parameters. As another example, the subtraction of the bone-adjacent vessel may include: after the fifth mask is generated, performing an image erosion on the fifth mask. The bone-adjacent vessel removed in operation 1115 and/or other bone-adjacent vessels not added in operation 1011 may be added in subsequent processing. The preliminarily obtained fifth mask may further be processed as needed.

In 1116, a sixth mask may be obtained by segmenting bones in the fifth mask. In some embodiments, a pixel/voxel whose image value is above a fifth threshold may be selected as a seed, and the sixth mask may be obtained by segmenting bones in the fifth mask using a region growing operation based on the seed. For example, when the operation image is a CT angiography image, the image value may be a CT value, and the fifth threshold may range between 700 and 900. In some embodiments, the fifth threshold may be 800. The preliminarily obtained sixth mask may be processed further as needed. It may be noted that the image value of the seed listed above are merely for the convenience of description and demonstration purposes and not intended to limit the scope of the present disclosure.

In 1117, a seventh mask may be obtained based on the fifth mask and the sixth mask. In some embodiments, the seventh mask may include most of the vessels in the chest and/or abdominal viscera (e.g., a liver, a spleen, or a kidney, etc.). In some embodiments, the seventh mask may further include tissue other than the viscera vessels. In some embodiments, the image in the sixth mask may be subtracted from the fifth mask directly, and the residual image is the seventh mask. In some embodiments, the sixth mask may be configured as a constraint, and an image segmentation may be performed on the fifth mask satisfying that the segmented image does not include pixels/voxels corresponding to the sixth mask, so as to obtain the seventh mask. In some embodiments, new image segmentation parameter(s) may further be obtained based on the sixth mask, and an image segmentation may be performed on the fifth mask based on the segmentation parameter(s) to obtain the seventh mask. The preliminarily obtained seventh mask may be processed further as needed.

In 1118, a part or all of the missing vessels in the vessel frame image may be supplemented based on the seventh mask. If no local image supplementation is performed before operation 1011, the vessel frame image used in the operation may be a preliminary vessel frame image. If a local image supplementation is performed for one or more iterations before operation 1011, the vessel frame image used in the operation may be an advanced vessel frame image. In some embodiments, a region growing operation or another vessel segmentation process may be performed on the vessel frame image based on the seventh mask to add abdominal vessels directly. In some embodiments, vessel segmentation parameter(s) (e.g., a seed point) may be obtained from the vessel frame image or the finely-segmented vessel mask. A vessel segmentation may be performed on the seventh mask based on the vessel segmentation parameter(s) to obtain a local image, and then the local image and the vessel frame image may be merged to add the local image missing in the vessel frame image. For example, one or more pixels/voxels in the finely-segmented vessel mask obtained by operation 912 may be configured as seeds, and a region growing operation may be performed on the seventh mask based on the seeds. The resulting local image obtained and the vessel frame image may then be merged to obtain the target vessel image. In some embodiments, after operation 1118, the vessel frame image may include all target vessels to be segmented, and the vessel frame image may be obtained and outputted as a target vessel image. In some embodiments, after operation 1118, if the vessel frame image still does not include all the target vessels to be segmented, a further local image supplementation may then be performed. For the convenience of description, a set of target vessels obtained by adding image(s) of abdominal viscera vessels into the vessel frame image may be referred to as a first target vessel mask, and a set of target vessels obtained by adding image(s) of bone-adjacent vessels into the vessel frame image may be referred to as a second target vessel mask. It should be noted that the second target vessel mask may be obtained based on the first target vessel mask. In other words, the second target vessel mask may include the vessel frame image, a portion corresponding to abdominal viscera vessels, and a portion corresponding to bone-adjacent vessels.

FIG. 11-B is a schematic diagram illustrating an exemplary process of supplementing the vessel frame image with bone-adjacent vessels in the vessel frame image according to some embodiments of the present disclosure. Process 1120 may be performed to achieve operation 1012. Process 1120 may include obtaining an eighth mask 1121, obtaining a ninth mask 1123, obtaining a tenth mask 1125, obtaining an eleventh mask 1126, and obtaining a target vessel image 1127. Process 1120 may be performed by the bone-adjacent vessel image supplementation sub-block 1002.

In 1121, an eighth mask may be obtained based on the image to be segmented and/or the vessel frame image. If no local image supplementation has been performed before operation 1121, the vessel frame image used in this operation may be a preliminary vessel frame image. If any local image supplementation is performed for one or more iterations before operation 1121, the vessel frame image used in the operation may be an advanced vessel frame image, such as the first target vessel mask obtained in operation 1118. In some embodiments, the vessel frame image may be subtracted from the image to be segmented directly, and the residual image is the eighth mask. In some embodiments, the vessel frame image may be configured as a constraint, and an image segmentation may be performed on the image to be segmented satisfying that the segmented image does not include pixels/voxels corresponding to the vessel frame image, so as to obtain the eighth mask. This may be implemented by, for example, defining a spatial region upon which the image segmentation is to be performed or defining a threshold range with which the segmentation is to be performed. In some embodiments, image segmentation parameter(s) may be obtained based on the vessel frame image, and an image segmentation may be performed on the image to be segmented based on the segmentation parameters to obtain the eighth mask. The preliminarily obtained eighth mask may be processed further as needed.

In 1123, a ninth mask may be obtained by segmenting bones included in the eighth mask. In some embodiments, at least one point (pixel/voxel) whose image value is above a sixth threshold may be selected as a seed, based on which a region growing operation may be performed on the eighth mask to segment bones. The sixth threshold may be above 800. In some embodiments, bone-adjacent vessels in the eighth mask may be removed before the bone segmentation. In some embodiments, in the eighth mask, an erosion operation may be performed on a portion whose image values exceed another predetermined threshold before the bone segmentation is performed, so that one or more regions connecting a vessel and a bone may be eroded. Another threshold may be above 150. The preliminarily obtained ninth mask may be processed further as needed. It may be noted that the image value of the seed listed above is merely for the convenience of description and demonstration purposes and not intended to limit the scope of the present disclosure.

In 1125, a tenth mask may be obtained based on the eighth mask and/or the ninth mask. In some embodiments, the tenth mask may include images representing bone-adjacent vessels. In some embodiments, the ninth mask may be subtracted from the eighth mask directly, and the residual image is the tenth mask. In some embodiments, the image in the ninth mask may be configured as a constraint, and an image segmentation may be performed on the eighth mask satisfying that the segmented image does not include pixels/voxels corresponding to the ninth mask, so as to obtain the tenth mask. This may be implemented by, for example, defining a spatial region upon which the image segmentation is to be performed or a threshold range within which the segmentation is to be performed. In some embodiments, based on the ninth mask, image segmentation parameters may be obtained, based on which an image segmentation may be performed on the eighth mask to obtain the tenth mask. In some embodiments, an appropriate dilation may be performed on bones in the ninth mask before the tenth mask is generated, so that the bone tissue included in the tenth mask may be reduced as much as possible. The preliminarily obtained tenth mask may be processed further as needed.

In 1126, a false-positive vessel (or referred to as a false-positive outcome or a false-positive bone fragment) may be identified and removed from the tenth mask. In some embodiments, a connected component may be determined based on the tenth mask, and each connected component may be identified to determine whether the connected component is a false-positive vessel. The identification may be based on, for example, the ranges of the y-axis and the z-axis, an average area in the xy plane, a degree of proximity to the background, a degree of proximity to adjacent bones, a cross-section area ratio, a ratio of the long radius to the short radius of a cross-section, a count of connected components in an intermediate layer, or the like, or a combination thereof. In some embodiments, the xy plane may refer to a cross-section of the scan subject. Alternatively or additionally, a false-positive vessel may be segmented using another aforementioned image segmentation algorithm. Then the eleventh mask may be obtained by subtracting the portion of false-positive vessel(s) from the tenth mask.

In 1127, a portion or all of missing vessels in the vessel frame image may be added to the eleventh mask. If no local image supplementation has been performed before operation 1012, the vessel frame image used in this operation may be a preliminary vessel frame image. If any local image supplementation is performed for one or more iterations before operation 1012, the vessel frame image used in the operation may be an advanced vessel frame image, for example, the first target vessel mask obtained in operation 1118. In some embodiments, a region growing operation or any other vessel segmentation process may be performed on the vessel frame image based on the eleventh mask to add missing vessels to the vessel frame image directly. In some embodiments, vessel segmentation parameter(s) (e.g., a seed point) may be obtained from the vessel frame image or the finely-segmented vessel mask, a vessel segmentation may be performed on the eleventh mask based on the vessel segmentation parameter(s) to obtain a local image, and then the local image and the vessel frame image may be merged. After operation 1127, a second target vessel mask including bone-adjacent vessel(s) may be obtained. In some embodiments, after operation 1127, if the vessel frame image includes all target vessels to be segmented, the vessel frame image may be outputted as a target vessel image. In some embodiments, after operation 1127, if the vessel frame image still does not include all the target vessel images to be segmented, a further local image supplementation may then be performed.

After the supplementation with local images, the system may output the target vessel image. The target vessel image may be post-processed before being outputted. The post-processing may include one or more of reducing noises, changing brightness, changing contrast, changing transparency, changing color, image stretching, image warping, image rotation, image cropping, further removing non-vascular tissue, or the like. The target vessel image may be presented in three dimensions or in two dimensions. The target vessel image may be visually presented with one or more other images. The other images may include images generated during the whole process of vessel segmentation, such as temporary masks, the image to be segmented, the original image, images of other target tissue or organs segmented using a different process, reference images of diseased or non-diseased tissue from a standard database. The target vessel image(s) may further be used for medical analysis, visual presentation, experimental samples, reference images, and standard templates, etc. The target vessel image(s) may also be used as a temporary mask for extracting other types of organs or tissues or stored or printed for other purposes.

FIG. 11-C is a schematic diagram illustrating an exemplary process for locating a specific part of a human body in an image according to some embodiments of the present disclosure. Process 1130 may be performed to achieve operation 1111. The locating may be achieved by comparing one or more features of a template image and those of each of layers of an image with respect to which the locating is performed (sample image). Process 1130 may include generating a template histogram of a target part 1131, generating a histogram of a sample image 1132, and performing a match between the histogram of the sample image and the template histogram 1133. Process 1130 may be performed by the processing module 240.

In 1131, the processing module 240 may obtain a template image representing a target part. In the template image, some features $f_i$, $i \in n$, may be extracted from layers where a part to be identified (target part) is located, and a template histogram $T_i$, $i \in n$ for each feature may be formed along the z-axis direction. The template image may refer to an image including a region corresponding to the target part. For example, if it is an ilium to be located, the template image may include an image of a region corresponding to the ilium. In some embodiments, the template image and the sample image may be from different scan subjects. The features may be a count of pixels/voxels having grayscales within a certain grayscale range, an area of a cross-section of, for example, a bone to be located, or the like. The selected feature(s) may have a certain invariability between different scan subjects. The invariability may refer to that the difference between the feature(s) of different scan subjects is relatively small (for example, the difference may be within a certain threshold range). For example, since every tissue type in a CT angiography image may have a specific grayscale value (or value range), for different scan subjects, the count of pixels/voxels having grayscales within a certain grayscale range of each layer may have a certain invariability.

In 1132, the processing module 240 may obtain an image with respect to which the locating is to be performed (sample image). The processing module 240 may extract one or more features that are the same as the ones extracted in operation 1131 from each layer of the sample image, and form a sample histogram $h_i$, $i \in n$, for each feature along the z-axis direction (for example, along a direction from the feet to the head of the scan subject, the closer to the feet, the smaller the z-coordinate is, and the closer to the head, the larger the z-coordinate is).

In 1133, the processing module 240 may compare the sample histogram with the template histogram. For each feature, the corresponding template histogram $T_i$ may be compared with $h_i$ in a traversal manner. When the template histogram traverses to a new position, the template histogram $T_i$ may be scaled based on the corresponding local maximum and the local minimum, and a degree of similarity of the sample histogram and the template histogram may be determined. A position having a maximum degree of similarity may be determined as the position of the target part. The degree of similarity may be determined based on differences between the features of overlapping regions of the sample histogram and the template histogram. For example, a degree of similarity corresponding to a feature may be obtained by dividing a sum of absolute values of feature differences of the overlapping region by the scaling factor of the template histogram. In some embodiments, a sum of degrees of similarity corresponding to two or more features may be obtained as a total degree of similarity, and a position having a maximum total degree of similarity may be determined as a position where the specific part is.

It may be noted that the description of vessel extraction is merely provided for the convenience of description and not intended to limit the scope of the present disclosure. It may be understood that, for those of ordinary skill in the art, after understanding the principle of the present disclosure, various modifications and changes in form and detail may be made to the above method and system without deviating from the principle. The operations in the present disclosure may be divided, combined, or be changed in sequence without affecting the normal execution of subsequent operations. It is also possible for those of ordinary skill in the art to add or remove operations without changing the major concept of the present disclosure and without significantly affecting the execution result of the present invention. For example, for each specific mask or image involved in the aforementioned processes, one of ordinary skill in the art may perform image processing or an image operation thereon to generate additional temporary masks serving as inputs of following operations, which, however, may still fall into the protection scope of the present disclosure.

EXAMPLES

The following examples are only for demonstration purposes and not intended to limit the scope of the present disclosure.

FIG. 12 is a schematic diagram illustrating an intermediate process and a result of a preliminary segmentation of bones according to some embodiments of the present disclosure. Detailed descriptions of the preliminary segmentation of bones are discussed in connection with FIG. 7-B. Briefly, a preliminary segmentation of bones is performed (see operation 711) at first, and then a filling operation is performed on the outcome of the preliminary segmentation of bones to obtain a filling outcome 1201 (see operation 712). Some vessels (as indicated by arrows in the filling outcome 1201) are also included in the filling outcome 1201, which is caused by an over-segmentation of vessels occurred during the preliminary segmentation of bones. In other words, the vessel image portion is extracted as bone image portion. Next, the filling outcome 1201 is removed from the image, and an image erosion is performed on the residual image to obtain an erosion outcome (see operation 811). Then, one or more groups of vessel seeds 1202 are extracted from the erosion outcome (see operation 812). The extraction of the vessel seeds may be based on a threshold, a count of points in connected components, ranges of the x-coordinate and the y-coordinate, or a degree of proximity to the background, etc. In some embodiments, the x-axis direction may refer to a direction from the right ilium to the left ilium of the scan subject. The closer to the right ilium, the smaller the x-coordinate is, and the closer to the left ilium, the larger the x-coordinate is. In some embodiments, the y-axis direction may refer to a direction from the anterior to the posterior of the scan subject; the closer to the anterior, the smaller the y-coordinate is, and the closer to the posterior, the larger the y-coordinate is. Next, a three-dimensional distance field transform with a reduced scale is performed based on the bones and the vessels in the image to obtain a boundary distance field 1203. Then, one or more threshold may be determined in an adaptive manner based on the boundary distance field 1203, and a region growing process is performed based on the obtained threshold(s) and the vessel seeds 1202 to obtain a vessel main body extraction outcome 1204 (see operation 813). The extraction outcome 1204 of main vessels may include vessels over-segmented into the filling outcome 1201. Further, according to an anatomic relationship of the human tissues, a specific bone mask 1205 including a rib (as indicated by arrow A3 in the figure), an ilium (as indicated by arrow A1 in the figure), and a sacrum (as indicated by arrow A2 in the figure), is extracted from the filling outcome 1201 (see operation 1111) to facilitate subsequent extractions of liver, spleen and kidneys that are close to the rib, and the extraction of internal iliac artery that is close to the ilium and sacrum.

FIG. 13 is a schematic diagram illustrating an exemplary outcome after the preliminarily segmented bones are removed according to some embodiments of the present disclosure. After the preliminarily segmented bones are removed from the image of the abdomen (see operation 811), a first outcome 1301, a second outcome 1302, a third outcome 1303, and a fourth outcome 1304 are obtained. The four outcomes are obtained from abdomen images of different scan subjects, respectively. As can be seen from the four outcomes, the bones and vessels are not completely separated. For example, the outcome 1301 includes bone fragments. As another example, the outcome 1302 and the outcome 1303 include ribs. As a further example, the outcome 1304 includes ribs and vertebrae. By performing subsequent vessel extractions, the vessels may be extracted as a whole.

FIG. 14 is a schematic diagram illustrating an exemplary outcome of a morphological combination of vessels according to some embodiments of the present disclosure. After the preliminary segmentation of bones and the filling operation, a subtraction image may be obtained by removing the filling outcome from the operation image. In the subtraction image, a coarse-segmentation of vessels (see operation 911) is performed to obtain a coarsely-segmented vessel mask 1401. Then, in the subtraction images, a fine segmentation of vessels (see operation 912) is performed to obtain a finely-segmented vessel mask 1402. The finely-segmented vessel mask 1402 is subtracted from the coarsely-segmented vessel mask 1401 (see operation 921) to obtain the subtraction outcome 1403. Then, connected components are determined and identified in the subtraction outcome 1403. Then bones and other tissue are removed from the subtraction outcome 1403 to obtain an image of vessels (see operation 922 and operation 923). At last, the image of the vessels and the finely-segmented vessel mask 1402 are merged to obtain an outcome of morphological combination, e.g., the vessel frame image 1404.

FIG. 15 is a schematic diagram illustrating an exemplary outcome of the extraction of the liver, the spleen, and the kidneys according to some embodiments of the present disclosure. In the original image, pixels/voxels whose CT values are above 130 are selected as seeds, based on which vessels and bones are segmented as a whole by adopting a region growing algorithm to obtain a bone-vessel mask (see operation 1114), for example, mask a 1501. The vessel morphological combination outcome 1502 is subtracted from the mask a 1501 to obtain a bone-including intermediate outcome 1503 (see operation 1115). In the bone-including intermediate result 1503, specific bones including a rib, an ilium, and a sacrum may be identified (see operation 1111). The specific bones may be dilated, and the dilated bone tissue may be subtracted from the bone-including intermediate result 1503 to obtain a mask b 1504. In the mask b 1504, since the dilated portions are removed, the rib is separated from the liver, the spleen, and the kidneys which are close to the rib. In the mask b 1504, pixels/voxels whose CT values are above 800 are selected as seeds, with respect to which bones are segmented from the mask b 1504 by performing a region growing operation, and the segmented bones are subtracted from the mask b 1504 to obtain a mask c 1505 (see operation 1116 and operation 1117). The finely-segmented vessel mask may be configured as vessel seeds, based on which a region growing operation is performed on the mask c 1505 to obtain an extraction outcome 1506 in which the liver, the spleen, and the kidneys are extracted (see operation 1118). A complete bone outcome 1507 may be obtained by removing the extraction outcome 1506 from the mask a 1501.

FIG. 16 is a schematic diagram illustrating an exemplary outcome of an extraction of bone-adjacent vessels in abdomen according to some embodiments of the present disclosure. After the liver, the spleen, and the kidneys are extracted and removed, all bones and a small portion of bone-adjacent vessels are included in the remaining bone outcome 1601 (see operation 1121). Then, an image erosion is performed on the bone outcome 1601, and regions connecting the vessels and the bones are removed to obtain an eroded mask. In the eroded mask, pixels/voxels whose CT values are above 800 are selected as seeds, based on which bones are extracted and then dilated to obtain a dilated mask. Then, the dilated mask is removed from the eroded mask to obtain a bone fragment mask 1602. Next, false-positive bone fragments are removed from the bone fragment mask 1602 based on a connected component identification. The connected component identification may be based on ranges of the y-axis and the z-axis, an average area in the xy plane, a degree of proximity to the background, a degree of proximity to adjacent bones, a cross-section area ratio, a ratio of the long radius to the short radius of a cross-section, a count of connected components in a intermediate layer, or the like. In some embodiments, the y-axis direction may refer to a direction from the anterior to the posterior of a scan subject; the closer to the anterior, the smaller the y-coordinate is, and the closer to the posterior, the larger the y-coordinate is. In some embodiments, the z-axis direction may refer to a direction from the feet to the head of a scan subject; the closer to the feet, the smaller the z-coordinate is, and the closer to the head, the larger the z-coordinate is. In some embodiments, the xy plane may refer to a cross-section of the scan subject. After the false-positive bone fragments are removed, pixels/voxels of all vessels previously extracted may be configured as seeds, and a region growing operation is performed in 1602 to obtain bone-adjacent vessels.

FIGS. 17, 18 and 19 are schematic diagrams illustrating exemplary vessel extraction outcomes according to some embodiments of the present disclosure. FIG. 17 illustrates a plurality of images (e.g., images 1701 to 1710) to be segmented (image to be segmented) under different phases, contrast agent conditions, and including lesions. FIG. 18 illustrates target vessel images (e.g., images 1801 to 1810) obtained by performing the vessel extraction process illustrated in FIG. 6-D on the images to be segmented illustrated in FIG. 17. FIG. 19 illustrates exemplary images (e.g., images 1901 to 1912) showing extractions of bone-adjacent vessels and removing of bones.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and within the spirit and scope of the exemplary embodiments of this disclosure.

Moreover, certain terminology has been used to describe embodiments of the present disclosure. For example, the terms one embodiment, an embodiment, and/or some embodiments mean that a particular feature, structure or characteristic described in connection with the embodiment is included in at least one embodiment of the present disclosure. Therefore, it is emphasized and should be appreciated that two or more references to an embodiment or one embodiment or an alternative embodiment in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a unit, module, or system. Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the C programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term about, approximate, or substantially. For example, about, approximate, or substantially may indicate 20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A method for extracting vasculature implemented on at least one machine, each of the at least one machine having at least one processor and a storage device, the method comprising:
    obtaining an image, the image including a first part representing a vessel;
    obtaining a first image by extracting, based on a first algorithm, bone tissue in the image;
    obtaining a second image by performing, based on a first threshold, a region growing operation on the image, the second image including a second part representing the bone tissue and at least a portion of the first part;
    generating a subtraction image by subtracting the first image from the second image, the subtraction image including at least a portion of the first part representing the vessel in the image;
    obtaining at least one vessel seed group based on a first condition and the subtraction image, the vessel seed group including at least one vessel seed;
    determining at least one vessel threshold based on at least one boundary distance field of the subtraction image, wherein the determining at least one vessel threshold comprising:
        obtaining one or more connected components in the subtraction image;
        obtaining values of boundary distance fields of the one or more connected components;
        generating one or more boundary distance field images based on the values of the boundary distance fields;
        obtaining the at least one vessel threshold by performing, based on the at least one vessel seed group, an adaptive thresholding operation on the one or more boundary distance field images, comprising:
            performing, based on center points of the one or more connected components, a region growing operation based on a fourth threshold;
            determining whether there is a sudden change in a count of pixels/voxels of the outcome of the region growing operation performed based on the fourth threshold; and
            determining the at least one vessel threshold based on whether there is a sudden change in the count of pixels/voxels of the outcome of the region growing operation performed based on the fourth threshold; and
    obtaining a target vessel image by performing, based on the vessel seed group and the at least one vessel threshold, a region growing operation on the image.

2. The method of claim 1, the extracting bone tissue in the image based on a first algorithm comprising:
    obtaining the first image by processing, based on a second threshold and Laplacian enhancement, the image; or
    obtaining the first image by extracting, based on a third threshold, the bone tissue in the image.

3. The method of claim 1, the obtaining at least one vessel seed group comprising:
    obtaining one or more connected components in the subtraction image;

determining, based on the first condition, a target connected component from the one or more connected components; and designating the target connected component as the vessel seed group.

4. The method of claim 3, the determining a target connected component from the one or more connected components based on the first condition comprising:

for each of the one or more connected components:
determining a first count of pixels/voxels each of whose distance therefrom to a background area of the image is less than a threshold b;
determining a total count of the pixels/voxels within the each connected component;
determining a second count of pixels/voxels each of whose distance therefrom to a bone is less than a threshold d;
determining a first ratio of the first count to the total count; and
determining a second ratio of the second count to the total count; and excluding a connected component whose first ratio is greater than a threshold c or whose second ratio is greater than a threshold e from being designated as the target connected component.

5. The method of claim 1, further comprising:
performing an image erosion on the subtraction image.

6. A method for extracting vasculature, implemented on at least one machine, each of the at least one machine having at least one processor and a storage device, the method comprising:
obtaining an image, the image including a part representing a vessel;
obtaining a first image by extracting bone tissue in the image, the first image including the extracted bone tissue;
generating a first subtraction image based on the image and the first image, the first subtraction image including at least a portion of the part representing the vessel in the image;
obtaining a second preliminarily segmented bone mask by segmenting the bone tissue in the image;
obtaining the second subtraction image by subtracting the second preliminarily segmented bone mask from the image;
obtaining a vessel frame image based on the first subtraction image, the vessel frame image being a part of a target vessel image, wherein the obtaining a vessel frame image comprising:
obtaining a finely-segmented vessel mask by performing a fine segmentation of vessels in the first subtraction image;
obtaining a coarsely-segmented vessel mask by performing a coarse segmentation of vessels in the second subtraction image; and
obtaining the vessel frame image by performing, based on the finely-segmented vessel mask and the coarsely-segmented vessel mask, a morphological combination, comprising:
obtaining a third mask by subtracting the finely-segmented vessel mask from the coarsely-segmented vessel mask, the third mask including bone tissue;
obtaining a fourth mask related to the vessel by subtracting, from the third mask, a part unrelated to the vessel; and
obtaining the vessel frame image by combining the fourth mask and the finely-segmented vessel mask; and
obtaining the target vessel image by performing, to the vessel frame image, at least one iteration of a supplementation with respect to the vessel.

7. The method of claim 6, the obtaining a first image by extracting bone tissue in the image comprising:
obtaining a first preliminarily segmented bone mask by segmenting the bone tissue in the image; and
performing a filling operation on at least part of the bone tissue in the first preliminarily segmented bone mask.

8. The method of claim 6, wherein the generating a first subtraction image comprises:
obtaining a first mask based on the first image and the image;
obtaining one or more vessel segmentation parameters based on the image and the first mask;
obtaining a second mask by segmenting vessels based on the obtained one or more vessel segmentation parameters and according to at least one vessel segmentation algorithm, the second mask including part of vessels included in the first image; and
obtaining the first subtraction image by merging the first mask and the second mask.

9. The method of claim 8, wherein:
the one or more vessel segmentation parameters include at least one vessel seed group and at least one vessel threshold;
the at least one vessel seed group includes at least one vessel seed;
the obtaining one or more vessel segmentation parameters based on the image and the first mask comprises:
obtaining the at least one vessel seed group based on a first condition and the first mask; and
determining the at least one vessel threshold based on at least one boundary distance field of the first mask; and
the obtaining a first mask based on the first image and the image comprises:
obtaining a second image by performing, based on a first threshold, a region growing operation on the image; and
generating the first mask by subtracting the first image from the second image.

10. The method of claim 6, the obtaining a fourth mask comprising:
identifying at least one connected component in the third mask; identifying connected components unrelated to the vessel by screening the at least one connected component; and
obtaining the fourth mask by removing, from the third mask, the identified connected components unrelated to the vessel.

11. The method of claim 6, the obtaining the target vessel image comprising:
obtaining a specific bone mask by identifying a specific bone in the image, wherein a distance between the specific bone and the vessel in the image is less than a predetermined threshold;
obtaining a bone-vessel mask by segmenting, based on a second condition, bones and vessels in the image;
obtaining a fifth mask by subtracting, from the bone-vessel mask, the vessel frame image and the specific bone mask;
obtaining a sixth mask by segmenting, according to a third condition, bones in the fifth mask;

obtaining a seventh mask by subtracting the sixth mask from the fifth mask;

obtaining a first local image by segmenting vessels in the seventh mask; and obtaining the target vessel image by combining the first local image and the vessel frame image.

12. The method of claim 11, wherein the second condition comprises segmenting the image by region growing performed based on a seed whose image value is above a fourth threshold, and wherein the fourth threshold ranges between 110 and 150.

13. The method of claim 11, wherein the third condition comprises segmenting the fifth mask by region growing performed based on a seed whose image value is above a fifth threshold, and wherein the fifth threshold ranges between 700 and 900.

14. The method of claim 11, the identifying the specific bone comprising:
    locating the specific bone based on an anatomical relationship.

15. The method of claim 11, the identifying the specific bone including:
    obtaining a reference image;
    extracting a feature of the reference image;
    generating a template histogram based on the feature of the reference image;
    extracting the feature of the image;
    generating a sample histogram based on the feature of the image; and
    locating the specific bone based on a similarity between the template histogram and the sample histogram.

16. The method of claim 6, the obtaining the target vessel image comprising:
    obtaining an eighth mask by subtracting the vessel frame image from the image;
    obtaining a ninth mask by segmenting, based on a seed whose image value is above a sixth threshold, bones in the eighth mask, wherein the sixth threshold ranges between 700-900;
    obtaining a tenth mask based on the eighth mask and the ninth mask;
    identifying a false positive outcome in the tenth mask; and
    obtaining an eleventh mask by removing the false positive outcome from the tenth mask;
    obtaining a second local image by segmenting vessels in the eleventh mask; and
    obtaining the target vessel image by combining the second local image and the vessel frame image.

17. A system for extracting vasculature, comprising:
at least one processor; and
at least one storage device configured to store executable instructions that, when executed by the at least one processor, causing the system to implement a method comprising:
obtaining an image, the image including a part representing the vessel;
obtaining a first image by extracting bone tissue in the image, the first image including the extracted bone tissue;
generating at least one subtraction image based on the image and the first image, the at least one subtraction image including at least a portion of the part representing the vessel in the image;
obtaining a second preliminarily segmented bone mask by segmenting the bone tissue in the image;
obtaining the second subtraction image by subtracting the second preliminarily segmented bone mask from the image;
obtaining a vessel frame image based on the subtraction image, the vessel frame image being a part of a target vessel image, wherein the obtaining a vessel frame image comprising:
    obtaining a finely-segmented vessel mask by performing a fine segmentation of vessels in the first subtraction image;
    obtaining a coarsely-segmented vessel mask by performing a coarse segmentation of vessels in the second subtraction image; and
    obtaining the vessel frame image by performing, based on the finely-segmented vessel mask and the coarsely-segmented vessel mask, a morphological combination, comprising:
        obtaining a third mask by subtracting the finely-segmented vessel mask from the coarsely-segmented vessel mask, the third mask including bone tissue;
        obtaining a fourth mask related to the vessel by subtracting, from the third mask, a part unrelated to the vessel; and
        obtaining the vessel frame image by combining the fourth mask and the finely-segmented vessel mask; and
obtaining the target vessel image by performing, to the vessel frame image, at least one iteration of a supplementation with respect to the vessel.

* * * * *